United States Patent
Barton et al.

(10) Patent No.: US 12,198,473 B2
(45) Date of Patent: Jan. 14, 2025

(54) ANALYSIS AND DEEP LEARNING MODELING OF SENSOR-BASED OBJECT DETECTION DATA IN BOUNDED AQUATIC ENVIRONMENTS

(71) Applicant: Guard, Inc., San Francisco, CA (US)

(72) Inventors: Chris Barton, San Francisco, CA (US); Srinivasa Narasimhan, McDonald, PA (US); Nigel Morris, Toronto (CA); Nichole Suzanne Rouillac, San Francisco, CA (US); Robin Nicholas Hubbard, San Francisco, CA (US); Jonathan Chei-Feung Lau, San Francisco, CA (US)

(73) Assignee: Guard, Inc., San Francisco, CA (US)

( * ) Notice: Subject to any disclaimer, the term of this patent is extended or adjusted under 35 U.S.C. 154(b) by 0 days.

(21) Appl. No.: 17/534,331

(22) Filed: Nov. 23, 2021

(65) Prior Publication Data

US 2022/0122380 A1 Apr. 21, 2022

Related U.S. Application Data

(63) Continuation of application No. 17/084,616, filed on Oct. 29, 2020, now abandoned, which is a
(Continued)

(51) Int. Cl.
*G06V 40/20* (2022.01)
*G06N 3/08* (2023.01)
(Continued)

(52) U.S. Cl.
CPC ............. *G06V 40/23* (2022.01); *G06N 3/08* (2013.01); *G06T 7/215* (2017.01); *G06T 7/80* (2017.01);
(Continued)

(58) Field of Classification Search
CPC . G06T 7/80; G06T 7/215; G06T 2207/10052; G06T 2207/20081;
(Continued)

(56) References Cited

U.S. PATENT DOCUMENTS 2,783,459 A 2/1957 Lienau et al.
3,732,556 A 5/1973 Caprillo et al.
(Continued)

FOREIGN PATENT DOCUMENTS

BR 9408257 A 12/1996
CA 2436964 A1 6/2002
(Continued)

OTHER PUBLICATIONS

Baqué, Pierre et al. "Deep Occlusion Reasoning for Multi-camera Multi-target Detection." 2017 IEEE International Conference on Computer Vision (ICCV) (2017): 271-279.
(Continued)

*Primary Examiner* — Charles N Appiah
*Assistant Examiner* — Nicole M Louis-Fils
(74) *Attorney, Agent, or Firm* — KOKKA & BACKUS, PC

(57) ABSTRACT

Techniques for analysis and deep learning modeling of sensor-based object detection data in bounded aquatic environments are described, including capturing an image from a sensor disposed substantially above a waterline, the sensor being housed in a structure electrically coupled to a light housing, converting the image into data, the data being digitally encoded, evaluating the data to separate background data from foreground data, generating tracking data from the data after the background data is removed, the tracking data being evaluated to determine whether a head or a body are detected by comparing the tracking data to classifier data, tracking the head or the body relative to the
(Continued)

waterline if the head or the body are detected in the tracking data, and determining a state associated with the head or the body.

20 Claims, 59 Drawing Sheets

Related U.S. Application Data continuation-in-part of application No. 16/443,866, filed on Jun. 17, 2019, now abandoned.

(51) Int. Cl.
| | | |
|---|---|---|
| *G06T 7/215* | (2017.01) | |
| *G06T 7/80* | (2017.01) | |
| *G06V 10/147* | (2022.01) | |
| *G06V 40/10* | (2022.01) | |
| *G08B 1/08* | (2006.01) | |
| *G08B 21/08* | (2006.01) | |

(52) U.S. Cl.
CPC ............ *G06V 10/147* (2022.01); *G06V 40/10* (2022.01); *G08B 1/08* (2013.01); *G08B 21/08* (2013.01); *G06T 2207/10052* (2013.01); *G06T 2207/20081* (2013.01); *G06T 2207/20084* (2013.01); *G06T 2207/30196* (2013.01)

(58) Field of Classification Search
CPC ........... G06T 2207/20084; G06T 2207/30196; G06V 40/10; G06V 10/147; G06N 3/08; G08B 1/08; G08B 21/08
See application file for complete search history.

(56) References Cited

U.S. PATENT DOCUMENTS

| | | | |
|---|---|---|---|
| 3,796,208 | A | 3/1974 | Bloice |
| 3,953,843 | A | 4/1976 | Codina |
| 3,969,712 | A | 7/1976 | Butman et al. |
| 4,337,527 | A | 6/1982 | Delagrange et al. |
| 4,510,487 | A | 4/1985 | Wolfe et al. |
| 4,639,902 | A | 1/1987 | Leverance et al. |
| 4,747,085 | A | 5/1988 | Dunegan et al. |
| 4,775,854 | A | 10/1988 | Cottrell |
| 4,779,095 | A | 10/1988 | Guerreri |
| D312,219 | S | 11/1990 | Pratt et al. |
| 4,971,283 | A | 11/1990 | Tilsner |
| 5,043,705 | A | 8/1991 | Rooz et al. |
| 5,142,508 | A | 8/1992 | Mitchell et al. |
| 5,146,208 | A | 9/1992 | Parra |
| 5,195,060 | A | 3/1993 | Roll |
| 5,200,931 | A | 4/1993 | Kosalos et al. |
| 5,369,623 | A | 11/1994 | Zerangue |
| 5,574,497 | A | 11/1996 | Henderson et al. |
| 5,616,239 | A | 4/1997 | Wendell et al. |
| 5,631,976 | A | 5/1997 | Bolle et al. |
| 5,691,777 | A | 11/1997 | Kassatly |
| 6,133,838 | A | 10/2000 | Meniere |
| 6,173,066 | B1 | 1/2001 | Peurach et al. |
| 6,421,463 | B1 | 7/2002 | Poggio et al. |
| 6,570,608 | B1 | 5/2003 | Tserng |
| 6,628,835 | B1 | 9/2003 | Brill et al. |
| D733,596 | S | 7/2015 | Goodner et al. |
| 9,443,207 | B2 | 9/2016 | Przybylko et al. |
| 9,727,979 | B1 | 8/2017 | Bella |
| 9,972,188 | B2 | 5/2018 | AlMahmoud |
| D851,509 | S | 6/2019 | Du et al. |
| D858,321 | S | 9/2019 | Recker et al. |
| 10,665,073 | B1* | 5/2020 | Richerson, Jr. ........ H04N 23/55 |
| D891,277 | S | 7/2020 | Yang et al. |
| 10,825,319 | B1* | 11/2020 | Madden ................. G06T 7/0002 |
| D910,469 | S | 2/2021 | Schaller |
| 2009/0189981 | A1 | 7/2009 | Siann et al. |
| 2009/0303055 | A1* | 12/2009 | Anderson ............ G08B 21/086 |
| | | | 340/573.6 |
| 2012/0269399 | A1 | 10/2012 | Anderson et al. |
| 2012/0320219 | A1* | 12/2012 | David ..................... G01S 17/89 |
| | | | 348/169 |
| 2014/0267736 | A1 | 9/2014 | Delean |
| 2014/0333775 | A1 | 11/2014 | Naikal et al. |
| 2015/0107015 | A1 | 4/2015 | Ng |
| 2015/0139485 | A1 | 5/2015 | Bourdev |
| 2016/0104359 | A1 | 4/2016 | AlMahmoud |
| 2016/0155314 | A1* | 6/2016 | Snyder ................. G08B 21/086 |
| | | | 340/573.6 |
| 2018/0059248 | A1 | 3/2018 | O'Keeffe |
| 2019/0004169 | A1 | 1/2019 | Watkins et al. |
| 2020/0023238 | A1* | 1/2020 | Firmin ................. H04N 13/218 |
| 2020/0193686 | A1* | 6/2020 | Chong .................... G06T 15/06 |
| 2020/0246690 | A1* | 8/2020 | Weitzman ............. A63F 13/816 |
| 2020/0394804 | A1 | 12/2020 | Barton et al. |

FOREIGN PATENT DOCUMENTS

| | | |
|---|---|---|
| CN | 103413114 A | 11/2013 |
| EP | 0485735 A1 | 5/1992 |
| EP | 0261917 B1 | 3/1994 |
| FR | 2741370 A1 | 5/1997 |
| FR | 2763459 A1 | 11/1998 |
| GB | 541637 A | 12/1941 |
| GB | 2254215 A | 9/1992 |
| JP | S62251879 A | 11/1987 |
| JP | H05157529 A | 6/1993 |
| JP | H1070654 A | 3/1998 |
| JP | 3196842 B2 | 8/2001 |
| JP | 3264121 B2 | 3/2002 |
| WO | 1995034056 | 12/1995 |
| WO | 2017130187 A1 | 8/2017 |
| WO | 2020257214 A1 | 12/2020 |

OTHER PUBLICATIONS

Brubaker, Marcus A., Leonid Sigal and David J. Fleet, "Video-Based People Tracking," Handbook of Ambient Intelligence and Smart Environments, pp. 57-87, Springer, Boston, MA (2009).

Cao, Zhe, Thomas Simon, Shih-En Wei, Yaser Sheikh, "Realtime Multi-Person 2D Pose Estimation Using Part Affinity Fields," Proceedings of the IEEE Conference on Computer Vision and Pattern Recognition (2017), pp. 7291-7299.

Centers for Disease Control and Prevention, National Center for Injury Prevention and Control. Web-based Injury Statistics Query and Reporting System (WISQARS) [online]. [cited May 3, 2012]. Available from: URL: http://www.cdc.gov/injury/wisqars.

Chen, Liang-Chieh et al. "Semantic Image Segmentation with Deep Convolutional Nets and Fully Connected CRFs." CoRR abs/1412.7062 (2014): n. pag.

Davis, Antoine D., Non-Final Office Action mailed Aug. 9, 2021 for Design U.S. Appl. No. 29/704,835.

Davis, Antoine D., Notice of Allowance and Fee(s) Due mailed Aug. 27, 2021 for Design U.S. Appl. No. 29/704,836.

Fleuret, François et al. "Multicamera People Tracking with a Probabilistic Occupancy Map." IEEE Transactions on Pattern Analysis and Machine Intelligence 30 (2008): 267-282.

Greif, Thomas, "A Probabilistic Motion Model for Swimmers: A Computer Vision Approach," Master of Science Thesis, Universität Augsburg (2009).

Grundmann, Matthias, "Computational video: post-processing methods for stabilization, retargeting and segmentation," Thesis for Degree of Doctor of Philosophy in the School of Interactive Computing, Georgia Institute of Technology, May 2013 (195 pages).

Güler, Riza Alp et al. "DensePose: Dense Human Pose Estimation in the Wild." 2018 IEEE/CVF Conference on Computer Vision and Pattern Recognition (2018): 7297-7306.

Hartley, Richard and Andrew Zisserman, "Multiple View Geometry in Computer Vision," Second Edition, Cambridge University Press, Mar. 2004.

(56) References Cited

OTHER PUBLICATIONS

He, Kaiming, Georgia Gkioxari, Piotr Dollar and Ross B. Girshick. "Mask R-CNN." 2017 IEEE International Conference on Computer Vision (ICCV) (2017), pp. 2980-2988.

Jialue Fan, Wei Xu, Ying Wu, Yihong Gong, "Human Tracking Using Convolutional Neural Networks," IEEE Transactions on Neural Networks, vol. 21, No. 10, Oct. 2010.

Joshi, Neel, Shai Avidan, Wojciech Matusik, David J. Kriegman, "Synthetic Aperture Tracking: Tracking through Occlusions," IEEE 11th International Conference on Computer Vision, Oct. 14-21, 2007, pp. 1-8.

Liu, Xiaobai, "Multi-View 3D Human Tracking in Crowded Scenes," Proceedings of the Thirtieth AAAI Conference on Artificial Intelligence (AAAI-16), 2016.

Louis-Fils, Nicole M., Final Office Action mailed May 21, 2021 for U.S. Appl. No. 16/443,866.

Louis-Fils, Nicole M., Non-Final Office Action mailed Oct. 20, 2020 for U.S. Appl. No. 16/443,866.

Pentair IntelliLevel Water Leveling Monitoring, Installation and User's Guide, Pentair PLC, Retrieved Online Oct. 1, 2019, URL: https://www.pentair.com/en/products/pool-spa-equipment/pool-automation/intellilevel.html.

Schechner, Y. Y. and Nir Karpel. "Attenuating natural flicker patterns." Oceans '04 MTS/IEEE Techno-Ocean '04 (IEEE Cat. No. 04CH37600) 3 (2004): 1262-1268 vol. 3.

Schechner, Yoav Y. and Nir Karpel. "Clear underwater vision." Proceedings of the 2004 IEEE Computer Society Conference on Computer Vision and Pattern Recognition, 2004. CVPR 2004. 1 (2004): I-I.

Schechner, Yoav Y. et al. "Polarization and statistical analysis of scenes containing a semireflector." Journal of the Optical Society of America. A, Optics, image science, and vision 17 2 (2000): 276-84.

Shah, Sohil Atul and Vladlen Koltun. "Robust continuous clustering." Proceedings of the National Academy of Sciences of the United States of America 114 37 (2017): 9814-9819.

Shu, Guang, "Human Detection, Tracking and Segmentation in Surveillance Video," PhD Thesis, University of Central Florida, 2014.

Swirski, Yohay and Yoav Y. Schechner. "3Deflicker from motion." IEEE International Conference on Computational Photography (ICCP) (2013): 1-9.

Swirski, Yohay et al. "Stereo from flickering caustics." 2009 IEEE 12th International Conference on Computer Vision (2009): 205-212.

Tian, Luchao, Mingchen Li, Guyue Zhang, Jingwen Zhao and Yan Qiu Chen. "Robust Human Detection With Super-Pixel Segmentation and Random Ferns Classification Using RGB-D Camera." 2017 IEEE International Conference on Multimedia and Expo (ICME) (2017), pp. 1542-1547.

Tian, Yuandong and Srinivasa G. Narasimhan. "Globally Optimal Estimation of Nonrigid Image Distortion." International Journal of Computer Vision 98 (2011): 279-302.

Tian, Yuandong and Srinivasa G. Narasimhan. "Theory and Practice of Hierarchical Data-driven Descent for Optimal Deformation Estimation." International Journal of Computer Vision 115 (2015): 44-67.

Tzeng, Eric et al. "Simultaneous Deep Transfer Across Domains and Tasks." 2015 IEEE International Conference on Computer Vision (ICCV) (2015): 4068-4076.

Vo, Minh et al. "Automatic Adaptation of Person Association for Multiview Tracking in Group Activities." ArXiv abs/1805.08717 (2018): 17 pages.

Vo, Minh et al. "Spatiotemporal Bundle Adjustment for Dynamic 3D Reconstruction." 2016 IEEE Conference on Computer Vision and Pattern Recognition (CVPR) (2016): 1710-1718.

Wang, Jian et al., "Programmable Triangulation Light Curtains," European Conference on Computer Vision (ECCV), 2018, pp. 19-34.

Wang, Jiayuan, "Liquid Level Sensing Using Capacitive-to-Digital Converters," Analog Dialogue, vol. 49, Apr. 2015.

Wikipedia contributors, "Scheimpflug principle," Wikipedia, The Free Encyclopedia, https://en.wikipedia.org/w/index.php?title=Scheimpflug_principle&oldid=910381418 (accessed Sep. 24, 2019).

Wikipedia contributors, "Tilt-shift photography," Wikipedia, The Free Encyclopedia, URL: https://en.wikipedia.org/wiki/Tilt-shift_photography (accessed Sep. 24, 2019).

Wu, Changchang, "VisualSFM: A Visual Structure from Motion System," Retrieved online Sep. 23, 2019, URL: http://ccwu.me/vsfm/ (2011).

Yang, Tao, Yanning Zhang, Jingyi Yu, Jing Li, Wenguang Ma, Xiaomin Tong, Rui Yu and Lingyan Ran. "All-In-Focus Synthetic Aperture Imaging." ECCV (Sep. 2014), pp. 1-15.

Young, Lee, Notification of Transmittal of the International Search Report and the Written Opinion of the International Searching Authority, or the Declaration, mailed Nov. 17, 2020 for International Application No. PCT/US2020/037970.

Zhi, Tiancheng et al. "Deep Material-Aware Cross-Spectral Stereo Matching." 2018 IEEE/CVF Conference on Computer Vision and Pattern Recognition (2018): 1916-1925.

* cited by examiner

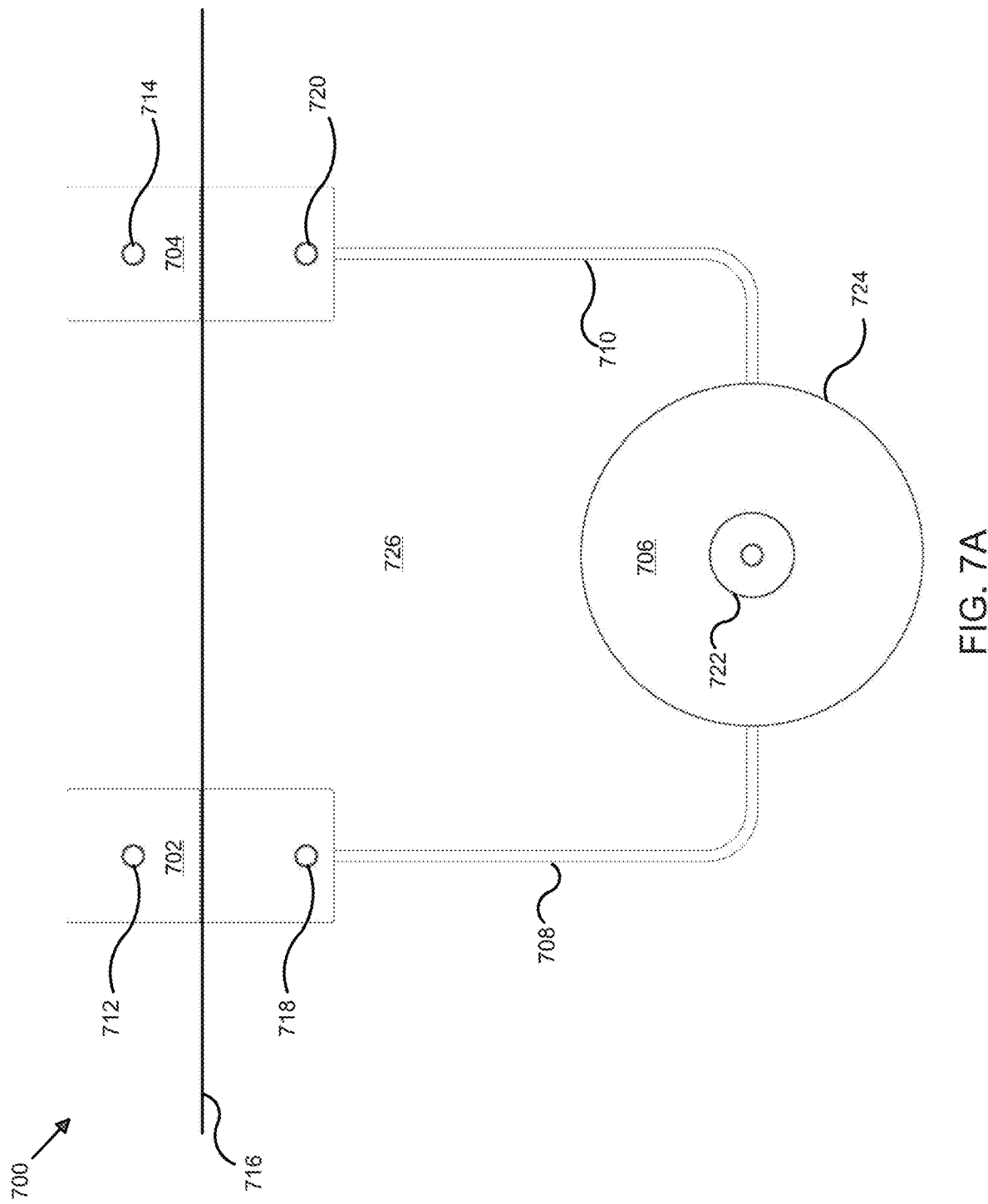

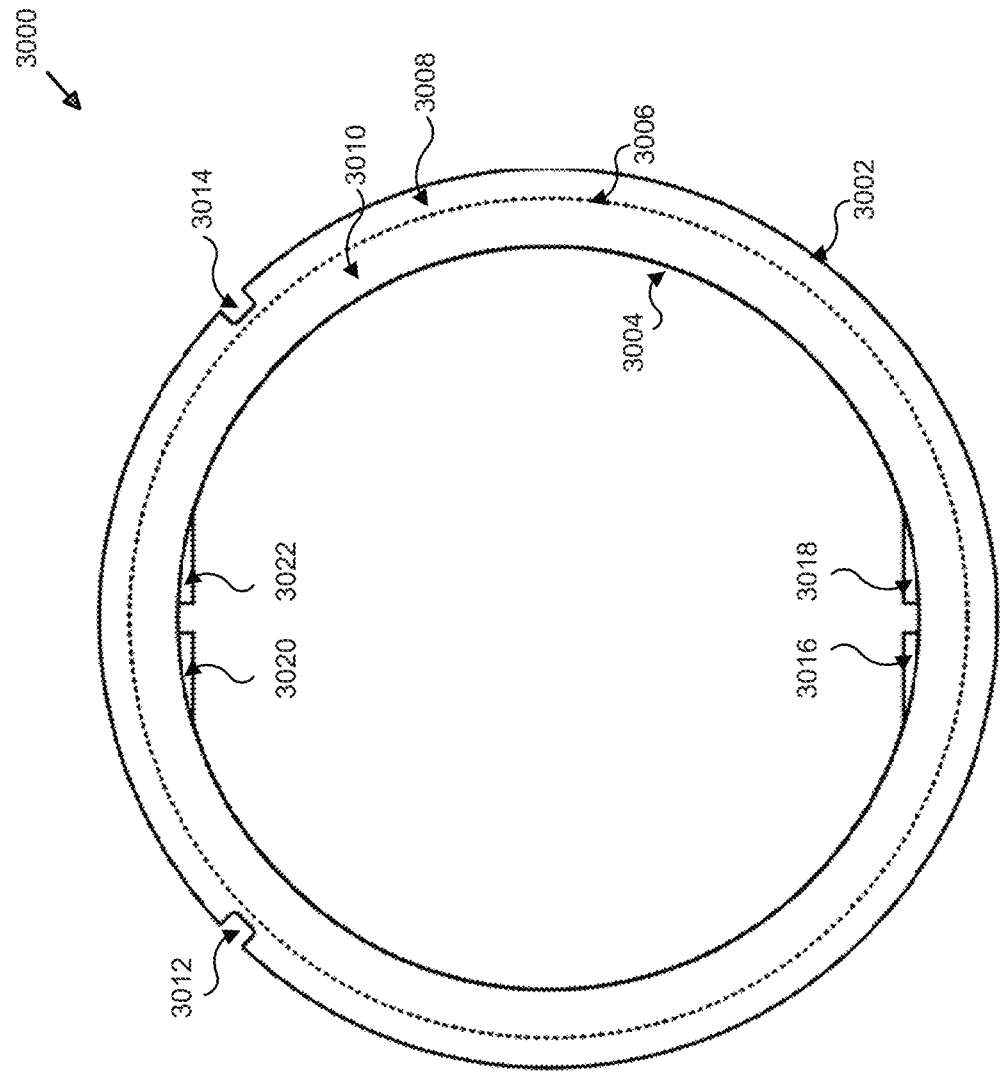

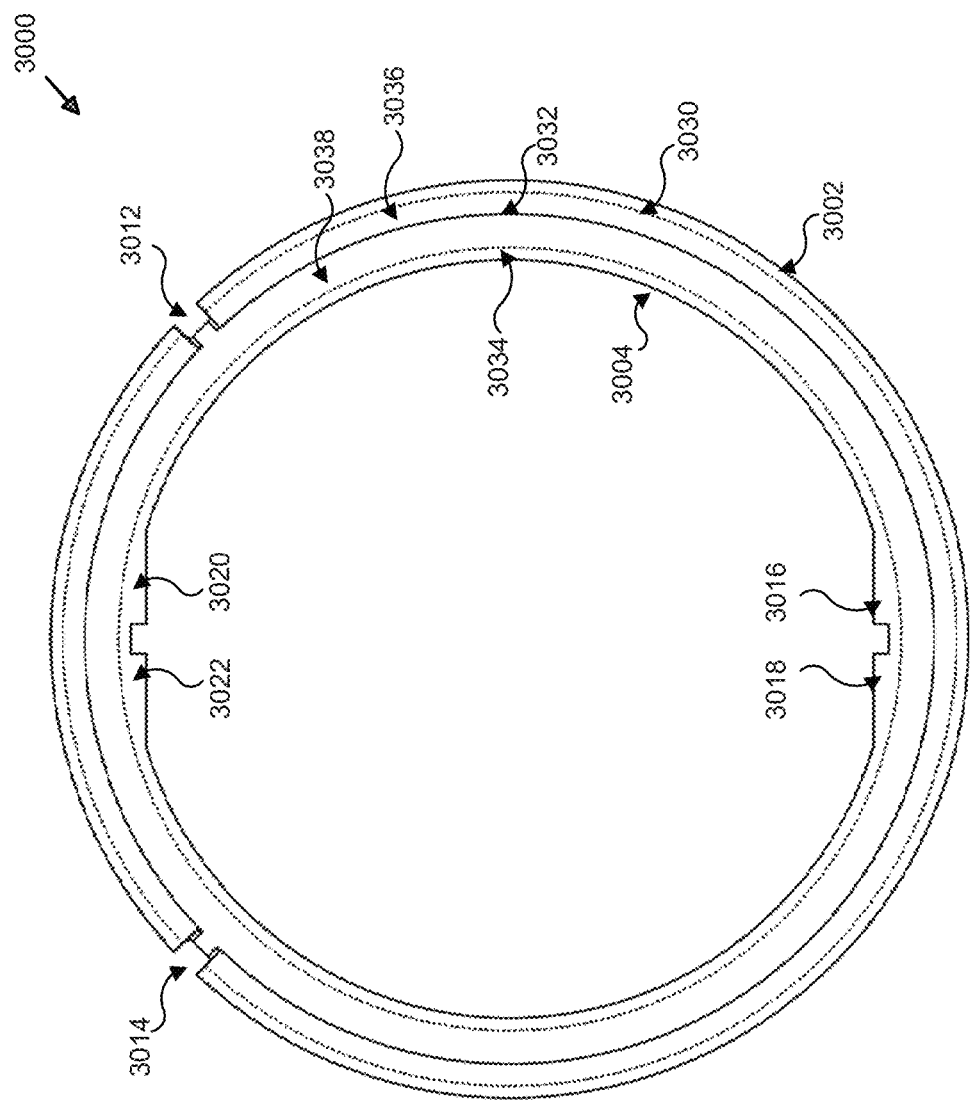

ANALYSIS AND DEEP LEARNING MODELING OF SENSOR-BASED OBJECT DETECTION DATA IN BOUNDED AQUATIC ENVIRONMENTS

CROSS-REFERENCE TO RELATED APPLICATIONS

This application is a continuation application of copending U.S. patent application Ser. No. 17/084,616, filed Oct. 29, 2020 and entitled, "ANALYSIS AND DEEP LEARNING MODELING OF SENSOR-BASED OBJECT DETECTION DATA FOR ORGANIC MOTION DETERMINATION IN BOUNDED AQUATIC ENVIRONMENTS USING UNDERWATER POWERED SYSTEMS," U.S. patent application Ser. No. 17/084,616 is a continuation-in-part application of U.S. patent application Ser. No. 16/443,866, filed Jun. 17, 2019 and entitled, "Analysis And Deep Learning Modeling Of Sensor-Based Object Detection Data In Bounded Aquatic Environments," all of which is herein incorporated by reference in its entirety for all purposes.

FIELD

The present invention relates generally to computer science, data science, databases, sensor management, and electronic safety and security systems. More specifically, techniques for analysis and deep learning modeling of sensor-based object detection data for organic motion determination in bounded aquatic environments using underwater powered systems are described.

BACKGROUND

As the fields of data networking, computer science, and data science expand, various computer programs including operating systems, client and server applications, online Internet platforms, distributed and cloud computing systems, and various other types of applications are being developed and deployed in increasing complexity, design, and scale across a wide variety of industries and sectors. There is widespread utility for applications in various fields, including those promoting human health and safety. For example, thousands of people die each year in drowning-related accidents, whether in natural (e.g., oceans, seas, lakes, rivers, streams, ponds, or the like) or artificial bodies of water (e.g., reservoirs, swimming pools, diving tanks, wading pools and ponds, or the like). Yet, conventional techniques have not prevented the occurrence of such incidents, which often remain unnoticed or undetected until after someone has drowned.

Conventional techniques for detecting drowning have not been particularly successful due to a variety of factors. Problematically, conventional techniques are often technically limited, inaccurate, inferior due to limitations of implemented equipment, or impractically expensive to deploy. While some conventional techniques use sensor-based approaches, these systems are unable to distinguish various features such as pool walls, steps, bottom contours, or other fixed objects from those that are temporary or transient such as moving bodies in a pool. Moreover, the motion and tracking of individuals in conventional techniques is very difficult and sensor-based conventional solutions are easily defeated. Further, current sensor-based approaches are often technically limited as input received from conventional systems is often not processed accurately nor input to systems sophisticated enough to perform data-processing functions that can accurately identify in-water objects. Conventional techniques often are unable to detect and classify in-water objects accurately or consistently, which can lead to unfortunate exceptions and low drowning detection rates. Still further, conventional techniques can be physically difficult and expensive to deploy, often requiring additional construction for retrofitting pre-existing pools and artificially enclosed bodies of water. Further, conventional techniques suffer from numerous other defects such as equipment expense, limited ability to recognize using sensors features in a waterborne environment, power distribution, among other problems that characterize drowning detection as flawed and problematic.

Thus, what is needed is a solution for detecting objects in aquatic environments in order to identify and prevent drowning incidents without the limitations of conventional techniques.

BRIEF DESCRIPTION OF THE DRAWINGS

Various embodiments or examples ("examples") of the invention are disclosed in the following detailed description and the accompanying drawings:

FIG. 7A illustrates an exemplary local system for analysis and deep learning modeling of sensor-based detection data in bounded aquatic environments;

FIG. 30A illustrates a front view of an exemplary spacer ring used in analysis and deep learning modeling of sensor-based detection data in bounded aquatic environments using underwater powered systems;

FIG. 30B illustrates a rear view of an exemplary spacer ring used in analysis and deep learning modeling of sensor-based detection data in bounded aquatic environments using underwater powered systems;

DETAILED DESCRIPTION

Figure 1A:
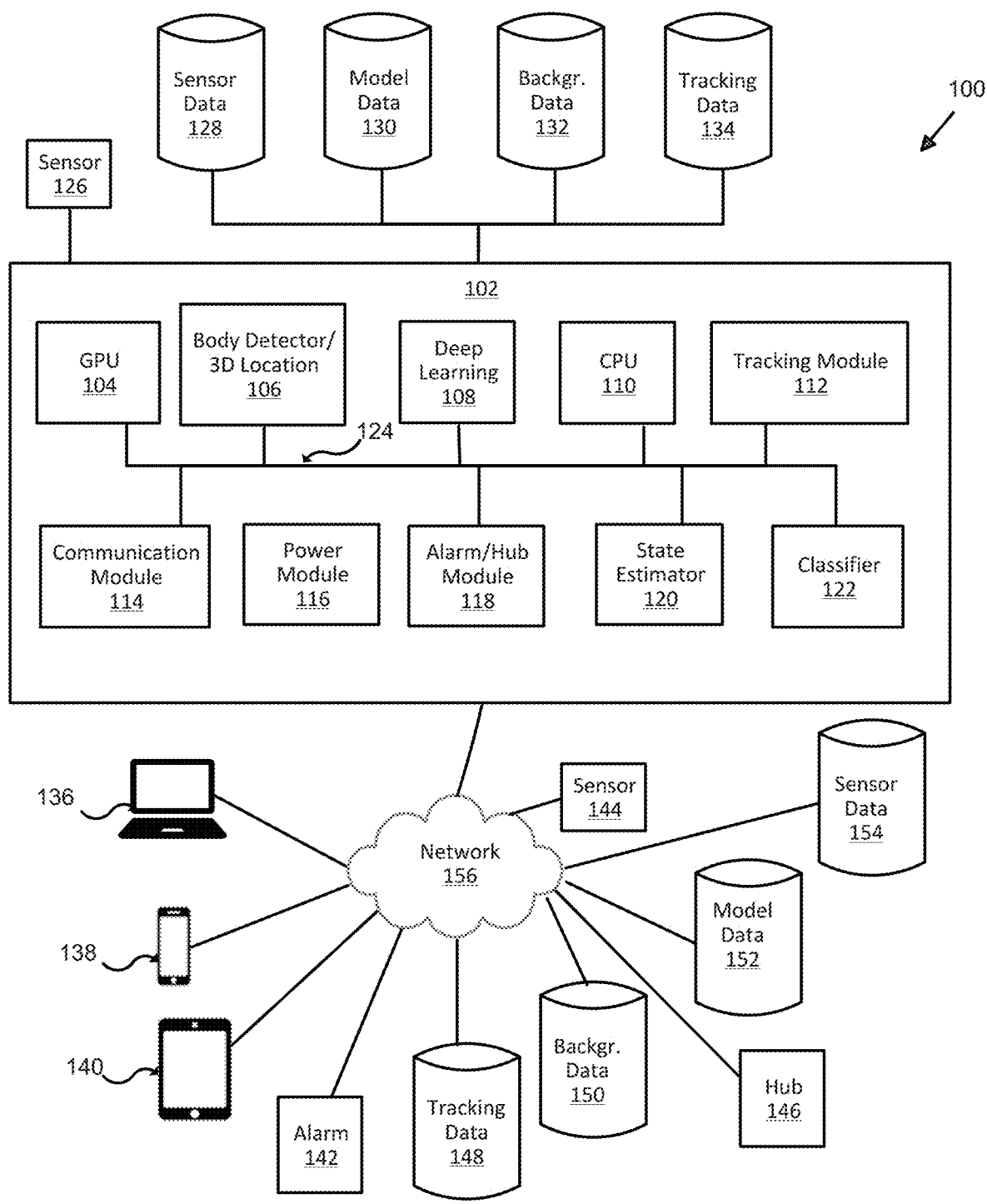
FIG. 1A illustrates an exemplary system for analysis and deep learning modeling of sensor-based detection data in bounded aquatic environments.

Various embodiments or examples may be implemented in numerous ways, including as a system, a process, an apparatus, a user interface, or a series of program code or instructions on a computer readable medium such as a storage medium or a computer network including program instructions that are sent over optical, electronic, electrical, chemical, wired, or wireless communication links. In general, individual operations or sub-operations of disclosed processes may be performed in an arbitrary order, unless otherwise provided in the claims.

A detailed description of one or more examples is provided below along with accompanying figures. This detailed description is provided in connection with such examples, but is not limited to any particular example. The scope is limited only by the claims and numerous alternatives, modifications, and equivalents. Numerous specific details are set forth in the following description in order to provide a thorough understanding. These details are provided for the purpose of illustrating various examples and the described techniques may be practiced according to the claims without some or all of these specific details. For clarity, technical material that is known in the technical fields and related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") and/or software using one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As described herein, structured and unstructured data may be stored in various types of data structures including, but not limited to databases, data repositories, data warehouses, data stores, or other data structures and facilities configured to manage, store, retrieve, process calls for/to, copy, modify, or delete data or sets of data (i.e., "datasets") in various computer programming languages and formats in accordance with various types of structured and unstructured database schemas such as SQL, MySQL, NoSQL, DynamoDB™ or others, such as those developed by proprietary and open source providers like Amazon® Web Services, Inc. of Seattle, Washington, Microsoft®, Oracle®, Salesforce.com, Inc., and others, without limitation or restriction to any particular schema, instance, or implementation. Further, references to databases, data structures, or any type of data storage facility may include any embodiment as a local, remote, distributed, networked, cloud-based, or combined implementation thereof. In some examples, data may be formatted and transmitted (i.e., transferred over one or more data communication protocols) between computing resources using various types of wired and wireless data communication and transfer protocols such as Hypertext Transfer Protocol (HTTP), Transmission Control Protocol (TCP)/Internet Protocol (IP), Internet Relay Chat (IRC), SMS, text messaging, instant messaging (IM), WiFi, WiMax, or others, without limitation. As described herein, disclosed processes implemented as software may be programmed using Java®, JavaScript®, Scala, Perl, Python™, XML, HTML, and other data formats and programs, without limitation. As used in this Detailed Description, references to layers of an application architecture (e.g., application layer or data layer) may refer to a stacked layer application architecture such as the Open Systems Interconnect (OSI) model or others.

FIG. 1A illustrates an exemplary system for analysis and deep learning modeling of sensor-based detection data in bounded aquatic environments. Here, system 100 includes application 102, general processing unit (GPU) 104, body detector/3D (i.e., 3-dimensional) location module 106, deep learning module 108, central processing unit (CPU) 110, tracking module 112, communication module 114, power module 116, alarm/hub module 118, state estimator 120, classifier 122, data bus 124, sensor 126, sensor data 128, model data 130, background data 132, tracking data 134, clients 136-140, alarm 142, sensor 144, hub 146, tracking data 148, background data 150, model data 152, sensor data 154, and network 156. In some examples, application 102 may be implemented as a software-based program configured to implement one or more of the processes described herein. Application 102 may also be implemented as a standalone or distributed application, for example, with one or more sub-modules 104-122 being hosted locally, remotely, or in a distributed topology (e.g., software-as-a-service (i.e., "SaaS"), using a computing cloud, networked servers, or any other type of topology using different computing components on which one or more of sub-modules 104-122 are hosted, served, or otherwise made available to application 102). Here, sub-modules 104-122 of application 102 are in data communication with each other using data bus 124, which may be direct, local, remote, wired, wireless, distributed, virtual, or any other type of connection that permits data communication between sub-modules 104-122.

Here, graphics processing unit ("GPU") 104 may be implemented to perform various processes (executed as software, firmware, circuitry, or a combination thereof) such as those described herein. For example, GPU 104 may be configured to perform processes for detection and association (i.e., correspondence between detected objects (e.g., head and body (i.e., for an adult, child, or animal) corresponding or associated with a given individual person, above and below water detected elements that are associated with the same object, or the like) of objects using the techniques described herein. In some examples, one or more deep learning (i.e., of various types based on neural networks, probabilistic, inference-based, and other types of algorithms, without limitation or restriction) and/or machine learning algorithms, software, or the like may be implemented to develop and reference (i.e., during processing of sensor data 128 and/or 154 received from sensors 126 and/or 144) models that may be used by GPU 104 to perform various processes such as detection, association, background subtraction, identification of foreground features or objects, performing analysis or processing to identify particular features, surfaces, objects, structures, motions, or the like in order to detect (i.e., sense) various above and below water detected objects. Application 102 may be configured to perform various types of data analysis using, for example, deep or machine learning algorithms or models (collectively referred to as "models" herein). Data analysis or data analytics may refer to any type of process performed on any data (e.g., sensor data 128 and/or 154) accessible or input to application 102, in some examples. In other examples, data analytics may be provided by using data retrieved from sources external to application 102 and are not limited to the examples shown and described. As used herein, "image" may refer to a still, moving, video, three dimensional ("3D"), or any other type of image, regardless of form, format, or media. Also as used herein, "objects" may refer to person and non-person items that are detected by sensors 126 and/or 144, for example, in aquatic environments such as those described herein. As used herein, any type of deep learning algorithm may be used and, in some examples, multiple or different deep learning algorithms may be used and trained to perform processes such as detection, association, identification, or others, by referencing data found in one or more of sensor data 128 or 154, model data 130 or 152, background data 132 or 150, and/or data retrieved from one or more of clients 136-140. As shown and described herein, various resources (e.g., clients 136-140 (e.g., desktop 136, mobile devices such as smart phone ("smart phone") 138 or computing tablet ("tablet") 140), alarm 142, sensor 144, and hub 146) may also be networked resources (i.e., resources that are coupled to or in data communication with one or more elements of system 100) using a data network such as network 156. Any type of data communication links, wired, wireless, chemical, optical, line-of-sight, radiating, or the like, may be used and are not limited to any specific implementation. In some examples, machine learning algorithms may be used along with or in addition to deep learning algorithms in order to develop a large dataset that may be used by detection, association, identification, or other processes such as those described herein. In other examples, data obtained from in-water, above-water, or below-water placed (i.e., "placed" may be used interchangeably with "disposed," "positioned," "emplaced," or "implemented," without limitation) sensors 126 and 144 may also sense or detect (these terms may be used interchangeably) images, video, data, or any other type of input, including, but not limited to electrical, thermal, acoustic, audio, optical, haptic, or other types, without limitation. Sensors 126 and/or 144 may be implemented using various types of technologies such as RGB (i.e., Red, Blue, Green color-channel sensing), MR (i.e., Near Infrared), infrared, thermal, thermal infrared, or others, without limitation or restriction. Due to differences in above-water and underwater (i.e., gaseous and liquid) environments or media in which sensors 126 and/or 144 may be placed, different types of sensing technology may be implemented. For example, sensors 126 and/or 144 may be implemented, above and underwater, solely above water, or solely underwater, using a wide-angle lens, aperture, filter, polarizer, and, for sensing (i.e., detecting) at night or in other low-light environments, various types of light sources for night illumination such as incandescent, halogen, chemical, light emitting diode-based (hereafter "LED") lighting such as blue LEDs for night illumination for underwater (i.e., liquid) sensors and infrared LEDs for night illumination for above-water (i.e., gaseous or non-liquid) illumination. In some examples, these features may be referred to, individually or collectively, as an "optical feature" or "optical features," respectively. As used herein, "camera" may refer to any type of image capture device using, in some examples, one, some, or none of the immediately described features (e.g., wide-angle lens, aperture, filter, polarizer, and, for sensing (i.e., detecting) at night or in other low-light environments, various types of light sources for night illumination such as incandescent, halogen, chemical, light emitting diode-based (hereafter "LED) lighting such as blue LEDs for night illumination for underwater (i.e., liquid) sensors and infrared LEDs for night illumination for above-water (i.e., gaseous or non-liquid) illumination, or others, without limitation or restriction)). In some examples, the use of multiple cameras may be implemented to capture not only a single image, but also video and 3D data. In other examples, multiple systems 100 in data communication with each other (not shown) may be implemented to capture video and 3D data and configured to process and function collaboratively. As an example, a large body of water such as a large, irregularly shaped hotel or resort pool may require the use of multiple systems (e.g., application 102) to ensure drowning detection capabilities over the entire body. Other colors and color-channels may be used and are not limited to the examples provided herein. In some example, sensors 126 and/or 144 may be implemented to capture still images, continuous video feeds, short video clips (i.e., tracklets), motion-activated video or still images (i.e., the sensors may be using optical cameras, as an example, to capture still images or videos when motion is detected in an aquatic environment; whether above-water or underwater), and others. Further, mechanisms may be implemented with sensors 126 and/or 144 (either or both of which may be implemented above-water or underwater) to rotate filters, polarizers, imagers, or the like to control exposure, sensitivity, or other photographic attributes of captured signals, data, images, video, or the like. As used herein, video may include images, that consist of still images and/or video-based captured imagery, which could include continuous video, motion-activated video capture, or tracklets, as described above. Sensors 126 and/or 144, in some examples, may also be configured using one or more implementations and system 100 is not limited to solely one or two sensors. While sensors 126 and 144 are shown as having direct and indirect (e.g., networked via network 156), respectively, data communication links with application 102, the example shown is not intended to limit the number, type, or topology in which application 102 is coupled (i.e., directly or indirectly, wired or wireless, or the like) to sensors 126 and/or 144. Further, sensors 126 and/or 144 may also be implemented as sensor arrays (e.g., a sensor body may include multiple types of sensors or multiple sensors of a single type, or the like). For example, multiple sensors, sensor arrays, or mechanisms for rotating polarizers, filters, imagers, or the like, may be implemented to adjust the field of view of each sensor (e.g. sensors 126 and/or 144) in order to capture more fully a body of water such as a swimming pool, as an example. As another example, multiple optical sensors (e.g., cameras) may be used to implement sensors 126 and/or 144 as a single virtual camera with a large aperture configured to sense a large area of an aquatic environment, as discussed in greater detail below. In other examples, sensors 126 and/or 144 may be implemented as cameras having wide-angle lenses and apertures that permit wide fields of view (e.g., 160 to 180 degrees relative to an axis of a surface on which sensors 126 and/or 144 are placed). Placement, calibration, implementation, and other aspects and attributes of sensors 126 and/or 144 are discussed in greater detail below.

Here, data obtained from sensors 126 or 144 may be in various forms and formats such as analog, wave, optical, digital, or the like, without limitation or restriction to any particular type of implementation. In some examples, sensor 126 or 144 may be configured to obtain optical images using variable or wide angle aperture camera that capture still, video, moving, or other types of optical input that may be processed by GPU 104 and central processing unit ("CPU") 110 for various tasks such as those described above and others (e.g., object tracking, image reconstruction, background subtraction, foreground identification of objects (i.e., persons vs. non-persons), and others (which may be stored as tracking data 134 or 148). Input captured by sensors 126 and/or 144 may be in analog forms that are converted into data (e.g., analog or digital) locally or transmitted to other modules managed and/or arbitrated by communication module 114. In other examples, active illumination-based sensors may be implemented for sensors 126 and/or 144 using techniques such as light detection and ranging (hereafter "LIDAR"), those that generate light curtains (i.e., breaking a light curtain generated by one or more of sensors 126 and/or 144 can result in detecting various objects when one or more beams of light projected within a light curtain are intercepted or interrupted by an object(s)), and others, without limitation. Examples of techniques that may be used include programmable triangulating light curtains, light sheet fluorescence microscopy, rotating light sheets configure to move in synchrony with designated rows in one or more cameras implemented as sensors 126 and/or 144, among other techniques for propagating light in patterns, waves, beams, dwells, or the like where interruptions of these propagation techniques can be used by sensors 126 and/or 144 to detect objects.

Other modules that may receive sensor input, regardless of form or format, and convert to data include GPU 104, CPU 110, or other elements of system 100. For example, GPU 104 or CPU 110 may be implemented on one or more of clients 136-140 or another (e.g., a remotely hosted server or computing cloud (hereafter "cloud") comprised of one or more physical or virtual computing resources). Regardless, data converted from inputs detected or received by sensors 126 and/or 144 may be stored in sensor data 128 and/or 154 and used by GPU 104, CPU 110, or other modules such as body detector/3D location module 106, deep learning module 108, tracking module 112, state estimator 120, or classifier 122 to perform other processes such as those described herein and below in greater detail. Sensor data 128 may be further processed to identify background data (e.g., data associated with background features of an aquatic environment such as walls, bottom surfaces and contours, steps, underwater obstructions, or other features) that is stored in a database for background data 132. Identifying background features and subtracting these from captured images and/or video enable system 100 to further identify foreground features and objects such as floating inanimate objects, persons, animals, or the like by transferring data to other modules configured to perform various processing functions.

For example, body detector/3D location module 106 may be configured to use input (e.g., data from sensor data 128 and/or 144) to detect and identify body(s), body parts, and the positioning thereof in a three-dimensional ("3D") space such as within a body of water. As used herein, a body of water may refer to any type of aquatic environment. In some examples, aquatic environments may include oceans, seas, lakes, fjords, channels, canals, ponds, pools, or any other type of natural or artificial structure containing water, aqueous liquids, or the like. As used herein, aquatic environments can refer to swimming pools and the techniques described can be used for practical applications such as detection of persons within the environments and track them with the eventual goal of detecting a drowning state and activating (i.e., triggering, sounding, enabling, turning on, or otherwise causing) an alarm, which may be audible, optical, light-based, vibration-based, haptic, or of any other type, without limitation or restriction.

Referring back to the body detector/3D location module 106, input from sensors 126 and/or 144 may be input to one or more deep learning algorithms developed as software and/or firmware-related components of system 102 and managed by deep learning module 108. For example, body detector/3D location module 106 may include other algorithms, software, or firmware that, working cooperatively with deep learning module 108 when instructed or called by GPU 104, is used to detect whether a body is present in a body of water and, if so, what body parts have been detected and the location of said body and/or body parts within the 3D space of an aquatic environment. Different body parts may also be associated to a given person by body detector/3D location module 106. In other examples, body detector/3D location module may also be used to detect and associate above-water with underwater parts of non-person objects that may be within a bounded aquatic environment (e.g., pool floats or toys, chlorinating pool floats, debris skimmers such as those found in swimming pools, flotsam, jetsam, partially-submerged or partially-immersed objects, or the like). If bounded (i.e., "bounded" may refer to a fully or partially enclosed space in which an aquatic environment is provided or found, such as a swimming pool, canal, diving tank, wading pool, or the like), body detector/3D location may, for example, detect when bodies have entered a body of water (as used herein, "body of water" may be used and refer to "aquatic environment" interchangeably without limitation or restriction) and at what 3D position of said body of water the object has been detected relative to the positions and fields of view sensed by sensors 126 and/or 144. Deep learning module 108 may be called to compare images, for example, from model data 130 or 152 to analyze input from sensors 126 and/or 144 to provide further data input to body detector/3D location module 106. If a body has been detected and a position determined by body detector/3D location module 106, then CPU 110, tracking module 112, and classifier 122 (as described in greater detail below) may be called or otherwise used to identify and track bodies or non-person objects. As used herein, bodies may refer to any size, shape, or type of living, animate, ambulating organism such as a human or animal (e.g., cat, dog, bird, goat, cow, deer, wolf, and others, without limitation or restriction).

In some examples, tracking may be established and managed by CPU 110 and tracking module 112 of detected person and non-person objects for uses by one or more of sub-modules 104-122 of application 102. In other examples, data from tracking module 112 may be stored in one or more of sensor data 128 or 154, model data 130 or 152, background data 132 or 150, tracking data 134 or 148, or other databases. For example, other databases, local or remote (e.g., cloud-based), may be provided to exclusively store tracking data from CPU 110 and tracking module 112. In some examples, tracking module 112 may be configured to manage tracking data that is processed by or generated from GPU 104 or CPU 110. As an example, when persons enter or leave a pool, tracking module 112 may be configured to delete a tracking record associated with said person or create a new tracking record for a person entering a pool. Tracking module 112 may also be configured, in some examples, to manage historical data associated with tracking detected persons and objects and sharing copies of said data with model data 130 and/or 152, which can be used to improve the accuracy of deep learning algorithms used and implemented by deep learning module 108. Data associated with tracking multiple individuals can be combined to track multiple individuals in a given space (i.e., an appearance space) by fusing (i.e., combining) processed tracklets from sensors 126 and/or 144, from multiple fields of view and, using 3D feature detection algorithms, size changes due to refraction of tracked body parts of individuals underwater can be estimated. Various types and sources of data may be used by deep learning module 108 (which may also be implemented with or replaced by other types of machine learning algorithms) to "train" or "learn" to identify features such as those discussed herein by using, for example, different types of comparative analysis (e.g., probabilistic, statistical, and others, without limitation or restrictions). Data of detected and classified items may then be tracked and data associated with tracking may be stored in tracking data 134 or remote, cloud-based, distributed, or otherwise networked databases such as tracking data 148. Tracking data may also be used, in some examples, to invoke state estimator 120, which may be implemented as a software module used to determine various states associated with given bodies (i.e., persons, animals, or the like) in a body of water, as described in greater detail below in connection with FIG. 21. In some examples, a drowning state may be estimated when state estimator 120 receives data indicating sensors 126 and/or 144 have detected a motionless body or head, a body or head partially or fully submerged for a time period, motionless eyelids/nose/mouth (i.e., eyelids are not moving or fluttering, mouth is open, but underwater, or the like) that are motionless or submerged for a time period, a body or head lacking detected breathing (i.e., no rise or fall of a chest or torso region), or any other configuration of drowning that may be learned by application 102 using various types of models, rules, or sensor data, without limitation or restriction. As used herein, "motionless" may refer to the complete or partial lack of motion originating from a detected body, head, or portion thereof, regardless of whether motion is imparted to the detected body, head, or portion thereof by the surrounding environment. In other words, "motionless" may refer to the lack of ambulatory or voluntary motion originating from a detected head, body, or portion thereof. In still other examples, drowning state estimation may be achieved by state estimator 120 for other types of drowning configurations and are not limited to the examples described herein.

Referring back to FIG. 1A, classifier 122 may be invoked to aid in identifying objects detected by sensors 126 and/or 144 in a body of water. In some examples, classifier 122 may be configured to implement segmentation of captured images and videos from sensors 126 and/or 144. For example, classifier 122 may be configured to classify features of detected objects into person and non-person classes, which may include pose detector features, body part size and shape features, and thermal intensity differentials. By using deep or machine learning algorithms such as those implemented by deep learning module 108 (which can be trained against various types and groups of data (e.g., model data 130)), non-person objects can be identified apart from persons detected in an aquatic environment such as a swimming pool by segmenting captured images and video. As used herein, "deep learning" may include machine learning models, both of which may refer to data models and algorithms that are used to process various types of input data to perform other processes and functions such as those described herein or others. Collectively, "deep learning" and "machine learning" may be referred to as "models."

In some examples, segmented images and video may be referred to as tracklets and can be used to learn (i.e., using deep learning module 108) to associate certain detected features with a given person. In further examples, classifier 122 may rely upon modeling provided by deep learning module 108 to determine whether a detected object should be classified as a person or non-person object, is moving or still, is fully or partially submerged or immersed, if a person, whether a head of said person is below or above water, and the like.

State estimator 120, in some examples, in data communication with one or more of body detector/3D location module 106, tracking module 112, classifier module 122, and alarm/hub module 118 may be configured to assign, correspond, and track various states of a detected object. If state estimator 120 indicates that a detected object is a person and a head corresponding to a body of said person is below water and has been submerged for a given period of time (e.g., 20-30 seconds), it may be configured to send (using a wired, wireless, optical, or other type of data communication link (e.g., data bus 124)) a control signal or data to alarm/hub module 118 to initiate a timer that, upon reaching a given threshold) activate an alarm (e.g., audible, visual, haptic, or others) to alert nearby personnel to a potential drowning event occurring. Due to the extensive data available to deep learning module 108 using modeling data 130 and/or 152, patterns of behavior can be imaged, analyzed, and recognized to provide early warning of drowning activities the possibility of cessation or interruption of a drowning event and survivability of drowning persons could be substantially increased.

As discussed above, hub 146 may be implemented as a local or remote unit that may be configured to provide one or more of the features, functions, and processes of application 102 as described herein. For example, hub 146 may be used to implement an alarm (such as those types described herein) that can be triggered when a timer (not shown) initiated by state estimator 120 has met or exceeded a given threshold (i.e., a pre-specified time limit measured in hours, minutes, seconds, or fractions thereof) for a state during which a head of a body associated with a person has been fully or partially submerged. In some examples, power supplied to hub 146 may come from a variety of sources, including electrical power driven over various voltages and amperages of direct or alternating current (i.e., 110-115 VAC or 110-115 VAC), 220 VAC, 12 VDC, 24 VDC, or others, without limitation or restriction). Power may be generated for system 100, application 102, and the elements shown within FIG. 1A from various sources and is neither limited or nor restricted to any particular form or type. Regardless, power module 116 may be implemented to manage and control power distribution to one or more of the elements shown in system 100 such as GPU 104, CPU 110, sensors 126 and/or 144, hub 146, clients 136-140, alarm 142, or others, without limitation or restriction. Power module 116 may also be implemented as software, firmware, circuitry, or a combination thereof to distribute, manage, enable/disable, or otherwise control the distribution of electrical power to the above-referenced elements, among others. In other examples, the quantity, type, configuration, function, or structure of elements 102-156 of system 100 may be varied and are not limited to any specific implementation, without limitation or restriction.

Figure 1B:
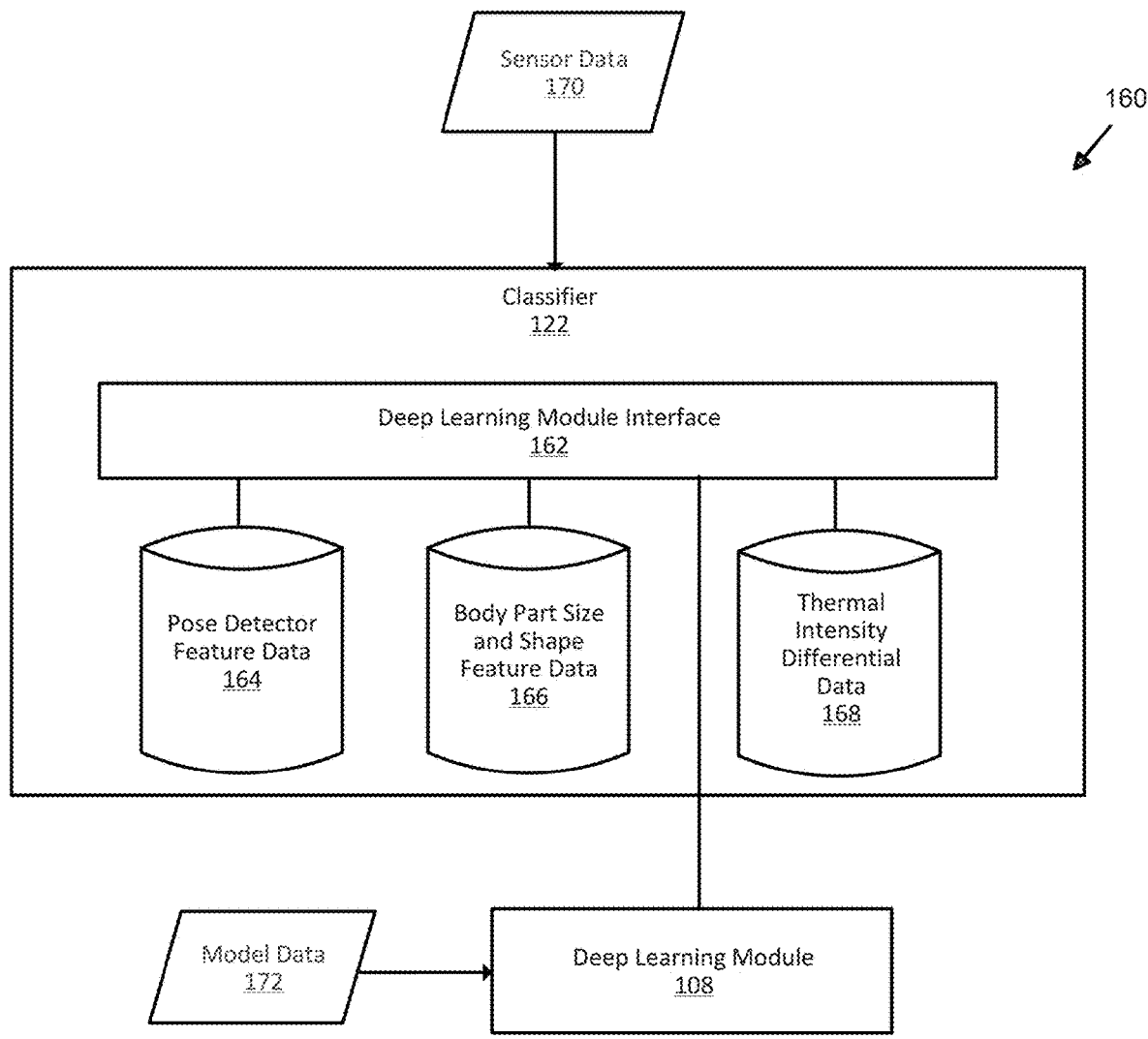
FIG. 1B illustrates an exemplary classifier module for analysis and deep learning modeling of sensor-based detection data in bounded aquatic environments.

FIG. 1B illustrates an exemplary classifier module for analysis and deep learning modeling of sensor-based detection data in bounded aquatic environments. Here, subsystem 160 includes classifier 122 (FIG. 1A), deep learning module interface 162, pose detector feature data 164, body part size and shape feature data 166, and thermal intensity differential data 168. In some examples, classifier 122 receives input in the form of sensor data 170 from one or more of sensors 126 and/or 144 (FIG. 1A (not shown)). As used herein, sensor data 170 may be data that is generated from processing received input to sensors 126 and/or 144. In some examples, sensors 126 and/or 144 may receive optical signals in the form of light waves received, detected and processed by optical sensors. In other examples, sensors 126 and/or 144 may be acoustic sensors configured to detect objects based on sound (i.e., acoustic, sonar, ultrasound, and others), regardless of frequency, wavelength, and propagation source and which may be ultimately converted to sound data. In still other examples, sensors 126 and/or 144 may be configured to receive electrical signals that are converted from analog to digital data using, for example, an analog-digital converter (i.e., ADC). In still other examples, different types of data may be input as sensor data 170, which is not limited to any specific data type, format, or schema and may include streaming data and datasets from various media. When sensor data 170 is received by classifier 122, deep learning module interface 162 invokes deep learning module 108 (FIG. 1A) in order to classify sensor data 170 into pose detector features, body part size and shape features, and thermal intensity differentials. As an example, video captured by sensors 126 and/or 144 (above water and/or underwater) are segmented by deep learning module 108 by processing sensor data 170 into pose detector feature data 164, body part size and shape feature data 166, and/or thermal intensity differential data 168. Deep learning module 108 may be trained against model data 172 in order to identify classifications for sensor data 170 that is received by classifier 122. As shown, deep learning module interface 162 may also be configured to interface with other modules such as GPU 104 (FIG. 1A) or CPU 110 (FIG. 1A) to perform other processes using sensor data 170, such as those described herein. In other examples, the quantity, type, configuration, function, or structure of system 160, classifier 122, and the elements shown may be varied and are not limited to the descriptions provided.

Figure 1C:
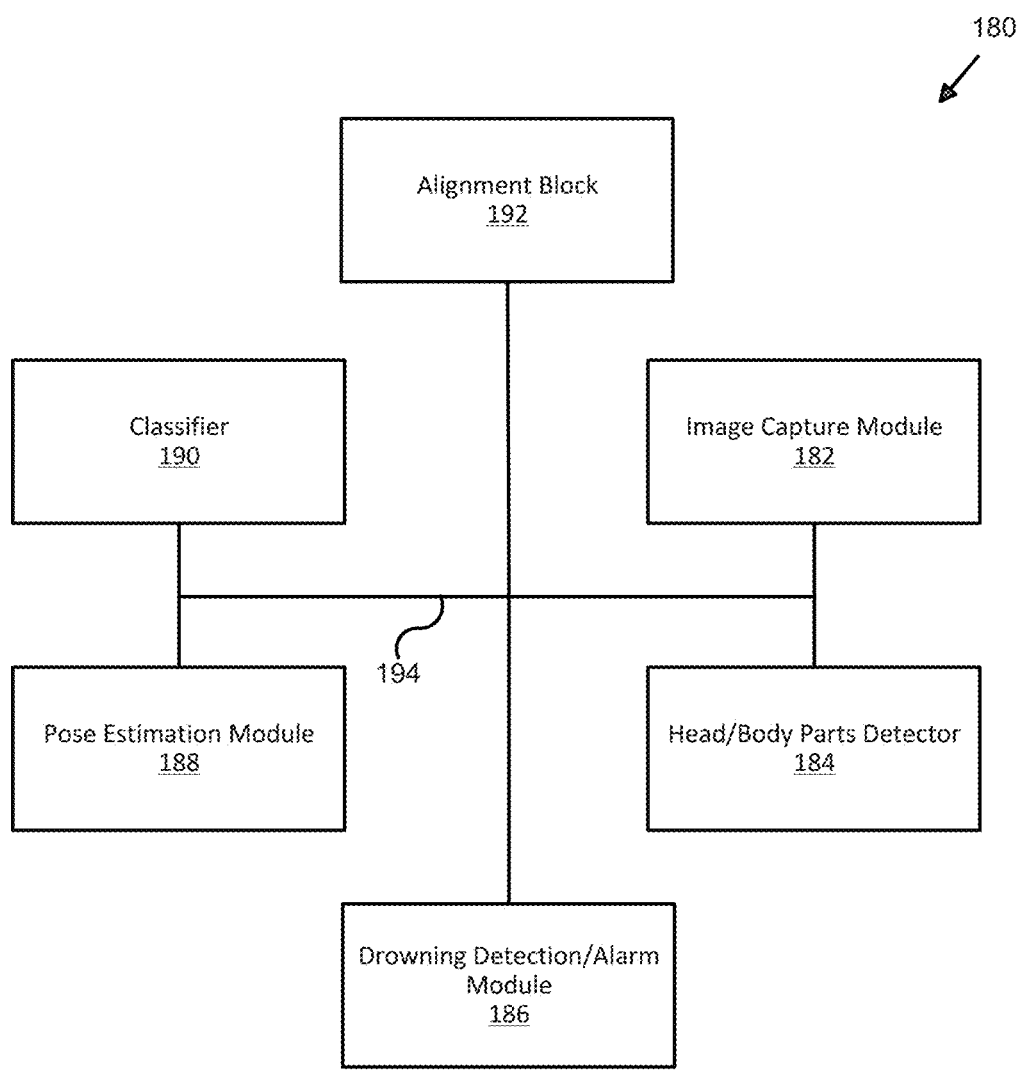
FIG. 1C illustrates an exemplary block modular architecture for analysis and deep learning modeling of sensor-based detection data for organic motion determination in bounded aquatic environments.

FIG. 1C illustrates an exemplary deep learning system architecture for analysis and deep learning modeling of sensor-based detection data for organic motion determination in bounded aquatic environments. In some examples, system 180 includes image capture module 182, head/body parts detector 184, drowning detection and alarm module 186, pose estimation module 188, classifier 190, alignment block 192, all of which are configured to transfer data, including signals, voltages, or any other means, type, or format of transmitting and receiving information between elements 182-192, over or using data bus 194. Here, system 180 may be designed, implemented, and configured to perform various functions associated with drowning detection by using deep learning algorithms to process data resulting from other processes such as, for example, head detection, body part detection, pose estimation, point estimation (of points determined by coordinate determination of detected body parts such as a head underwater), among others, without limitation or restriction. As shown, system 180 includes image capture module 182, which may include cameras, apertures, lenses, or any type of image capturing device (not shown).

In some examples, image capture module 182 may refer to a single or multiple camera system in which cameras may be placed at various points about a bounded aquatic environment (e.g., swimming pool, lake, pond, harbor, bay, or the like, without limitation), including above a waterline (i.e., above water), below a waterline (i.e., underwater), or at a waterline. A multi-camera implementation of image capture module 182 may include cameras placed not only at various points around a bounded aquatic environment, but also above and underwater in order to capture images of objects, persons, bodies, animals, or other inanimate or animate objects that may exhibit organic or inorganic motion that are floating or partially or fully submerged. As used herein, "organic motion" may refer to motion that originates or emanates from an animate object such as a human or other animal that, as discussed below, when partially or fully submerged, may be imaged by image capture module 182 and processed using one or more deep learning algorithms to determine whether irregular motion or movement is detected and whether other conditions are present so as to enable system 180 to determine a drowning condition exists and, if so, to trigger an alarm (such as those described herein). "Inorganic motion," in some examples, may refer to motion associated with an inanimate object (i.e., non-human, non-animal, non-organic, or the like) that, in some examples, does not exhibit irregular motion such as that originated or emanated from an animate object such as a person. In other examples, organic or inorganic motion may be described differently and is not limited to the descriptions provided.

Here, image capture module 182 (as well as one, some, all, or none of elements 182-192) may be implemented using software, firmware, hardware, circuitry, or a combination thereof and configured to capture images, video, audio, or multimedia imagery, signals (e.g., electric, electronic, light/optical, and others, without limitation or restriction), and data. Data captured may be in various image formats such as red-green-blue (i.e., RGB), infrared, ultraviolet, and others, without limitation or restriction. As shown, image capture module 182 may be implemented to generate data that may be transferred between any of elements 182-192 over data bus 194. Techniques such as computer vision may be used to not only capture, but process data (e.g., audio, video, multimedia, still imagery, and others) from cameras placed above water, underwater, about a waterline, or otherwise disposed around and about a bounded body of water. Further, image capture module 182 may be designed, implemented, configured, or function differently than as shown and is not limited to the examples provided.

Once captured, in some examples, images may be converted or translated into data that may be transmitted (i.e., sent) to one or more of elements 184-192 over data bus 194, the latter of which may be implemented using wired, wireless, optical, or other data transmission media, without limitation or restriction. For example, images captured by cameras or other imaging devices (not shown) may be processed by image capture module 182 and converted into data that is transmitted to classifier 190, which may be implemented to identify one or more motion features using, in some examples, a singular or multiple deep learning algorithms. As used herein, "motion features" may refer to any aspect, attribute, feature, function, or characteristic of data that, when analyzed, indicates regular or irregular motion associated with animate, inanimate, organic, or inorganic objects or persons above or underwater. Examples of motion features are described in additional detail below in connection with FIGS. 27A-27B.

Referring back to FIG. 1C, deep learning algorithms may be used to implement the described techniques and there are no limitations or restrictions as to any particular instances. For example, deep learning algorithms such as those that implement not only self-learning techniques (i.e., evaluating input data to the algorithm against databases, data lakes, or other data gathered or collected that can be used to identify, perform rapid algorithm calculations to support machine-made determinations about input data, or otherwise classify input data based on rules, conditions, or other logic provided to support computing operations performed by deep or machine learning algorithms), but also those that can be used for image processing using neural networks (e.g., artificial, convolutional, recurrent, and others) are among a few examples of algorithmic techniques that may be used to implement classifier 120. The types of deep learning algorithms used by classifier 190 are not intended to be limiting and may be configured to process data received from image capture module 182 and head/body parts detector 184 for various purposes ranging from head detection to pose estimation to others, without limitation or restriction.

In some examples, image data from head/body parts detector 184 may be generated by processing data received from image capture devices (e.g., cameras, charge coupling devices, etc.) that are in direct or indirect data communication with image capture module 182, which is transferred to head/body parts detector 184, which processes to evaluate using computation determinations to identify body parts in the image data received. When processing and evaluating image data (i.e., data from image capture module 182), heads/body parts detector 184, in some examples, identifies body parts and assigns coordinates (relative to a given frame of reference or bounded body (e.g., bounded aquatic environment such as a swimming pool, dive tank, pool, pond, lake, bay, harbor, or the like, although any aquatic environment could use the techniques described herein) to the identified parts. Once identified, the coordinates may be transmitted by head/body parts detector 184 as data (e.g., using any type of programming, formatting, or data processing language such as Java, JavaScript, MATLAB, Python, HTML, HTML5, and many others, without limitation or restriction to any particular language, format, or protocol) to any of elements 182-192.

For example, head/body parts detector 184 processes image data received from image capture module 182 and identifies one or more bodies that are partially above water and partially underwater. Head/body parts detector 184 then identifies parts of the body and assigns coordinates (e.g., using any type of coordinate system for reference during computing processes performed by elements 182-192 of system 180), which are then transmitted to classifier 190. In other examples, alignment block 192 may also be used to process data from image capture module 182 in order to align images captured of bodies above and below water.

In some examples, alignment block 192 may be used to account for various imagery effects on captured images in an aquatic environment, above and underwater. Effects such as distortion (e.g., lens, perspective, optical, and others, without limitation or restriction), scattering, absorption, and others, without limitation or restriction, may be taken into account when aligning images in order to present a complete object (e.g., a contiguous body or shape belonging to an object, person, animal, insect, animate or inanimate object) using the techniques described herein. An aligned image (not shown) may then be processed by head/body parts detector 184 and pose estimation module 188. In some examples, pose estimation module 188 may be another computing process implemented using software, firmware, hardware, circuitry, or a combination thereof.

As described herein, pose estimation may refer to various types of data processing techniques (e.g., deep learning, machine learning, or other algorithmic techniques, without limitation or restriction) in which data (e.g., image data from image capture module 182, aligned image data from alignment block 192, detected part data from head/body part detector 184, or others) may be received and processed by pose estimation module 188. For example, deep learning or machine learning algorithms such as TensorFlow™, Torch, OpenPose, and others, without limitation or restriction, may be used to determine poses associated with various detected body(s) and part(s), as determined by head/body parts detector 184. Trained against one or more datasets (e.g., MPII, SURREAL, or others, without limitation or restriction), pose estimation may be in two or three-dimensions (i.e., "2D" or "3D") and, by evaluating coordinates associated with joints and parts of a body, various types of determinations such as poses, movement, and features (i.e., of facial or other body parts) may be determined by pose estimation module 188. Data associated with these determinations may be input to classifier 190, which may be used during process to generate various computations associated with pose estimation, joint and body part coordinates, movement, location of body parts relative to a waterline (i.e., above, below, or at a waterline of a bounded aquatic environment), and others, without limitation or restriction.

In some examples, classifier 190 (as well as other elements 182-188, 192) may be implemented using various types of software, hardware, firmware, circuitry, or combination thereof. For example, deep learning, machine learning, and other types of algorithms, without limitation or restriction, may be implemented as computing software to transform a generic computer, computing device, or computing environment into classifier 190, which is configured to receive input from elements 182-188 and 192 in order to process and generate computational determinations as to body and part detection, image alignment, movement, location, pose estimation, among others, and to generate a further determination as to whether the computed data indicates a detected body (i.e., a contiguous object or shape detected within a bounded aquatic environment) exhibits organic movement (i.e., movement emanating from the detected body and not from the surrounding environment imparting physical forces acting upon an object or body). In other words, classifier 190 is not a generic computing device, module, or computer, but instead a specialized element of system 180 that, utilizing deep learning, machine learning, or other algorithmic techniques to receive data input (e.g., digital data, analog signals, or the like) regarding captured images (i.e., from image capture module 182 and alignment block 192), detected body parts (i.e., from head/body parts detector 184), and estimated poses (i.e., from pose estimation module 188), and analyze these inputs relative using machine or deep learning algorithms to generate a coordinate-based determination that organic motion is detected and, when compared to criteria (e.g., rules, thresholds, or the like), also determine whether a drowning condition exists.

In some examples, if classifier 190 runs deep learning and/or machine learning processing and, after application of criteria (e.g., rules, quantitative or qualitative thresholds, or the like), determines a drowning condition exists, further data or signals may be generated and sent by classifier 190 to drowning detection/alarm module 186. In some examples, classifier 190 may determine whether a drowning condition exists or, outputting data to drowning detection/alarm module 186, the latter may generate said determination, either in combination or as a standalone output. Regardless of whether classifier 190 or drowning detection/alarm module 186, either in combination or individually, generates a data-driven determination that a drowning condition exists, an output signal (not shown) may be generated from drowning detection/alarm module 186 that triggers an alarm (not shown) such as those described herein (e.g., visual, audible, haptic, or other sensory-perceptible alarm to alert nearby persons or personnel of a potential or actual drowning condition within a bounded aquatic environment such as a swimming pool, lake, pond, bay, harbor, or other body of water (or other fluid or liquid) having at least one non-liquid boundary or bounded side). In other examples, system 180 and elements 182-194 may be designed, configured, or implemented differently and are not limited to the examples shown and described.

Figure 2:
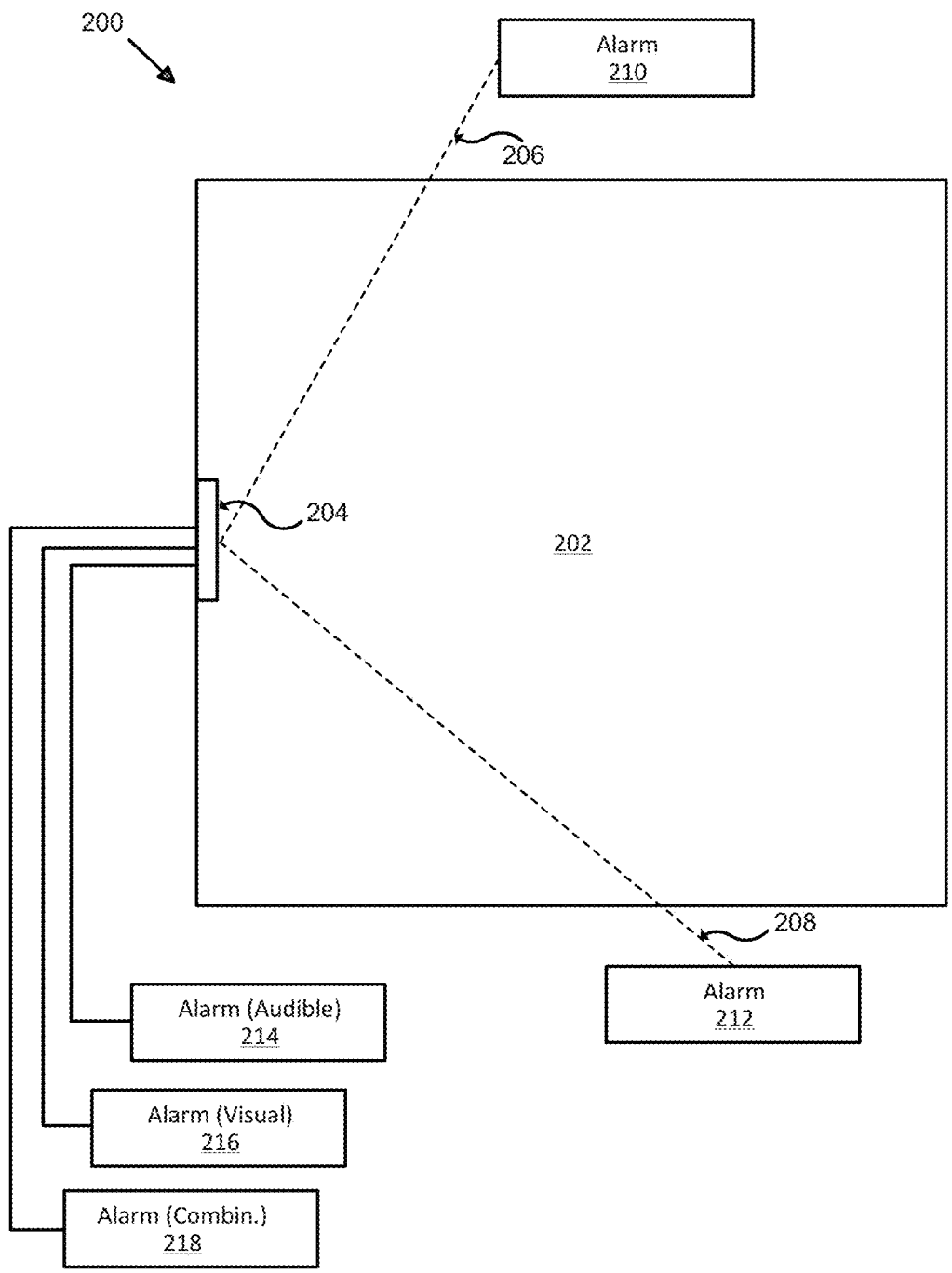
FIG. 2 illustrates another exemplary system for analysis and deep learning modeling of sensor-based detection data in bounded aquatic environments.

FIG. 2 illustrates another exemplary system for analysis and deep learning modeling of sensor-based detection data in bounded aquatic environments. Here, top view 200 shows a bounded area (e.g., an aquatic environment such as a body of water) 202 in which system 204 is implemented (partially above water, partially underwater, as described in greater detail below) with at least one sensor (not shown). In some examples, at least one or more elements of application 102 (FIG. 1A) may be implemented with system 204. In other examples, system 204 may be an implementation of application 102 (FIG. 1A). As shown, system 204 may be coupled via data communication links 206-208 to alarms 210-212, respectively. Data communication links 206-208 may be implementing using wired, wireless, optical, radiating, or other data communication technologies in order for signals and/or data to be transferred between system 204 and alarms 210-212. System 204 may also, in some examples, include one or more sensors (e.g., sensors 126 and/or 144 (FIG. 1A)) that are configured to detect objects within bounded area 202. Sensors (not shown) may be implemented and detected objects may be classified as person or non-person objects. Classifier 122 may be configured to classify detected objects based on pose features, body part sizes or shapes, and/or thermal intensity (i.e., the thermal image of a person is configured to be read, detected, or sensed differently than inanimate, colder non-person objects). Once detected, classified, associated, and tracked, a determination may be made as to whether to trigger one, some, or all of alarms 210-218. In some examples, one or more of alarms 210-218 may be triggered when a timer activated by system 204 reaches or exceeds a given threshold. As described in greater detail below, a timer may be set when sensor(s) (not shown) of system 204 provide input that, when processed, classifies body parts such as a body (e.g., torso, trunk, legs, appendages, and the like) and head as being associated with a person and said head is detected and tracked underwater (i.e., below a waterline) for an amount of time at or after which a drowning state is assumed to exist. A drowning state may be one of several states that system 204 can transition into or through, which is described in greater detail below in connection with FIG. 21.

Referring back to FIG. 2, alarms 210-218 may of various types of alarms. In some examples, one or more of alarms 210-218 may be directly coupled to system 204 using wired electrical connections that, when a drowning state is detected (i.e., a state in which a tracked person(s), trigger an audible, visual, or other perceptible alarm to alert nearby individuals to a potential drowning occurring. Alarms may also be, in some examples, automatically generated messages such as text (e.g., short messaging system ("SMS"), Internet Relay Chat ("IRC"), iMessages®, or others), electronic mail ("email"), voice calls, or the like. Further, alarms may also be triggered and generate automatic calls, messages, or other signals to be sent to emergency services for medical, paramedical, fire, police, or other similar services to respond to the location of a prospective victim detected as being in a drowning state. In other examples, one or more of alarms 210-218 may also be in data or electrical communication with system 204 using wireless links to transfer data and/or power (e.g., inductive, magnetic, or the like) and, likewise, are configured to provide an audible, visual, haptic, pyrotechnic, thermal, vibrational, or otherwise perceptible alarm when triggered (i.e., when a drowning state activates a timer that reaches a pre-determined threshold). In still other examples, a combination of different types of alarms may be implemented with system 204 in order to alert nearby personnel if a detected person in bounded area 202 whose classified body parts are tracked and a condition is detected (i.e., a drowning state) that results in sending a signal from system 204 to activate a timer as a condition precedent to triggering an alarm. In other examples, the quantity, type, configuration, function, or structure of system 204 and the elements shown may be varied and are not limited to the descriptions provided.

Figure 3A:
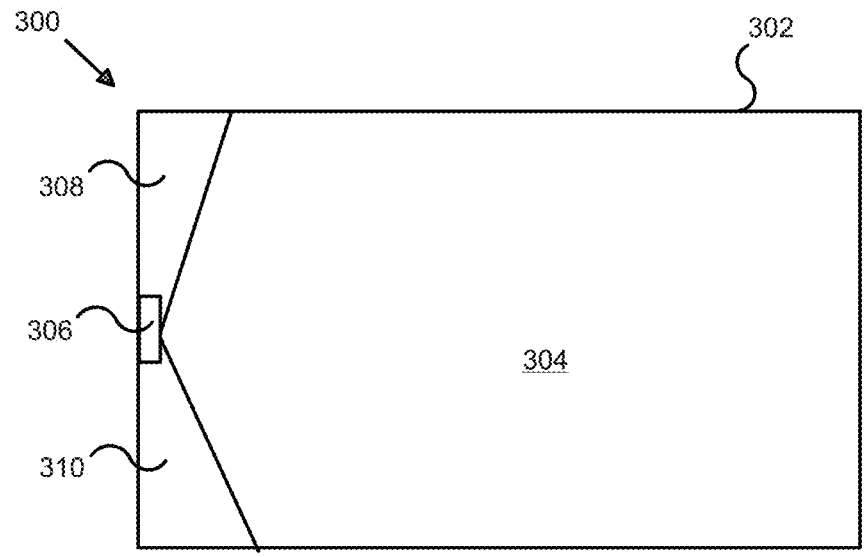
FIG. 3A illustrates an exemplary sensor arrangement in a system for analysis and deep learning modeling of sensor-based detection data in bounded aquatic environments.

FIG. 3A illustrates an exemplary sensor arrangement in a system for analysis and deep learning modeling of sensor-based detection data in bounded aquatic environments. Here, view 300 is an "aerial" or top view illustrating bounded area 302 within which field of view 304 is configured to be sensed (passively (i.e., awaiting detection of one or more input stimuli, conditions, attributes, or the like) or actively (i.e., by generating from an originating sensor an output that may be used to measure or sense a return input (e.g., sonar, radar, lidar, or the like)) by tile unit 306. Regions 308-310 fall outside of field of view 304, but can be covered by overlapping fields of view provided by other sensors (not shown) implemented with tile unit 306, which may be placed on different sides or surfaces of bounded area 302. "Tile unit" (e.g., tile unit 306) may refer to a unit, chassis, package, substrate, or housing configured to include one or more sensors and one or more elements of application 102 (FIG. 1A) that are configured to perform processes as described herein, without limitation or restriction. In some examples, tile unit 306 may be integrated within the structure of bounded area 302 or may be placed after a bounded area (e.g., a swimming pool) has been constructed, as described in greater detail below. In other examples, tile unit 306 may be implemented and configured differently in function and/or structure.

As an example, bounded area 302 may be a swimming pool that is rectangular in shape. A wide angle sensor or sensor array (not shown) may be implemented and co-located with system 306, which is configured to detect objects within field of view 304. Regions 308 and 310 remain outside of field of view 304. However, placing another system, as described in greater detail below in connection with FIG. 3B enables regions 308 and 310 to also be sensed by one or more sensors placed elsewhere in order to provide overlapping sensor coverage. In other examples, the quantity, type, configuration, function, or structure of the elements shown may be varied and are not limited to the descriptions provided.

Figure 3B:
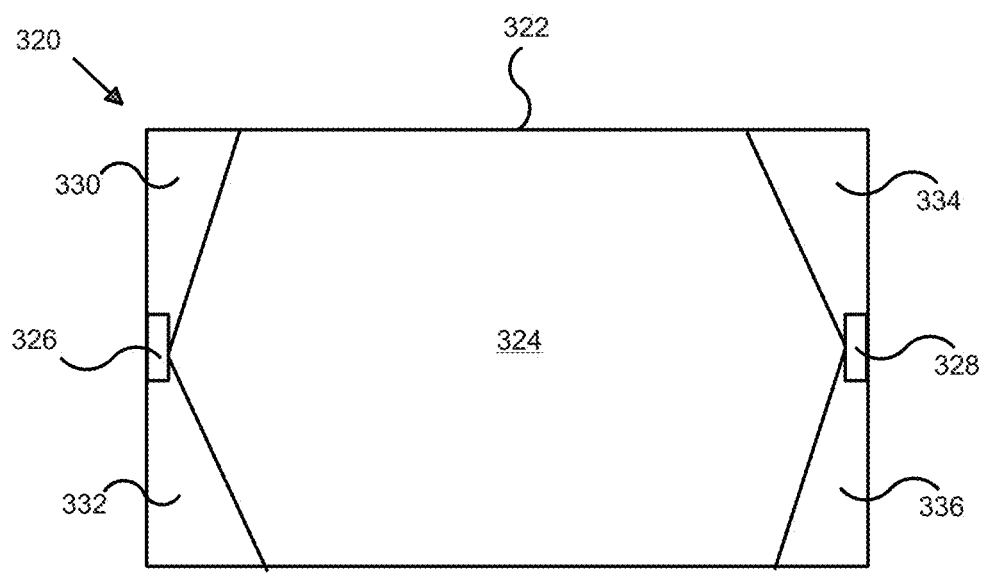
FIG. 3B illustrates an alternative exemplary sensor arrangement in a system for analysis and deep learning modeling of sensor-based detection data in bounded aquatic environments.

FIG. 3B illustrates an alternative exemplary sensor arrangement in a system for analysis and deep learning modeling of sensor-based detection data in bounded aquatic environments. Here, view 320 illustrates another "aerial" or top view of bounded area 322 (e.g., an aquatic environment such as a swimming pool, pond, dive tank, children's wading pool, or the like), field of view 324, tile units 326-328, and regions 330-336. In some examples, multiple tile units (e.g., tile units 326-328) may be positioned in bounded area 322 to provide field of view 324 and also be configured to detect objects (i.e., person or non-person) in regions 330-336. For example, tile unit 326 may be positioned to sense field of view 324 and regions 334 and 336, which may be "cutout" areas (i.e., regions not observable beyond a wide angle field of view of tile unit 328). Similarly, tile unit 328 may be implemented and positioned in bounded area 322 to sense field of view 324 and regions 330 and 332. In still other examples, different tile units having 180 degree fields of view may be implemented, thus eliminating regions 330-336 entirely and/or the need to use multiple tile units. Further, additional tile units having fields of view of wide angle camera apertures that are less than 180 degrees, but can be placed at other points around bounded area 322 to increase accuracy and efficacy of detection, classification, association, tracking, and other processes as described herein. In other examples, the quantity, type, configuration, function, or structure of the elements shown may be varied and are not limited to the descriptions provided.

Figure 4A:
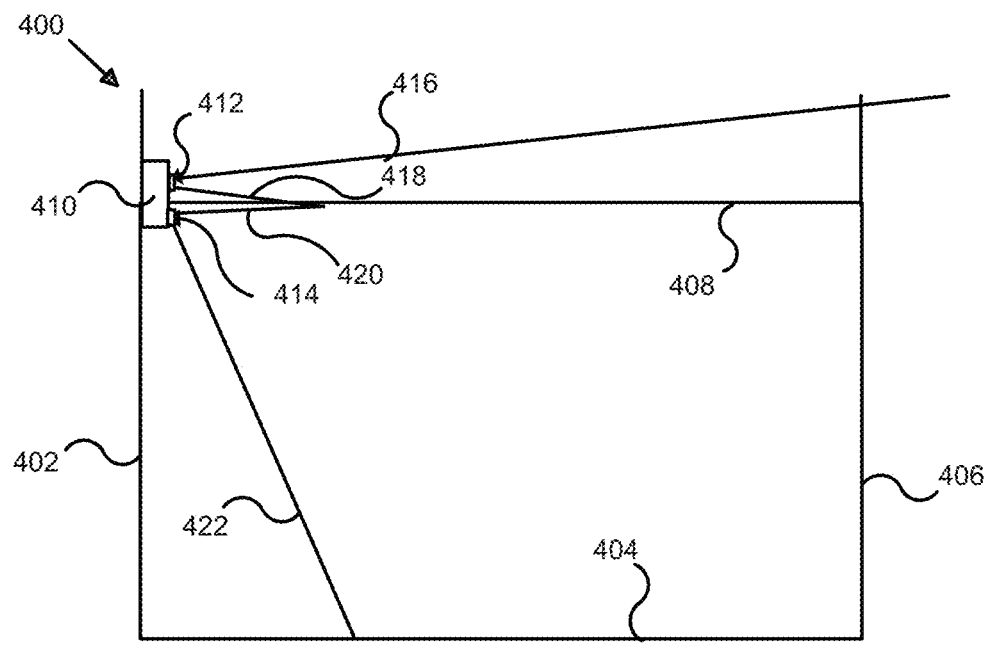
FIG. 4A illustrates a cross-sectional view of an exemplary system for analysis and deep learning modeling of sensor-based detection data in bounded aquatic environments.

FIG. 4A illustrates a cross-sectional view of an exemplary system for analysis and deep learning modeling of sensor-based detection data in bounded aquatic environments. Here, bounded area 400 includes side 402, bottom 404, side 406, waterline 408, tile unit 410, sensors 412-414, and field of view boundaries 416-422. In some examples, tile unit 410 may be implemented to provide one or more functions and processes such as those described above in connection with FIG. 1A, using sensors 412-414. Sensor 412, in some examples, may be configured to have an upper field of view boundary (i.e., boundary 416), and a lower field of view boundary (i.e., boundary 418) to provide sensor coverage above water line 408. Regions outside of boundaries 416-418 may be covered using other tile units and sensors placed elsewhere (not shown).

Similarly, tile unit 410 may include sensor 414, which may be implemented (e.g., positioned) below waterline 408 in order to provide a field of view coverage between boundaries 420 and 422. Once placed, sensors 412-414 may be calibrated against waterline 408 in order to determine an interface between the air (i.e., gaseous (not shown)) and water (i.e., liquid area bounded by waterline 408, side 402, bottom 404, and side 406) in order to calibrate for refractions and total internal reflection. Determining waterline 408 (i.e., the level of water or liquid in bounded area 400) and calibrating sensors 412-414 may be used to determine when the head of a detected person is in close proximity to the water surface (i.e., waterline 408). Once waterline 408 is breached by a head of a detected person, tracking and, more importantly, state determination processes are performed to determine whether a timer should be activated prior to sounding an alarm (e.g., alarms 210-218 (FIG. 2)). While waterline 408 may be assumed to be a planar surface (i.e., the surface of a swimming pool may be assumed to be planar when still), stereo reconstruction of sides 402 and 406 may be performed in order to determine waterline 408. In other examples, as mentioned above, one or more planar homography transformation processes may be performed to determine waterline 408. In some examples, the type, configuration, function, filters, polarizers, apertures, or other hardware or software-related features of tile unit 410 and sensors 412-414 may be varied and are not limited to duplicating the same features or functions of the other. In other words, sensors 412-414 may be different types of sensors that are configured, for example, to sense above-water media (i.e., sensor 412) and underwater media (i.e., sensor 414). In some examples, objects may be partially or fully submerged in liquid (e.g., water) within bounded area 400. Sensors 412-414 may be implemented using above-water and underwater cameras (e.g., one type of optical sensor, but which neither limiting nor restricting in terms of implementation, design, configuration, or function) that are mounted within, on, apart from, or in proximity to tile unit 410. Sensor 412 may be an optical sensor configured to detect objects (as used herein, "object" may refer to a person or non-person object, animate or inanimate body, without limitation or restriction) above water while also suppressing reflections of lights cast on the surface of waterline 408. Processing by one or more elements of application 102 (FIG. 1A) housed or installed in tile unit 410 may be performed in order to suppress images of reflections obtained by sensor 412. Likewise, sensor 414 may be configured as another camera or optical sensor receiving imagery below waterline 408 and may also be configured to suppress total internal reflections from the waterline. Performing processes such as depth estimation of detected features, range estimation, associations of detected objects above-water with detected objects underwater (i.e., associating a detected above-water portion of a person with a detected underwater portion of the same person), correspondence of detected objects to individual persons or non-persons, tracking of persons, and others, may be performed by tile unit 410 using sensors 412-414. Using reflection-suppressed views obtained from sensors 412-414 (i.e., sensors placed above-water and underwater (i.e., below-water)), detected features of objects within bounded area 400 can be matched and, using depth estimation of said features, associations of those features with detected individual persons can be accurately performed, in some examples. In other examples, geometric fundamental matrix constraints may also be used to eliminate inaccurate associations of above-water and below-water detected features (as used herein, "underwater" and "below-water" may be used interchangeably without difference in meaning or interpretation). Further, correspondence of features may be further enhanced by using one or more range scanners (not shown) with tile unit 410 and calibrating these for above and below-water placement and operation. Range information provided by range scanners (not shown) can be used during the processing of sensory input received by sensors 412-414 to improve the accuracy of associations and correspondence of detected features by sensors 412-414. As used herein, "association" refers to associating above-water detected features (or portions thereof) with underwater-detected features (or portions thereof) as being attributable to the same person or object. "Correspondence," as used herein, refers to the attribution of a person or non-person detected and whose features have been associated so as to render and enable tracking of the person or non-person accurately. Correspondence ensures that application 102 (FIG. 1A) is able to accurately track persons or non-persons in order to assign and monitor states associated with each, which may be used, in some examples, to determine a potential drowning situation and activate one or more alarms to such condition. In still other examples, one or more processes may be performed remote from and not locally at tile unit 410.

Areas not falling within those bounded by boundaries 416-422 may be sensed by using, for example, wide angle apertures on cameras or optical sensors (e.g., apertures at or near 180 degrees of coverage) that provide fields of view at or substantially near 180 degrees along the horizontal and/or vertical axes of placement of sensors 412-414. In other examples, areas not falling within boundaries 416-422 may be observed (i.e., sensed) by another tile unit having sensors (not shown) that are configured to observe and detect objects within the cutout areas of tile unit 410 and sensors 412-414. Sensors 412-414 may be calibrated and configured to perform various processes, such as those described above in connection with FIG. 1A and elsewhere in this description. For example, sensors 412-414 may be configured to map the 3D space bounded by waterline 408, side 402, bottom 404, and side 406. Bottom mapping of a bounded area such as a swimming pool floor may be performed by sensor 414 underwater (i.e., below waterline 408) using various techniques such as multi-view stereo. Assumptions, in some examples, may be made that bottom 404 has a planar surface (e.g., smooth and not an obstructed bottom contour) that can be used to regularize (i.e., normalize) calculations performed by tile unit 410 for stereo estimation. If bottom 404 is planar (i.e., smooth as with a plastered swimming pool surface), homography transformations may be used to map the floor using stereo estimation. Alternatively, if bottom 404 is non-planar (as shown below in connection with FIG. 4B), then mapping of a bottom surface or contour may be performed using stereo reconstruction with multiple sensors. In some examples, active illumination-based techniques can also be used to generate light patterns that, when reflected back to the receptors (not shown) of sensor 414 (underwater) are used to generate a map. Illumination, as described herein, may refer to point, diffuse, spread, or other patterns of lighting, without limitation or restriction. Mapping, in some examples, may employ deep learning module 108 (FIG. 1A), which references, compares, and analyzes sensor data from sensor 414 against model data 130 and/or 152. Model data 130 and/or 152 may include data, datasets, databases, and data models of images of bottom contours and surfaces that, when processed against sensor data from sensor 414, can generate a map of bottom 404. Sensors 412-414 may be implemented as optical sensors (e.g., cameras) that can be calibrated for self-stabilization, lens placement, thermal expansion, when tile unit 410 is placed on a wall or side of bounded area 400 such as side 402. In other examples, the quantity, type, configuration, function, or structure of the elements shown may be varied and are not limited to the descriptions provided.

Figure 4B:
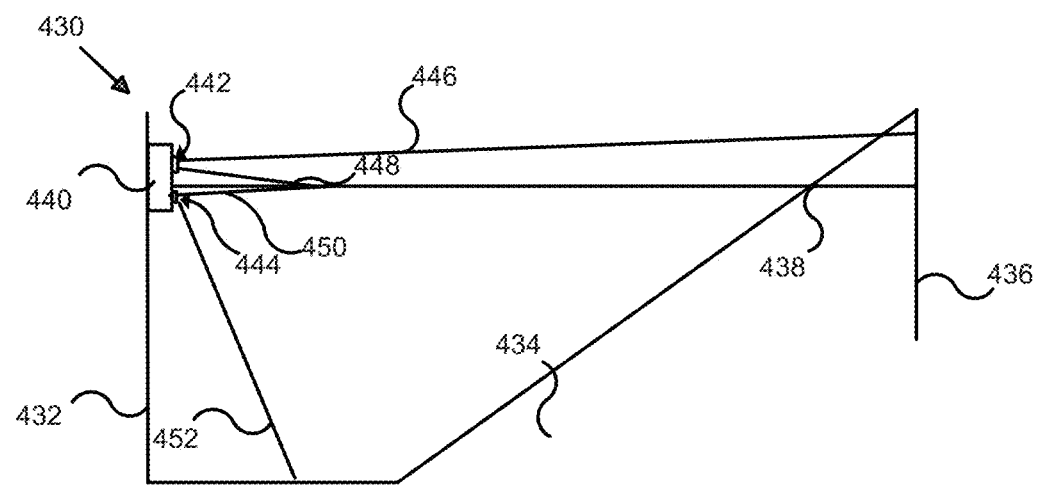
FIG. 4B illustrates an alternative cross-sectional view of an exemplary system for analysis and deep learning modeling of sensor-based detection data in bounded aquatic environments.

FIG. 4B illustrates an alternative cross-sectional view of an exemplary system for analysis and deep learning modeling of sensor-based detection data in bounded aquatic environments. Here, bounded area 430 is shown with side 432, bottom 434, side 436, waterline 438, tile unit 440, sensors 442-444, and boundaries 446-452. As described above, sensors 442 and 444 may be placed above and below, respectively, waterline 438 and used to perform processes similar to those mentioned above. Alternatively, bottom 434 is planar below tile unit 440, but then slopes upward (i.e., becomes non-planar) towards side 436. Instead of using a homography transformation to map the bottom, using tile unit 440 and sensor 444, segmentation techniques in combination with deep learning modeling provided by deep learning module 108 (FIG. 1A) and model data 130 and/or 152 (FIG. 1A) may be used to map bottom 434. Specifically, bottom 434 may be segmented into two different planar (i.e., planar, but of different slope values) surfaces, both of which comprise bottom 434. Mapping may be performed by using processed input from deep learning module 108 (FIG. 1A), which is configured to compare images (e.g., still images, video, tracklets, or the like) of segments of bottom 434 to deep learned images gathered from model data 130 and/or 152. Images of various aquatic bottom surfaces (e.g., pool bottom surfaces and contours) may be used to compare images captured by sensor 444 to identify and map bottom 434. Further, any imagery captured by sensors 442 and 444 may be saved to one or more databases (e.g., sensor data 128, 154, model data 130, 152, background data 132, 150, and tracking data 134, 148). In other examples, the quantity, type, configuration, function, or structure of the elements shown may be varied and are not limited to the descriptions provided.

Figure 5A:
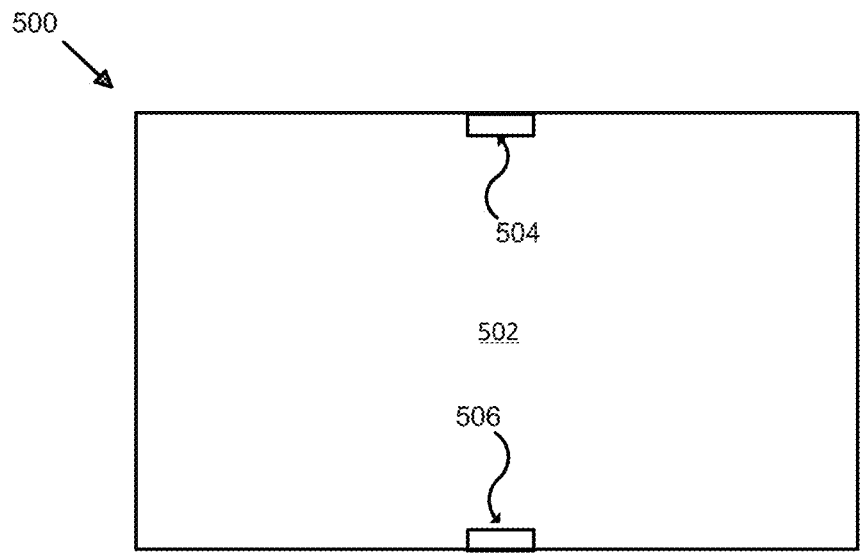
FIG. 5A illustrates a top view of an exemplary system for analysis and deep learning modeling of sensor-based detection data in bounded aquatic environments.

FIG. 5A illustrates a top view of an exemplary system for analysis and deep learning modeling of sensor-based detection data in bounded aquatic environments. Here, view 500 is a top view of bounded area 502 with tile units 504-506. Each of tile units 504-506, in some examples, is configured with one or more sensors, such as those described herein. As an example, if tile units 504-506 have integrated sensors that are configured to project a 180 degree field of view outward from the plane of the surface (e.g., pool wall) on which tile units 504-506 are mounted, bounded area 502 can be monitored for detection of objects completely by one of tiles units 504 or 506. In other examples, if tile units 504-506 have less than 180 degree fields of view, placements such as those depicted here may be used to provide overlapping coverage of sensor fields of view. The position and placement of sensors may be varied and are not limited to those shown. Further, the techniques described herein may be implemented using tile units 504-506 including sensors and sensor arrays, physical and/or virtual (hereafter referred to as "sensors"), in various positions for use and operation in bounded areas of varying sizes.

Figure 5B:
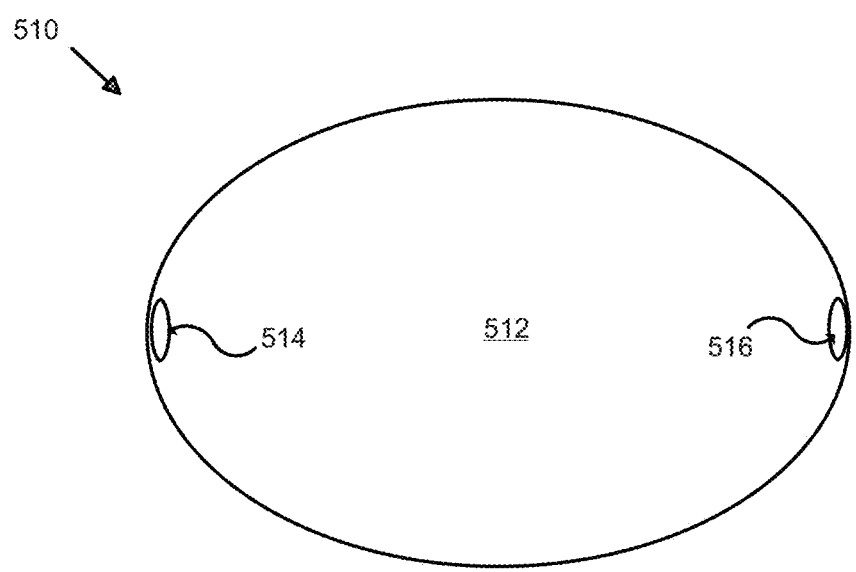
FIG. 5B illustrates an alternative top view of an exemplary system for analysis and deep learning modeling of sensor-based detection data in bounded aquatic environments.

FIG. 5B illustrates an alternative top view of an exemplary system for analysis and deep learning modeling of sensor-based detection data in bounded aquatic environments. As an example of a non-rectangular area to be sensed, view 510 shows bounded area 512 includes tile units 514-516. Bounded areas such as bounded area 512 may be irregular or regular in size, shape, and geometry. Bounded area 512 may be symmetrical, asymmetrical, oblong, distorted, or of any other size or shape, without limitation or restriction. For purposes of illustration, bounded area 512 includes tile units 514-516, which may be implemented with varying quantities and types of sensors such as those described herein. Here, tile units 514 and 516 may be configured to provide 180 degree fields of view as measured outward from the axial plane on which tile units 514-516 are coupled (e.g., mounted, tiled, cemented, adhered, or otherwise attached, regardless of whether permanent or detachably coupled). Further, by disposing (i.e., positioning, placing, and the like) tile units 514-516 at substantially opposing ends of bounded area 512, corresponding fields of view of sensors in each may overlap. In other examples, the quantity, type, configuration, function, or structure of the elements shown may be varied and are not limited to the descriptions provided.

Figure 6A:
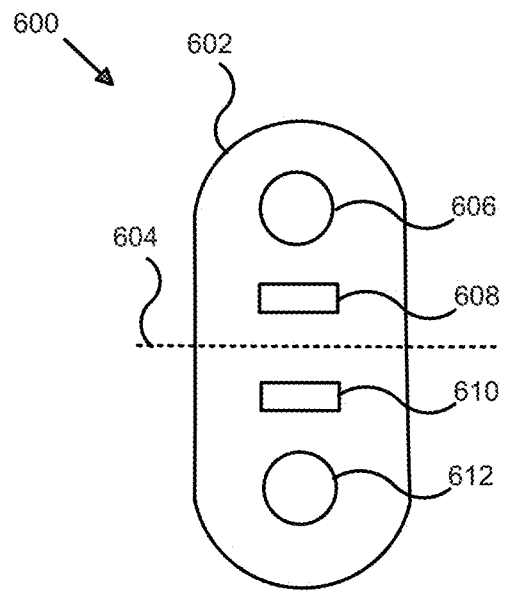
FIG. 6A illustrates an exemplary sensor array for analysis and deep learning modeling of sensor-based detection data in bounded aquatic environments.

FIG. 6A illustrates an exemplary sensor array for analysis and deep learning modeling of sensor-based detection data in bounded aquatic environments. Here, view 600 illustrates tile unit 602, which may be placed at waterline 604 such that sensors 606-608 are configured for above-water sensing and sensors 610-612 are disposed below waterline 608 for underwater detection. In some examples, multiple sensors may be implemented such as sensors 606-612, but may be varied in type, function, features, and detection or sensing methods. For example, sensor 606 may be a single optical sensor, tilt-shift sensor, sensor array, virtual sensor, virtual camera, electrical, thermal, active illumination-based, or other type of sensor. Sensor 606 may also be configured to detect above-water objects as it is housed in tile unit 602 above waterline 604. In some examples, sensor 608 may be used to provide an illumination source (e.g., beam, dwell, light sheet, light curtain, or the like) that, when intervened or interrupted, may cause sensor 606 to detect said event. In some examples, sensor 608 may also be used to implement an above-water range finder configured to provide depth and/or distance of detected above-water objects (e.g., above-water body parts or head of a person, above-water portions of a floating object (person or non-person), above-water objects that may be classified as background features such as pool coping, walls, steps, tile, or the like). Further, sensor 608 may be an illumination source for sensor 606 to capture images in darkness or low light conditions. For example, sensor 608 may be a red LED or other low light level/illumination source for an infrared or near infrared ("MR") sensor that may be implemented as sensor 606. Alternatively, sensor 606 may be formed or structured to have an "illumination ring" around it. In some examples, an illumination ring may be a physical light emitting apparatus that is concentric to, disposed with, in proximity to, or otherwise implemented with sensor 606. In other examples, an illumination ring may include more than one ring or concentric circle that is implemented with sensor 606. Still further, one or more of sensors 606-612 may be implemented to detect motion, which may be used as a condition for determining a state of motionless (as described in greater detail below) and initiate a timer prior to triggering an alarm if a given threshold or time duration is met or exceeded without further detecting motion or a head portion of the body surfaces (i.e., rises above waterline 604). Other examples discussing the use of determined states (i.e., state estimation) to trigger alarms is discussed in greater detail below. In yet other examples, any of sensors 606-612 may be implemented using other detection or sensing techniques, including audible/audio/sound wave detection, wave (i.e., water wave disturbances) detection, thermal detection (i.e., detecting a monolithic "warm" body completely submerged for a period of time without breaking the surface for a given time duration) or others, without limitation or restriction.

Likewise, sensor 612 may be implemented as an underwater sensor configured to detect and receive input below waterline 604 using techniques similar to those described herein. In some examples, sensor 610 may be implemented as an illumination source for dark or low light level conditions for sensor 612, which may be a blue LED or the like. Sensor 612 may be an infrared or MR sensor that can be used to capture images underwater and in dark or low light conditions. As shown here, tile unit 602 may include any type of packaging, circuitry, software, firmware, hardware, or the like to support sensors 606-612. In other examples, the quantity, type, configuration, function, or structure of the elements shown may be varied and are not limited to the descriptions provided.

Figure 6B:
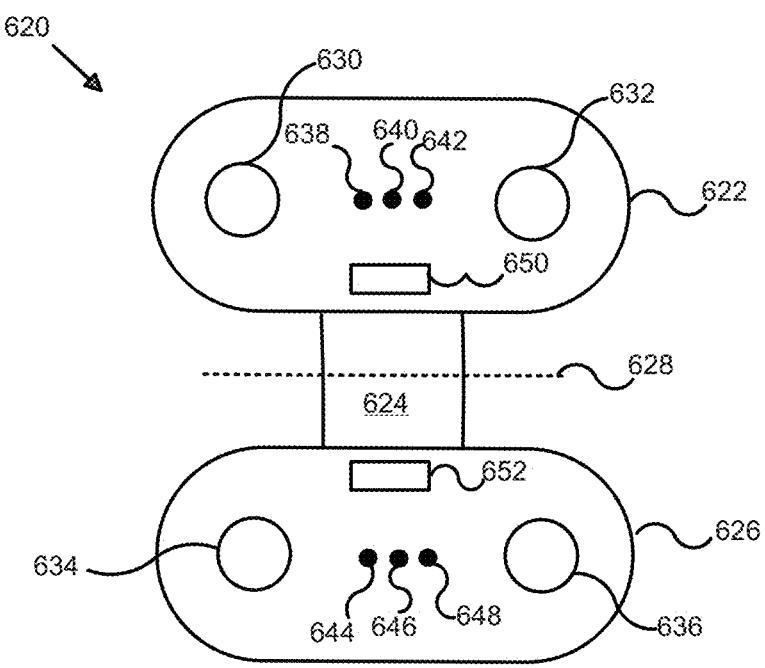
FIG. 6B illustrates an alternative exemplary sensor array for analysis and deep learning modeling of sensor-based detection data in bounded aquatic environments.

FIG. 6B illustrates an alternative exemplary sensor array for analysis and deep learning modeling of sensor-based detection data in bounded aquatic environments. Here, tile unit 620 may include upper tile unit 622, body 624, lower tile unit 626 (all of which are oriented above and below waterline 628), sensors 630-636, illumination sources 638-648, and range sensors 650-652. In some examples, upper tile unit 622 and lower tile unit 626 are coupled together, as shown here, using body 624. Tile unit 620 may be disposed by placing upper tile unit 622 above waterline 628 and lower tile unit 626 below waterline 628. In some examples, body 624, upper tile unit 622, and lower tile unit 626 may be an integrated, monolithic "body" or package configured to house sensors 630-646, illumination sources 638-648, and range sensors 650-652. Power, in some examples, for elements 630-652 may be provided by coupling tile unit 620 to an AC or DC power source (not shown) with wiring being housed within upper tile unit 622, body 624, and lower tile unit 626. In other examples, power may be provided using batteries (rechargeable or expendable) within one or more of upper tile unit 622, body 624, or lower tile unit 626. As shown in this embodiment, power may be used to energize one or more of sensors 630-636, illumination sources 638-648, or range sensors 650-652.

Here, sensors 630-632 may be implemented to detect objects above waterline 628 using, for example, various techniques such as those described above. Illumination sources 638-642 may be used to provide light sheets, light curtains, or low-light illumination for infrared or MR sensing. Further, sensors 630-632 may be implemented as RGB (red-green-blue) color channel sensing mechanisms, thermal intensity detectors, optical cameras (with wide angle apertures ranging from 160 to 180 degrees as measured from an axis of the plane on which tile unit 620 is mounted), acoustic sensors, or others, without limitation or restriction. In some examples, sensors 630-632, when implemented as cameras or optical sensing devices, can also be disposed with or coupled to one or more filters, polarizers, apertures, or electrical-mechanical or software/firmware based mechanisms to manage imaging features such as exposure, sensitivity, and other photographic attributes. As shown, sensors 630-632 may be cameras with wide angle apertures configured to sense wide angle (e.g., 160-180 degrees) fields of view during daylight or low light level conditions, without limitation or restriction.

Lower tile unit 626 may be configured to provide sensors 634-636, which may be implemented as cameras, optical sensors, or others such as those described above. Input received by any of sensors 630-636 may be transferred (e.g., copied, streamed, recorded, converted into data and transmitted, or otherwise communicated) to other elements such as modules 104-122 of application 102 (FIG. 1A). Here, when lower tile unit 626 captures images (e.g., detects motion and begins recording and/or transferring or transmitting said imagery) processing functions such as removing occlusions, caustics, reflections, and refractions from captured imagery (e.g., still images, video, tracklets, or the like) may be performed by onboard processors (e.g., GPU 104, CPU 110 (FIG. 1A)) that are housed within tile unit 620. Other processes that may be performed on imagery captured by sensors 630-636 may include performing segmentation analysis on images, videos, tracklets, or the like to map the bottom surface or contour of a body of water (i.e., aquatic environment). Still other processes may include performing initial or continuous calibrations of sensors 630-636 and range sensors 650-652.

In some examples, calibration may be performed on one or more of sensors 630-636, illumination sources 638-648 (which may also be implemented as sensors (e.g., light sheet, light curtain, or the like)), and sensors 650-652. Tile unit 620 may be calibrated upon initial placement (e.g., disposing, placing, attaching, coupling, or otherwise positioning) upon a wall or surface of an aquatic environment (i.e., body of water, swimming pool, or the like)) or afterward. For example, when initially placed, tile unit 620 may self-calibrate sensors 630-636, illumination sources 638-648, and/or sensors 650-652 to compensate for adjustments that may be required due to shipping misalignments or maladjustments. Examples of initial calibrating processes and activities may include adjusting lens placement of cameras or optical sensors implemented for sensors 630-636, adjustment for thermal expansion, image stabilization, among others, without limitation or restriction. Ongoing calibration may include, but is not limited to water level calibration of sensors 630-636, illumination sources 638-648, and sensors 650-652. Water-level calibration, in some examples, may be configured to calibrate one or more of sensors 630-636, illumination sources 638-648, and sensors 650-652 to determine waterline 628 (i.e., the air-water interface where detection of objects entering or leaving the water is detected) and to determine when a head of a person is in close proximity to the surface of the water (i.e., waterline 628). In some examples, techniques for stereo reconstruction of the sides or walls of an aquatic environment may be performed using segmentation techniques such as those described herein or a planar homography transformation may be used to determine the water level (i.e., waterline 628) for purposes of calibration for accurate detection. In some examples, once determined, a plane associated with waterline 628 may be projected to all cameras, optical sensors, or other sensors such as sensors 630-636 of tile unit 620 or other sensors implemented with other tile units.

In other examples, sensors 630-636 and range sensors 650-652 may be configured to detect background and foreground features that are processed by local or remote processors (e.g., GPU 104, CPU 110 (FIG. 1A)) in order to remove and classify background features such as walls, steps, filter intakes, tile coping, or other immovable or fixed features associated with a body of water such as a swimming pool.

As described herein, input detected and captured by sensors 630-636 or range sensors 650-652 may include background features of an aquatic environment. In other examples, one or more of sensors 630-636, illumination sources 638-648, or range sensors 650-652 may be implemented using sensor techniques apart from those described herein, without limitation or restriction. Here, background features may include walls, bottom surfaces and contours, steps, trees, light poles, statues, posters, furniture such as pool chairs, tables, reflections of persons outside of the aquatic environment (e.g., persons or animals walking around or near the perimeter of a swimming pool), double reflections of persons in a pool, or the like. Using deep learning module 108 and model data 130/152 (FIG. 1A), background features can be processed for removal from a captured image feed from one or more of sensors 630-636. For example, processing may be performed by GPU 104 (FIG. 1A) such as detection and association of images captured by sensors 630-636 using deep learning module 108 (FIG. 1A) to compare and analyze against a database of other images to help detect (i.e., identify) and associate detected images (i.e., associate a head with a body of a detected person). CPU 110 (FIG. 1A), which may be implemented using a single or multi-core processor, may perform complementary functions such as tracking the detected/associated tracks (i.e., person or non-person objects detected by one or more of sensors 630-636), reconstructing captured imagery of detected person or non-person objects, and classifying detected objects using classifier 122, among other processes that may be performed.

Here, when background features are detected, these may be subtracted from captured imagery (i.e., still images or video) by performing various processing functions performed by GPU 104 and/or CPU 110 (FIG. 1A) including, but not limited to, reflection enhancement and removal, caustics flicker and splash removal, water surface classification, and water distortion removal. In some examples, background subtraction may be performed continuously on captured imagery from one or more of sensors 630-636. As an example, when one or more of sensors 630-636 detect person or non-person objects (i.e., capture imagery), processes for removing background features may be performed on the captured imagery, which is then stored and processed by one or more modules 104-122 of application 102 (FIG. 1A). Reflection enhancement and removal may be performed by application 102 (FIG. 1A) on images captured by tile unit 620 to 1) remove surface reflections from objected detected by sensors 630-632 at or above waterline 628 or external to the aquatic environment and 2) remove total or aggregate reflections caused by objected detected by one or more of sensors 634-636 below waterline 628; both of these removals reduce the effects of the air-water interface on a body of water or aquatic environment in order to enhance captured imagery from sensors 630-636. In other examples, polarizers (i.e., polarizing filters) may be used on a still surface (i.e., water or liquid at waterline 628 is non-moving or moving very little) to provide an optical-mechanical feature that, when used in combination with performing a spatio-temporal analysis of pixel brightness on captured imagery, may be used to remove reflections as a part of background feature subtraction.

Caustics and splash removal, in some examples, may be performed as part of removing background features from captured imagery of sensors 630-636, by also performing a spatio-temporal analysis of pixel brightness since caustics by nature are typically bright. Specifically, spatio-temporal analysis may be performed on tracklets (i.e., short video clips taken from captured imagery or an imagery or data feed from one or more of sensors 630-636) from multiple views (i.e., multiple sensors and/or multiple tile units like tile unit 620). Other background feature subtraction processes that may be performed include water surface classification, which may be performed by segmenting captured imagery from different viewpoints (i.e., different sensors and/or different tile units positioned, disposed, or placed apart from tile unit 620) into 1) pixels associated with a surface of waterline 628 and 2) pixels associated with underwater or other water features (e.g., splashes, waves, ripples, and the like) of an aquatic environment surface. Segmentation of captured imagery, in some examples, may be performed to classify water (i.e., liquid) surfaces by using polarization differentials that show differences between captured images at two orthogonal polarization angles, where large polarization differentials may indicate water reflections whereas smaller polarization differentials may indicate detected person or non-person objects. Another technique for water surface classification may be performed by analyzing thermal intensities at waterline 628 to detect and distinguish objects (i.e., person or non-person) from the surface of water at waterline 628. In some examples, a wet body may indicate a lower thermal intensity difference when compared to a water surface. Yet another technique for classifying water surfaces may use identified RGB or MR features of captured imagery from one or more of sensors 630-636 and, using deep learning module 108 and model data 130/152, processing said imagery to identify water surfaces by comparing RGB and/or MR features against deep learned models and modeled data. In other examples, water surface classification may be performed differently.

As another process that may be included within background feature subtraction, water distortion removal may be performed by using another deep learned or machine learned model to identify a distorted water surface from a smooth water surface. Once identified, distortions may be corrected or ameliorated by applying captured imagery of one or more of sensors 630-636 to a deep learned or machine learned model to remove identified distortions, thus generated an artificial construct of smooth pool surface relative to which detected objects (person vs. non-person) may be detected, associated, classified, and tracked. In other examples, if water distortions are severe, tracklets may be selected that exhibit the least distortion and the above-technique may be run against these. In other examples, distortion removal may be performed differently and is not limited to the examples shown and described.

In still other examples, by subtracting background features from captured imagery, foreground features such as person or non-person objects may be detected, classified, associated, and tracked by sensors 630-636 and range sensors 650-652 in data communication with and working cooperatively with one or more of elements 104-122 of application 102 (FIG. 1A), as described above. In some examples, background feature subtraction, as described above and performed by tile unit 620, may be performed continuously. For example, the above-described processes using input from tile unit 620 (i.e., captured imagery from one or more of sensors 630-652) for background subtraction may be programmed and architected to be run as software by application 102 on each frame of captured imagery in temporal continuity (e.g., in temporal order, without gaps or missing frames, segments, sections, or other portions of imagery). As environmental factors change (e.g., ambient lighting and illumination, temperature, in-water temperature, air temperature, and others), the software embodying processes for background subtraction may be varied and used interchangeably, in parallel or series, or in other manners such that background subtraction is performed continuously on captured imagery from sensors 630-652. In other examples, the quantity, type, configuration, function, or structure of the elements shown may be varied and are not limited to the descriptions provided.

FIG. 7A illustrates an exemplary local system for analysis and deep learning modeling of sensor-based detection data in bounded aquatic environments. Here, system 700 includes tile units 702-704, light unit 706, conduits 708-710, above-water sensors 712-714, underwater sensors 718-720, illumination source 722, and light housing 724. In some examples, system 700 is an exemplary implementation of the techniques described herein, including processes configured to be performed by one or more of modules 104-122 of application 102 (FIG. 1A) as integrated with tile units 702-704 and light unit 706. As shown, tile units 702-704 may be placed on surface 726 (e.g., a wall, side, or other surrounding surface of an aquatic environment), which may be vertical, near vertical, or otherwise sloped to a degree such that when placed, tile units 702-704 position above-water sensors 718-720 and underwater sensors 718-720 are disposed above and below, respectively, waterline 716. Data, imagery, electrical current, power, and control signals may be transferred between tile units 702-704 and light unit 706 using conduits 708-710, which may be implemented as waterproof, sealed, insulated, or otherwise protected from electrical, electromagnetic, corrosion, electrolysis, or other effects due to placement in an aquatic environment. Further, other conduits (not shown) may couple tile units 702-704 and/or light unit 706 to a power source that is used to provide, for example, illumination source 722 with electrical current to energize one or more underwater LEDs to provide low level light for underwater sensors 718-720 to detect objects below waterline 716. Further, tile units 702-704 may be coupled, directly or indirectly, to other system components or elements not shown. For example, a hub (as described in greater detail below) may be in data and/or electrical communication with one or more elements of system 700. As described in greater detail below, a hub may be an element that is configured to provide remote functions such as an audible, visual, haptic, or other type of alarm that can be triggered in the event a timer threshold initiated when a detected head went below (i.e., penetrated, submerged, passed) waterline 716, thus entering a drowning state (as described in greater detail below in connection with FIG. 21). In other examples, power may be provided by power sources internally-housed sources (i.e., within one or more of tile units 702-704 and/or light unit 706) such as batteries (e.g., chemical, metal or otherwise). In still other examples, conduits 708-710 may be implemented for image, data, and/or signal transfer between tile units 702-704, sensors 712-714 and 718-720 and light unit 706. As described herein, control signals may be sent from tile units 702-704 to light unit 706 to enable, for example, blue LEDs to energize after a detected level of lighting by underwater sensors 718-720 indicates sunset or darkness has occurred and detection techniques using MR are switched to from RGB-based techniques. Likewise, light sources (not shown) on tile units 702-704 may be enabled by CPU 110 (FIG. 1A), power module 116 (FIG. 1A), and application 102 (FIG. 1A) to provide, for example, red LED-based light when ambient light levels have fallen below a given threshold. In other examples, the quantity, type, configuration, function, or structure of the elements shown may be varied and are not limited to the descriptions provided.

Figure 7B:
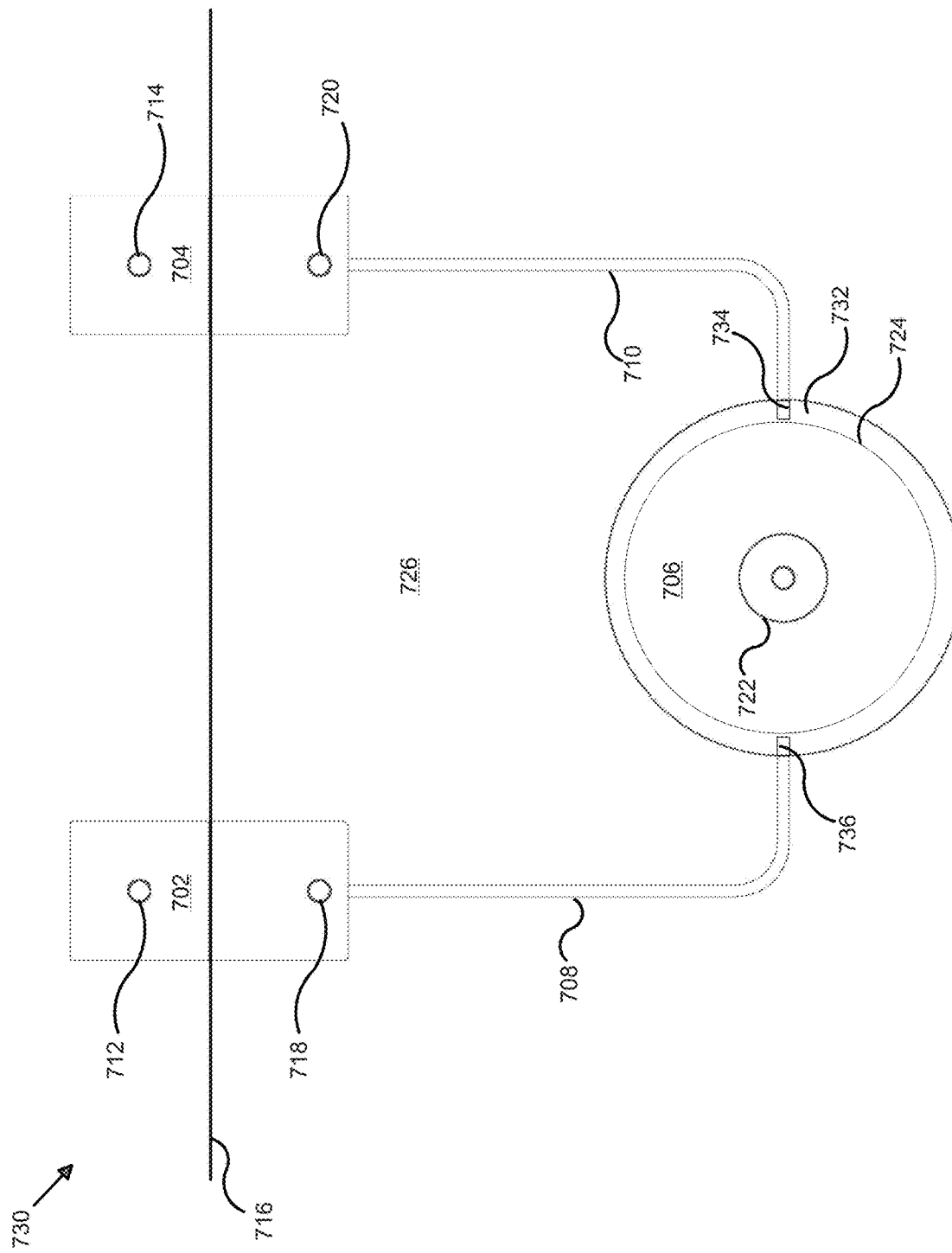
FIG. 7B illustrates an alternative exemplary local system for analysis and deep learning modeling of sensor-based detection data in bounded aquatic environments.

FIG. 7B illustrates an alternative exemplary local system for analysis and deep learning modeling of sensor-based detection data in bounded aquatic environments. Here, system 730 includes tile units 702-704, light unit 706, conduits 708-710, above-water sensors 712-714, underwater sensors 718-720, illumination source 722, light housing 724, spacer ring 732, and conduit channels 734-736. In some examples, similarly-named and/or numbered elements may be designed, configured, function, and/or implemented similarly to previously-described elements (e.g., system 730 includes elements similarly named, numbered, and configured elements such as those found in system 700 (FIG. 7A) (e.g., tile units 702-704, light unit 706, conduits 708-710, above-water sensors 712-714, underwater sensors 718-720, illumination source 722, and light housing 724)). As shown, system 730 also includes spacer ring 732 and conduit channels 734-736, the latter of which are formed (e.g., molded, cut, shaped, designed, configured, or otherwise modified) into the former to provide a passage for conduits 708-710 to pass from a power source (not shown) powering light unit 706 and illumination source 722. In other examples, conduits 708-710 may pass through conduit channels 734-736 to transfer data between one or more of light unit 706, illumination source 722, or a power source (not shown) or other data processing apparatus, and tile units 702-704, above-water sensors 712-714, and/or underwater sensors 718-720. As described herein, spacer ring 732 is described in greater detail below in connection with FIGS. 30A-30G. In other examples, system 730 and the elements shown may be designed, formed, configured, or implemented differently and are not limited to the examples shown and described.

Figure 8:
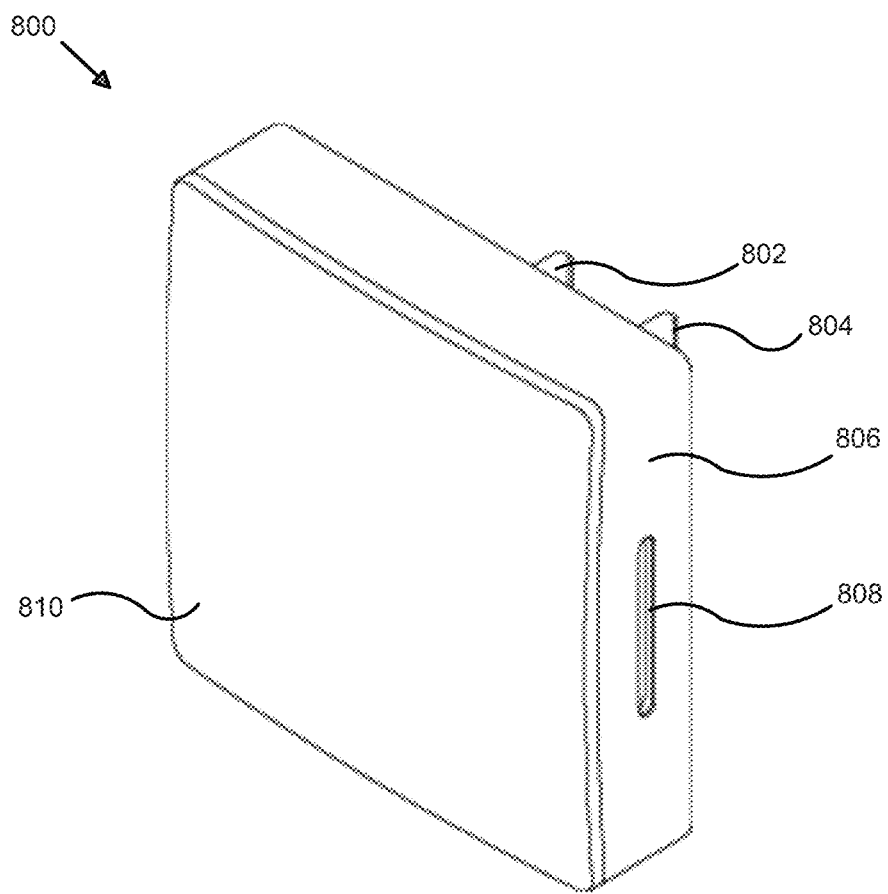
FIG. 8 illustrates a perspective view of an exemplary hub for analysis and deep learning modeling of sensor-based detection data in bounded aquatic environments.

FIG. 8 illustrates a perspective view of an exemplary hub for analysis and deep learning modeling of sensor-based detection data in bounded aquatic environments. Here, hub 800 is shown in a perspective view including electrical contacts 802-804, body 806, port 808, and front surface 810. In some examples, hub 800 may be implemented using AC or DC power such that when contacts 802-804 are placed in contact with energized positive and negative alternating current terminals, power is provided to processes and functions such as a timer (not shown), alarm (not shown), or others. For example, housed within body 806 may be an alarm that, when triggered, generates an audible, high volume sound that is configured to propagate through port 808. In other examples, more or fewer ports may be provided in body 806 to permit an audible signal to be propagated to nearby personnel to alert of a drowning event in progress (i.e., a drowning state has been determined/estimated, which initiated a timer relative to a time threshold. Once the threshold was exceeded, a control signal (e.g., electrical) or control data was sent to an alarm that was triggered and activated (i.e., energized, rendered audible, rendered visible, or the like). As described herein, hub 800 may be in data communication with one or more of modules 104-122 of application 102 (FIG. 1A) using any type of wired, wireless, optical, or other data communication protocol in addition to direct (e.g., wired) or indirect (e.g., inductive, magnetic) electrical connections, such as those described herein. In still other examples, a timer (not shown) may be implemented elsewhere and is not required to be housed within body 806. In other examples, the quantity, type, configuration, function, or structure of the elements shown may be varied and are not limited to the descriptions provided.

Figure 9A:
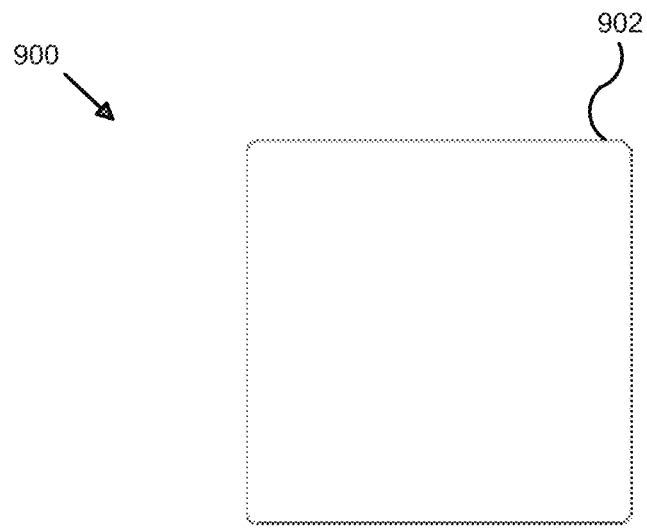
FIG. 9A illustrates a front view of an exemplary hub for analysis and deep learning modeling of sensor-based detection data in bounded aquatic environments.

FIG. 9A illustrates a front view of an exemplary hub for analysis and deep learning modeling of sensor-based detection data in bounded aquatic environments. Here, hub 900 is shown from a front view of body 902. In some examples, hub 900 and the elements shown may be implemented similarly in terms of function and structure as like-named elements described herein. In other examples, the quantity, type, configuration, function, or structure of the elements shown may be varied and are not limited to the descriptions provided.

Figure 9B:
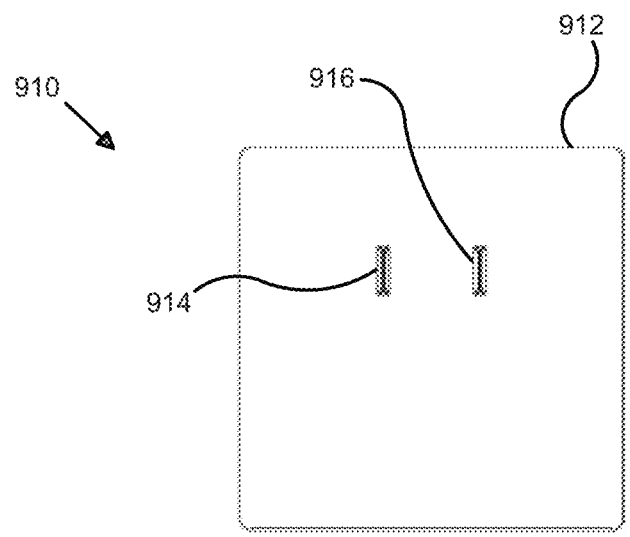
FIG. 9B illustrates a rear view of an exemplary hub for analysis and deep learning modeling of sensor-based detection data in bounded aquatic environments.

FIG. 9B illustrates a rear view of an exemplary hub for analysis and deep learning modeling of sensor-based detection data in bounded aquatic environments. Here, hub 910 is shown (from a rear perspective) with body 912 and electrical contacts 914-916. As described above, hub 910 may be configured to operate on AC electrical current and when electrical contacts 914-916 are coupled to or placed in contact with positive and negative terminals of an energized circuit, power may be provided to hub 910. In some examples, hub 910 and the elements shown may be implemented similarly in terms of function and structure as like-named elements described herein. In other examples, the quantity, type, configuration, function, or structure of the elements shown may be varied and are not limited to the descriptions provided.

Figure 10A:
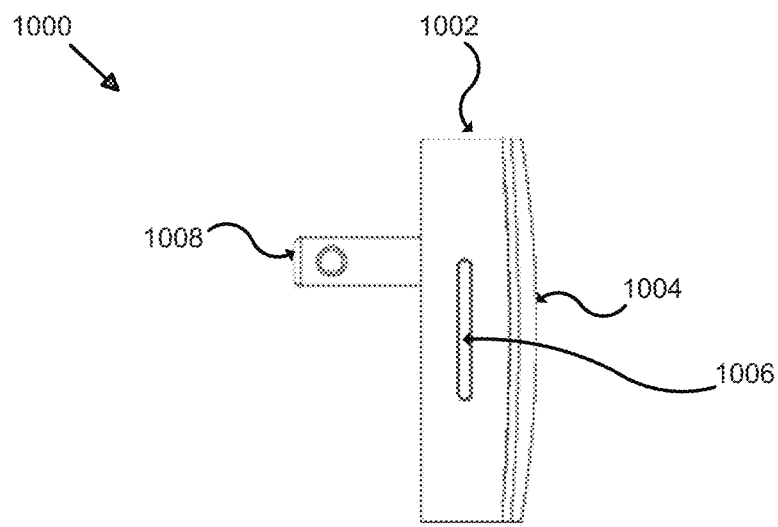
FIG. 10A illustrates a right side view of an exemplary hub for analysis and deep learning modeling of sensor-based detection data in bounded aquatic environments.

FIG. 10A illustrates a right side view of an exemplary hub for analysis and deep learning modeling of sensor-based detection data in bounded aquatic environments. Here, hub 1000 is shown from a right side view, including body 1002, front surface 1004, port 1006, and electrical contact 1008. In some examples, an alarm (not shown) implemented with hub 1000 may be configured to generate an audible alarm propagated through port 1006. Alternatively, hub 1000 may also be configured to generate a visible/visual alarm that may be propagated through front surface 1004 or, in other examples, port 1006. In some examples, hub 1000 and elements shown may be implemented similarly in terms of function and structure as like-named elements described herein. In other examples, the quantity, type, configuration, function, or structure of the elements shown may be varied and are not limited to the descriptions provided.

Figure 10B:
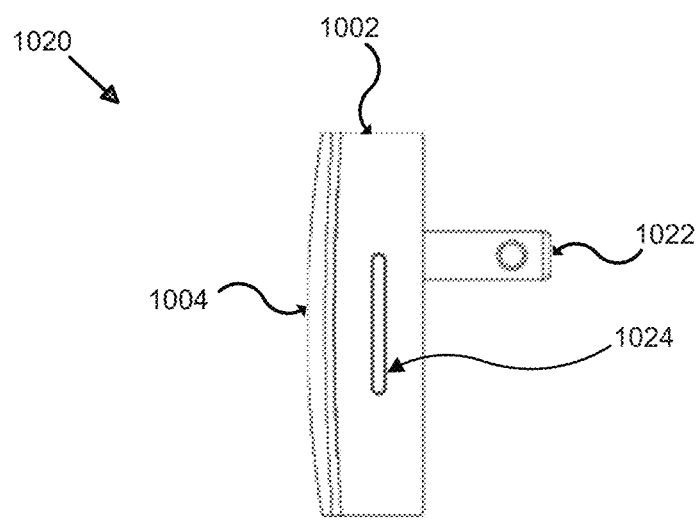
FIG. 10B illustrates a left side view of an exemplary hub for analysis and deep learning modeling of sensor-based detection data in bounded aquatic environments.

FIG. 10B illustrates a left side view of an exemplary hub for analysis and deep learning modeling of sensor-based detection data in bounded aquatic environments. Here, hub 1020 is shown from a left side view, including body 1002, front surface 1004, electrical contact 1022, and port 1024. In some examples, an alarm (not shown) implemented with hub 1020 may be configured to generate an audible alarm propagated through port 1024, which may be disposed as an opposing counterpart to port 1006 (FIG. 10A) on an opposite side of hub 1020. Alternatively, hub 1020 may also be configured to generate a visible/visual alarm that may be propagated through front surface 1004 or, in other examples, port 1024 and/or, in some examples, port 1006. In some examples, hub 1020 and the elements shown may be implemented similarly in terms of function and structure as like-named elements described herein. In other examples, the quantity, type, configuration, function, or structure of the elements shown may be varied and are not limited to the descriptions provided.

Figure 10C:
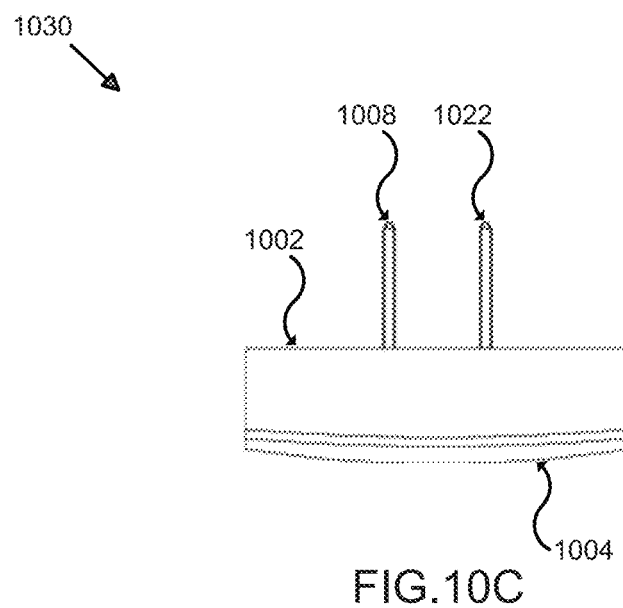
FIG. 10C illustrates a top view of an exemplary hub for analysis and deep learning modeling of sensor-based detection data in bounded aquatic environments.

FIG. 10C illustrates a top view of an exemplary hub for analysis and deep learning modeling of sensor-based detection data in bounded aquatic environments. Here, hub 1030 is shown from a top view, including body 1002, front surface 1004, electrical contacts 1008 and 1022. In some examples, an alarm (not shown) may be implemented with hub 1030 and configured to generate an audible alarm propagated through ports 1006 (not shown) and 1024 (not shown), which may be disposed on opposing sides of hub 1030. Alternatively, hub 1030 may also be configured to generate a visible/visual alarm that may be propagated through front surface 1004. In still other examples, a visible/visual alarm signal may be propagated through one or more of ports 1006 and/or 1024. In some examples, hub 1030 and the elements shown may be implemented similarly in function and structure as like-named elements described herein. In other examples, the quantity, type, configuration, function, or structure of the elements shown may be varied and are not limited to the descriptions provided.

Figure 10D:
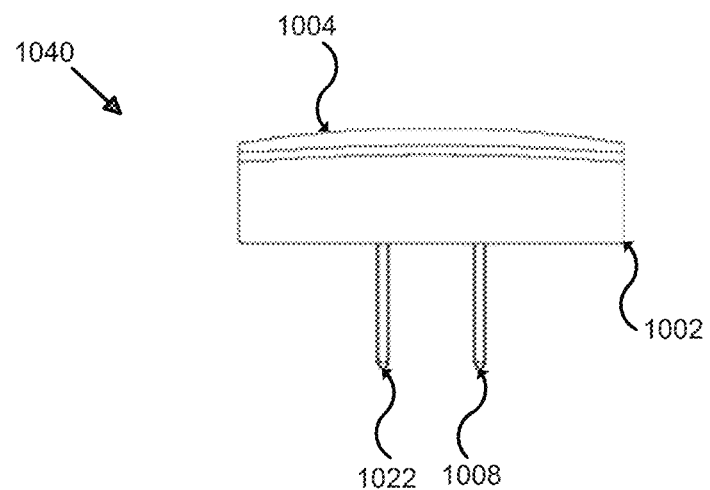
FIG. 10D illustrates a bottom view of an exemplary hub for analysis and deep learning modeling of sensor-based detection data in bounded aquatic environments.

FIG. 10D illustrates a bottom view of an exemplary hub for analysis and deep learning modeling of sensor-based detection data in bounded aquatic environments. Here, hub 1040 is shown from a bottom view, including body 1002, front surface 1004, electrical contacts 1008 and 1022. In some examples, an alarm (not shown) may be implemented with hub 1040 and configured to generate an audible alarm propagated through ports 1006 (not shown) and 1024 (not shown), which may be disposed on opposing sides of hub 1040. Alternatively, hub 1040 may also be configured to generate a visible/visual alarm that may be propagated through front surface 1004. In still other examples, a visible/visual alarm signal may be propagated through one or more of ports 1006 and/or 1024. In some examples, hub 1040 and the elements shown may be implemented similarly in terms of function and structure as like-named elements described herein. In other examples, the quantity, type, configuration, function, or structure of the elements shown may be varied and are not limited to the descriptions provided.

Figure 11A:
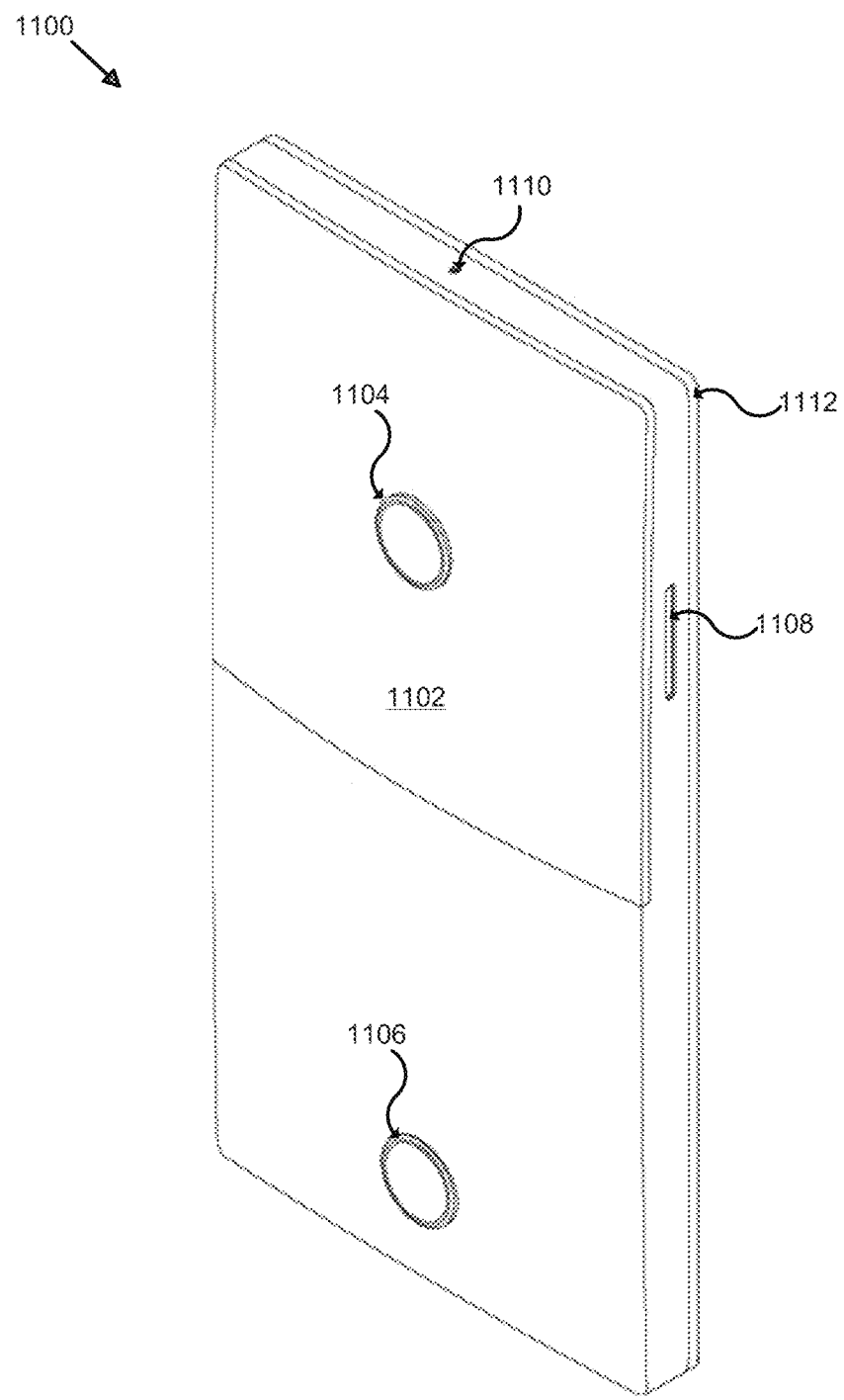
FIG. 11A illustrates a perspective view of an exemplary tile unit for analysis and deep learning modeling of sensor-based detection data in bounded aquatic environments.

FIG. 11A illustrates a perspective view of an exemplary tile unit for analysis and deep learning modeling of sensor-based detection data in bounded aquatic environments. Here, tile unit 1100 includes tile body 1102, sensors 1104-1106, recess 1108, port 1110, and mounting plate 1112. In some examples, tile unit 1100 and the elements shown may be implemented, structured, designed, and configured to operate similarly to like-named elements described herein. As an example, sensors 1104-1106 may be disposed above water and underwater, respectively. For low light-level conditions, sensors 1104-1106 may be configured as optical sensors or cameras capable of detecting, recording, sensing, or gathering images using wide angle lenses and active illumination sources such as red LEDs (for above-water low light-level sensing) and blue LEDs (for underwater low light-level sensing (e.g., night)) or MR. In some examples, lighting or illumination sources may be implemented within the structure of a sensors 1104-1106 or any of the elements of a system such as that shown in FIG. 7A (e.g., elements 702-706). In other words, for night or low-light environments, illumination sources may be implemented within any type of device or system such as those described herein.

When tile unit 1100 is attached, placed, positioned, disposed, or otherwise coupled to a surface (not shown) such as a side, wall, or other surface of a bounded aquatic environment (e.g., body of water such as a swimming pool), mounting plate 1112 may be used as a coupling substrate. In some examples, mounting plate 1112 may be mounted to a surface using fasteners, adhesive, or other fastening material (not shown). Once mounted, tile unit 1100 may be detachably coupled, using recess 1108 to receive a tab or other structural feature to secure the mounting plate to tile unit 1100. Further, port 1110 may be used to provide one, none, or multiple ornamental and/or functional features. For example, port 1110 may be used to provide an exhaust port for water vapor egressing from inside tile unit 1100. As another example, port 1110 may be used to provide a power indication light when tile unit 1100 is energized using, for example, AC power wired directly or indirectly to the unit. In other examples, port 1100 may be used for other purposes apart from those described herein. In some examples, tile unit 1100 and the elements shown may be implemented similarly in terms of function and structure as other like-named elements described herein. In other examples, the quantity, type, configuration, function, or structure of the elements shown may be varied and are not limited to the descriptions provided.

Figure 11B:
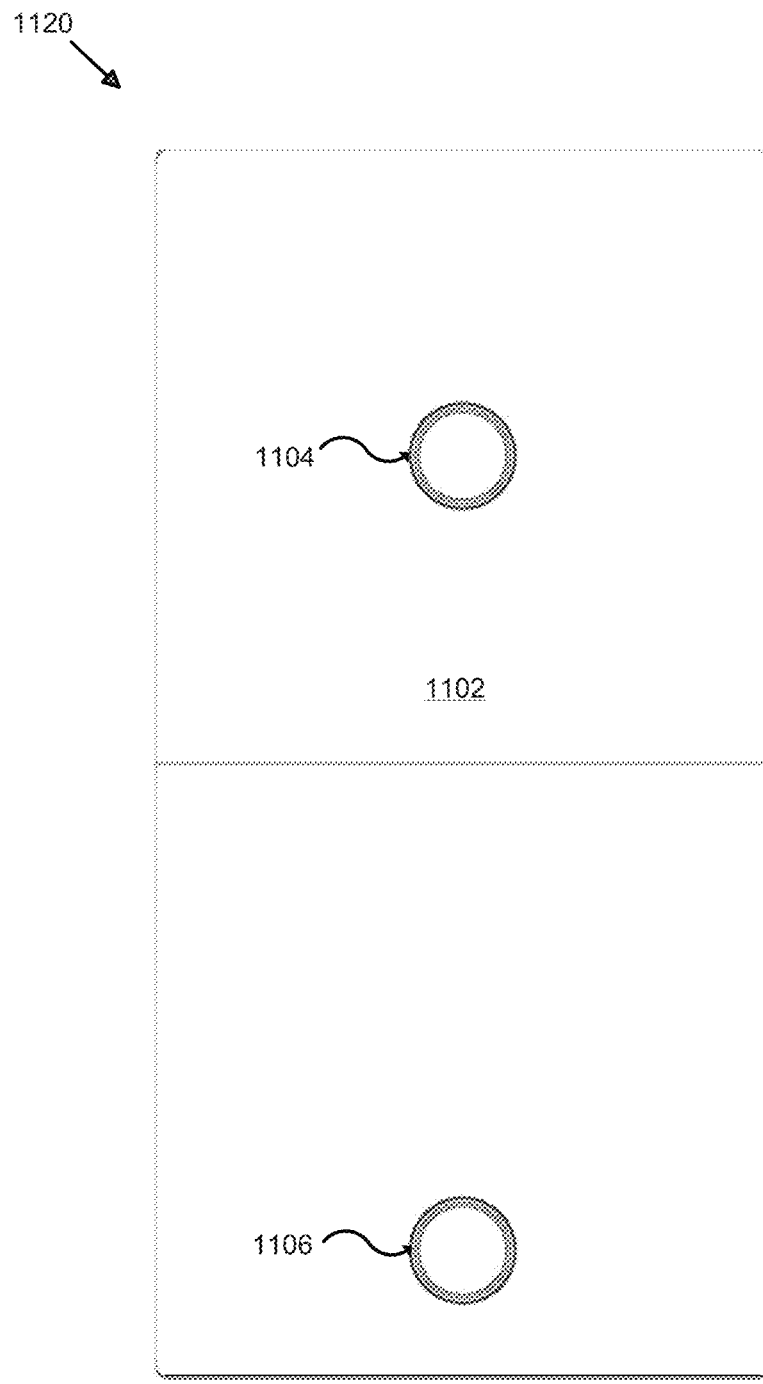
FIG. 11B illustrates a front view of an exemplary tile unit for analysis and deep learning modeling of sensor-based detection data in bounded aquatic environments.

FIG. 11B illustrates a front view of an exemplary tile unit for analysis and deep learning modeling of sensor-based detection data in bounded aquatic environments. Here, tile unit 1120 (which may be similarly to tile unit 1100 (FIG. 11A)) includes front 1102 and sensors 1104-1106. In some examples, tile unit 1120 and the elements shown may be implemented similarly in terms of function and structure as other like-named elements described herein. In other examples, the quantity, type, configuration, function, or structure of the elements shown may be varied and are not limited to the descriptions provided.

Figure 11C:
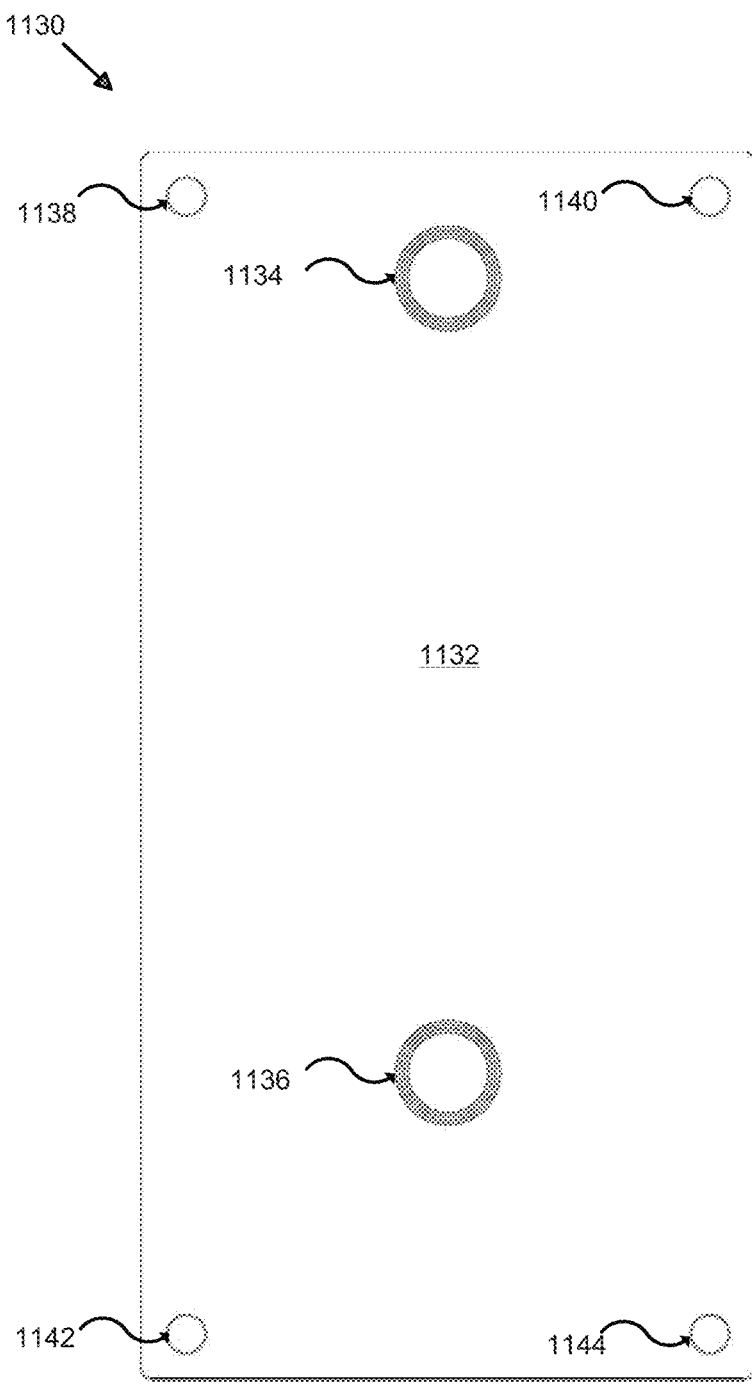
FIG. 11C illustrates a rear view of an exemplary tile unit for analysis and deep learning modeling of sensor-based detection data in bounded aquatic environments.

FIG. 11C illustrates a rear view of an exemplary tile unit for analysis and deep learning modeling of sensor-based detection data in bounded aquatic environments. Here, tile unit 1130 (which may be implemented similarly to tile unit 1100 (FIG. 11A)) includes back plate 1132, sensor receptacles 1134-1136, and fastener receptacles 1138-1144. As shown, sensor receptacles 1134-1136 may be configured to receive sensor mechanisms or apparatus when mounting plate is mated to tile unit 1100 (FIG. 11A) or 1120 (FIG. 11B). In some examples, sensor receptacles 1134-1136 may provide recesses (not shown) into which apparatus or other protrusions associated with sensors 1104-1106 (FIG. 11B) may be inserted when back plate 1132 is fastened. Likewise, fasteners (not shown) may be used to secure back plate 1132 to tile unit 1100 (FIG. 11A) or 1120 (FIG. 11B) and are configured to insert into fastener receptacles 1138-1144. In some examples, fastener recesses 1138-1144 may be used for coupling back plate 1132 to a surface (e.g., pool side or wall, or the like). As an example, back plate 1132 is fastened to a surface (not shown) using fasteners that are passed through fastener recesses 1138-1144. Fasteners, as used herein, may refer to any type of fastening implement such as screw, nails, brads, posts, rails, caulking, adhesives, or others, without limitation or restriction. As another example, back plate 1132 may be configured to couple with an intermediate plate attached to a surface. In other examples, tile unit 1130 and the elements shown may be implemented similarly in terms of function and structure as other like-named elements described herein. In other examples, the quantity, type, configuration, function, or structure of the elements shown may be varied and are not limited to the descriptions provided.

Figure 12A:
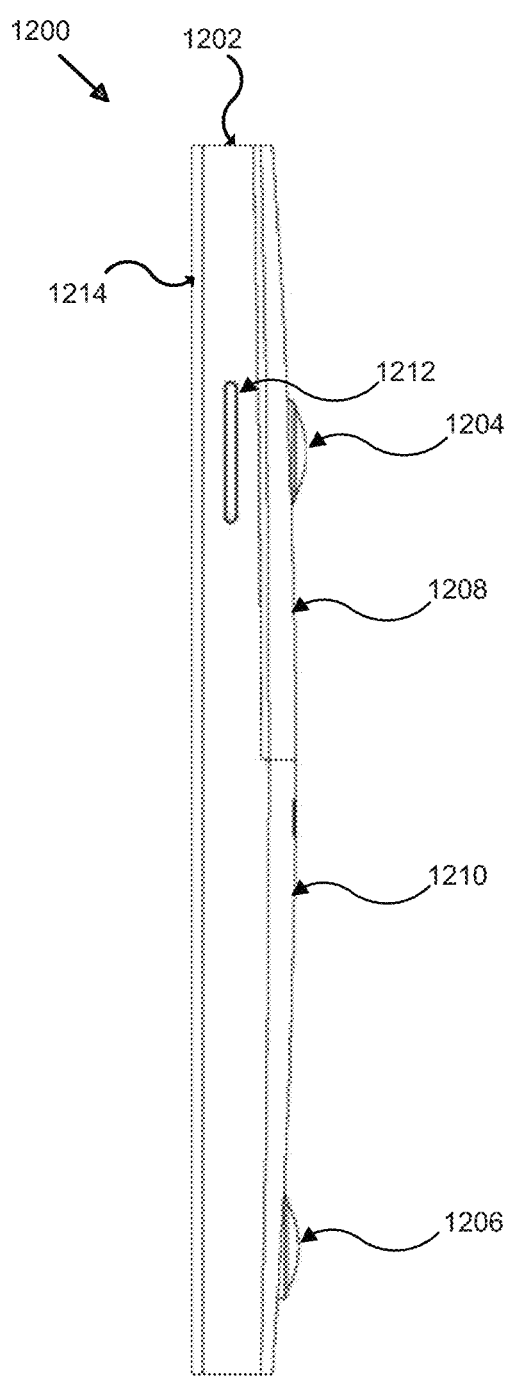
FIG. 12A illustrates a right side view of an exemplary tile unit for analysis and deep learning modeling of sensor-based detection data in bounded aquatic environments.

FIG. 12A illustrates a right side view of an exemplary tile unit for analysis and deep learning modeling of sensor-based detection data in bounded aquatic environments. Here, tile unit 1200 includes body 1202, sensors 1204-1206, upper face plate 1208, lower face plate 1210, recess 1212, and back plate 1214. In some examples, body 1202, sensors 1204-1206, upper face 1208, lower face 1210, recess 1212, and back plate 1214 may be implemented similarly to like-named elements described herein. For example, sensors 1204-1206 may be implemented using any type of sensor technology such as RGB, MR, optical, thermal, or others, without limitation or restriction.

In some examples, upper face plate 1208 may be used to house or cover sensor 1204 to create a watertight sealed cavity with body 1202, lower face plate 1210, and back plate 1214. Likewise, lower face plate 1210 may be used to also create a watertight sealed cavity with body 1202, back plate 1204, and upper face plate 1208. As shown here, upper face plate 1208 and lower face plate 1210 may refer to separate covers or face plates that may be configured to couple with body 1202. Alternatively, upper face plate 1208 and lower face plate 1210 may refer to upper and lower portions, respectively, of a monolithic face plate and are intended to refer to only a portion thereof. In some examples, covers formed using an integrated, formed, monolithic, or other type of "bubbled" or projected cover or housing may be used to protect sensor packaging, circuits, and other equipment used to implement sensors 1204-1206. Further, recess 1212 may be used to receive an internal tab or other structure that, when back plate 1214 is coupled (directly or indirectly) using a gasket or other sealing material (not shown) to prevent water intrusion, is seated (i.e., received into recess 1212). In other examples, tile unit 1200 and the elements shown may be implemented, configured to function, and structured similarly to other like-named elements described herein. In other examples, the quantity, type, configuration, function, or structure of the elements shown may be varied and are not limited to the descriptions provided.

Figure 12B:
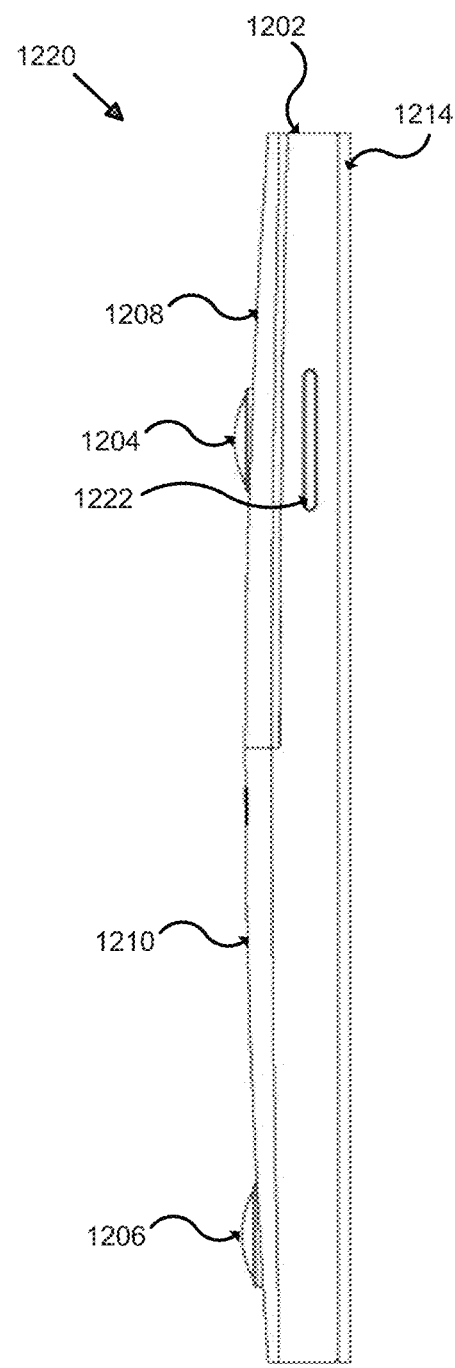
FIG. 12B illustrates a left side view of an exemplary tile unit for analysis and deep learning modeling of sensor-based detection data in bounded aquatic environments.

FIG. 12B illustrates a left side view of an exemplary tile unit for analysis and deep learning modeling of sensor-based detection data in bounded aquatic environments. Here, tile unit 1220 includes body 1202, sensors 1204-1206, upper face plate 1208, lower face plate 1210, recess 1222, and back plate 1214. In some examples, body 1202, sensors 1204-1206, upper face plate 1208, lower face plate 1210, recess 1222, and back plate 1214 may be implemented, configured to function, and structured similarly to like-named or numbered elements described herein. For example, recess 1222 may be a structural feature that is configured to function similarly to recess 1212, but is formed on the opposite side of body 1202. In other examples, the quantity, type, configuration, function, or structure of the elements shown may be varied and are not limited to the descriptions provided.

Figure 13A:
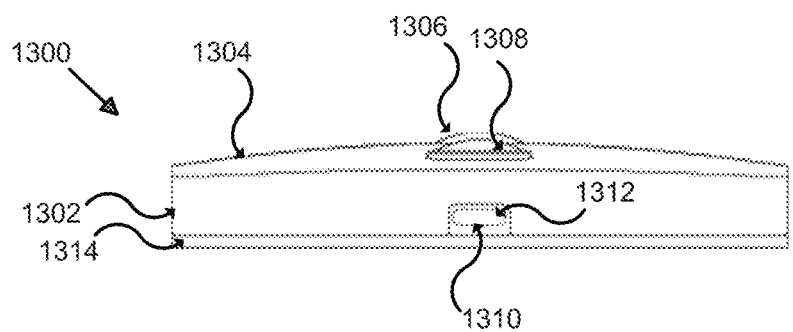
FIG. 13A illustrates a bottom view of an exemplary tile unit for analysis and deep learning modeling of sensor-based detection data in bounded aquatic environments.

FIG. 13A illustrates a bottom view of an exemplary tile unit for analysis and deep learning modeling of sensor-based detection data in bounded aquatic environments. Here, tile unit 1300 includes body 1302, lower face plate 1304, sensors 1306-1308, tab 1310, recess 1312, and back plate 1314. In some examples, body 1302, lower face plate 1304, sensors 1306-1308, tab 1310, recess 1312, and back plate 1314 may be implemented, configured to function, and structured similarly to like-named or numbered elements described herein. As shown, lower face plate 1304 may be coupled to body 1302, the latter of which may be secured when tab 1310 is set into recess 1312. Further, sensors 1306-1308 may be implemented as external windows or housings that are configured to permit transfer of signals, data, or images from an aquatic environment to an image capture device (e.g., charge capture device, camera aperture, lens, or the like) (not shown) housed within body 1302. In some examples, sensors 1306-1308 may refer to sensor techniques such as those described herein, but also structural "windows" or "lenses" that are configured to provide waterproof and/or water resistant protection of sensors, circuits, and underlying packaging that may be housed within body 302 when tile unit 1300 is placed into and operated in a partially and/or fully submerged position. In other examples, the quantity, type, configuration, function, or structure of the elements shown may be varied and are not limited to the descriptions provided.

Figure 13B:
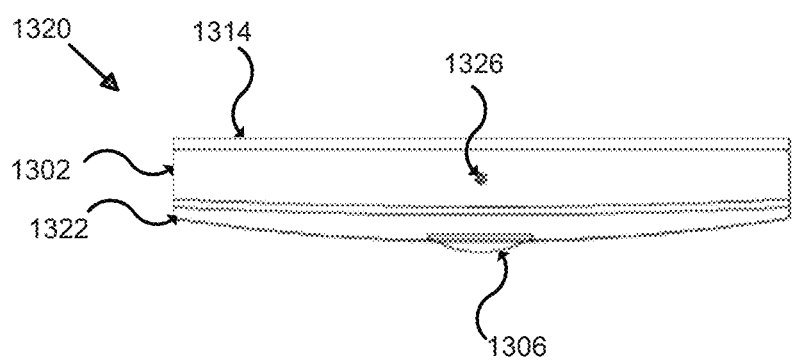
FIG. 13B illustrates a top view of an exemplary tile unit for analysis and deep learning modeling of sensor-based detection data in bounded aquatic environments.

FIG. 13B illustrates a top view of an exemplary tile unit for analysis and deep learning modeling of sensor-based detection data in bounded aquatic environments. Here, tile unit 1320 includes body 1302, sensor 1306, back plate 1314, upper face plate 1322, and port 1326. In some examples, body 1302, sensor 1306, back plate 1314, upper face plate 1322, and port 1326 may be implemented, structured, and configured to function similarly to like-named or numbered elements described herein. Further, upper face plate 1322 may be coupled to body 1302 and port 1326 may be implemented and configured to function similarly to port 1110 (FIG. 11A) for various uses such as venting water vapor, providing a visual or audible indicator to indicate operational status (e.g., illuminating a light through port 1326 to indicate tile unit 1320 is energized and operational), or others, without limitation or restriction. In other examples, the quantity, type, configuration, function, or structure of the elements shown may be varied and are not limited to the descriptions provided.

Figure 14:
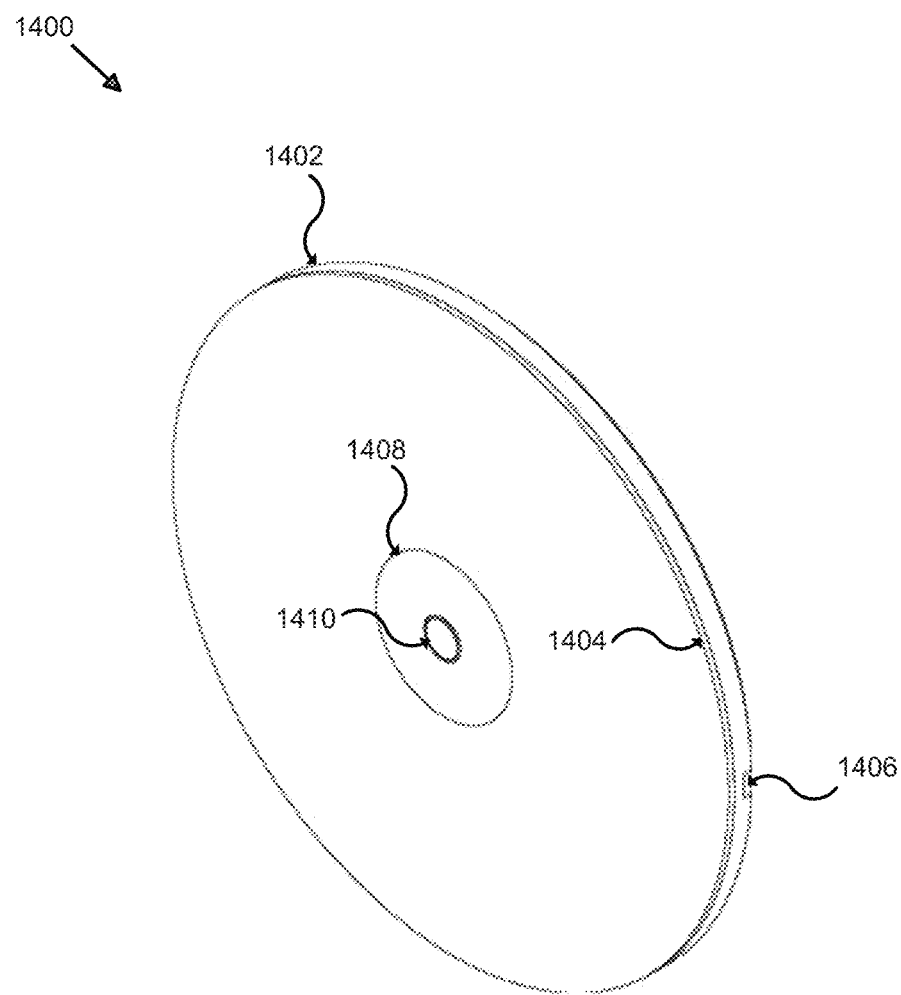
FIG. 14 illustrates a perspective view of a light unit for analysis and deep learning modeling of sensor-based detection data in bounded aquatic environments.

FIG. 14 illustrates a perspective view of a light unit for analysis and deep learning modeling of sensor-based detection data in bounded aquatic environments. Here, light unit 1400 includes light body 1402, light cover 1404, tab 1406, illumination source 1408, and aperture 1410. In some examples, similarly-named elements may be implemented, structured, and configured to function to previously described elements. For example, light unit 1400 may be implemented, structured, and configured to function similarly to light unit 706 (FIG. 7). As used herein "light unit" may refer to a light and be used interchangeably, without limitation or restriction. In other examples, light unit may be implemented, structure, or configured to function differently with more, fewer, or different features than those described herein.

Here, light unit 1400 may be structured by coupling light body 1402 with light cover 1404 to provide a waterproof or water tight seal against an aquatic environment when submerged, fully or partially. Using tab 1406 to seat in a recess molded or otherwise structured into light body 1402, a secure coupling or mating with light cover 1404 may be achieved. In some examples, illumination source 1408 may include an illumination source, which may be incandescent, halogen, LED (i.e., light emitting diodes of various colors, such as red, blue, green (i.e., RGB), yellow, or others), chemical, or others, without limitation or restriction). Further, illumination source 1408 may also include a structural portion of light cover 1404 that is structured and/or configured to permit propagation of light waves from various types of illumination sources. Further, illumination source 1408 may also include a clear, translucent, transparent, colored, or opaque (fully or partially) lens that permits light to propagate from a light source into an aquatic environment.

In some examples, aperture 1410 may be provided in light cover 1400 and used to provide a window or other type of waterproof or watertight opening for one or more sensors (e.g., optical, thermal, infrared, acoustic, RGB, NIR, and others, without limitation or restriction). As an example, an optical sensor may be disposed at the center of light unit 1400 using aperture 1410 as a lens cover to protect sensing apparatus (e.g., CCD) from a liquid or aquatic environment. In other examples, aperture 1410 may be used to implement other features. Further, light unit 1400 may be coupled to an external power source (not shown) when installed or placed on a surface of a bounded aquatic environment (e.g., placed or installed on a wall, side, or other surface) and used to distribute power to other system components such as tile units (not shown, but described herein (e.g., FIG. 7)). Alternatively, light unit 1400 may also receive power from an internal source such as one or more batteries (of any type of charge storing battery technology (e.g., lithium ion, NiMH (nickel metal hydride), or others, without limitation or restriction). In other examples, the quantity, type, configuration, function, or structure of the elements shown may be varied and are not limited to the descriptions provided.

Figure 15:
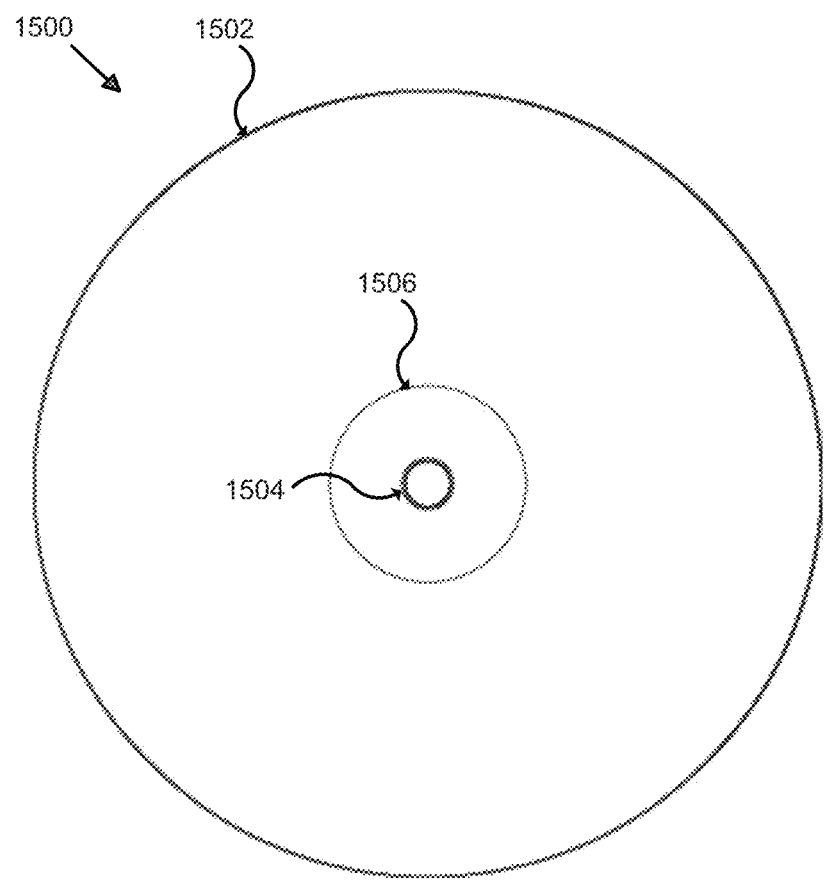
FIG. 15 illustrates a front view of a light unit for analysis and deep learning modeling of sensor-based detection data in bounded aquatic environments.

FIG. 15 illustrates a front view of a light unit for analysis and deep learning modeling of sensor-based detection data in bounded aquatic environments. Here, light unit 1500 includes light cover 1502, illumination source 1506, and aperture 1504. In some examples, light unit 1500, light cover 1502, illumination source 1506, and aperture 1504 may be implemented, structured, and configured similarly to previously described elements (e.g., light unit 1400, light cover 1404, illumination source 1408, and aperture 1410 (FIG. 14)). In other examples, the quantity, type, configuration, function, or structure of the elements shown may be varied in implementation and are not limited to the descriptions provided.

Figure 16:
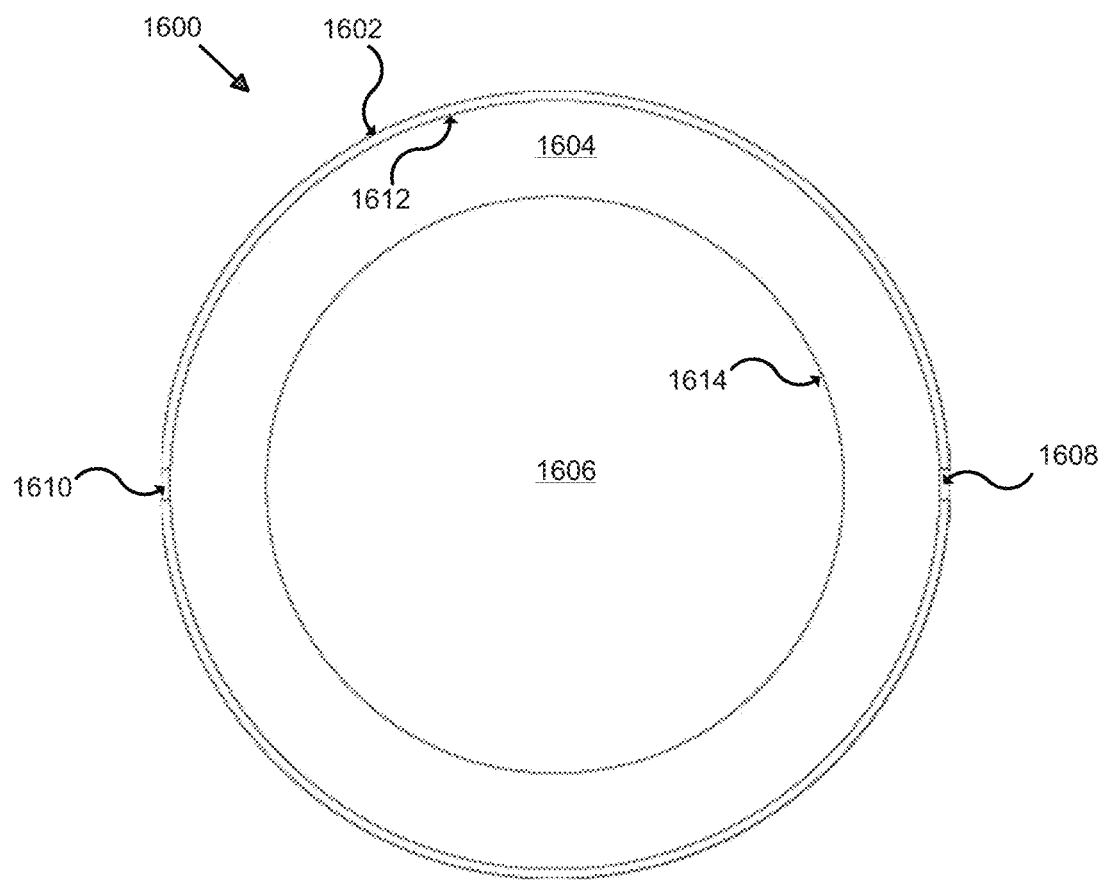
FIG. 16 illustrates a rear view of a light unit for analysis and deep learning modeling of sensor-based detection data in bounded aquatic environments.

FIG. 16 illustrates a rear view of a light unit for analysis and deep learning modeling of sensor-based detection data in bounded aquatic environments. Here, light unit 1600 includes light cover 1602, back plate 1604, inner back plate 1606, tabs 1608-1610, and seals 1612-1614. In some examples, light unit 1600, light cover 1602, and tabs 1608-1610 may be implemented, structured, and configured similarly to previously described elements (e.g., light unit 1400, light cover 1404, and tab 1406 (FIG. 14)). As shown, back plate 1604 may be inserted into and coupled with light cover 1602 and secured using tabs 1608-1610. In some examples, back plate 1604 may be structurally different than as described above. For example, instead of being inserted into light cover 1602, back plate 1604, instead of being inserted, may be "mated," sealed, connected, or otherwise coupled (directly or indirectly) with back plate 1604 when tabs 1608-1610 are placed (i.e., inserted, snapped, pressed, placed, or otherwise coupled to) into recesses (not shown) formed in light cover 1602. Once coupled, light cover 1602 and back plate 1604 may form seal 1612, which may be waterproof and/or watertight.

In some examples, inner back plate 1606 may be a permanent or removable portion of back plate 1604. Back plate 1604, when removed, may serve various purposes including, but not limited to, removal for maintenance or observation of inner elements of light unit 1600. In other examples, back plate 1604 may be structured and configured to function as a mounting plate affixed to a surface, side, or wall of an aquatic environment. Once mounted, back plate 1604 may have structured, affixed, molded, or otherwise formed or attached, to receive and couple with back plate 1604 and light cover 1602 to provide seal 1614 (which may be a waterproof or watertight) permitting submergence or immersion of light unit 1600. In other examples, the quantity, type, configuration, function, or structure of the elements shown may be varied in implementation and are not limited to the descriptions provided.

Figure 17A:
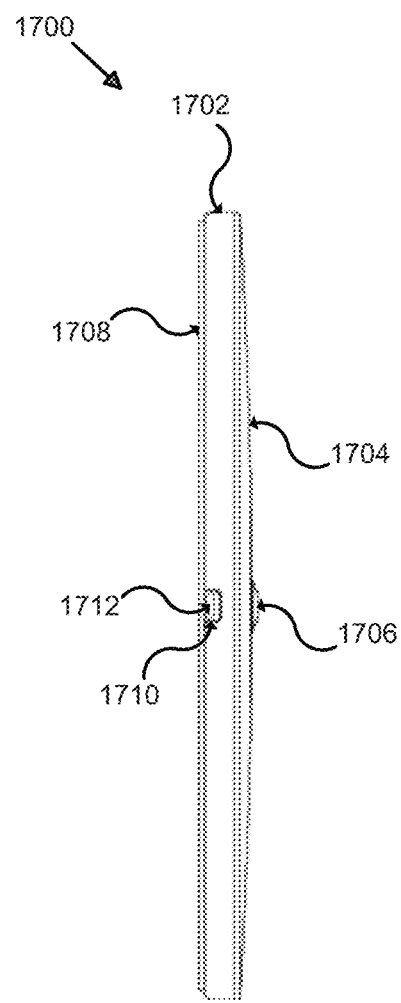
FIG. 17A illustrates a right side view of a light unit for analysis and deep learning modeling of sensor-based detection data in bounded aquatic environments.

FIG. 17A illustrates a right side view of a light unit for analysis and deep learning modeling of sensor-based detection data in bounded aquatic environments. Here, light unit 1700 includes light body 1702, light cover 1704, aperture 1706, back plate 1708, recess 1710, and tab 1712. In some examples, light unit 1700 and elements 1702-1712 may be implemented, structured, and configured similarly to previously described elements. As shown, light body 1702 may be coupled to back plate 1708 by inserting tab 1712 into recess 1710 to create a seal (e.g., seals 1612-1614 (FIG. 16)), which may be waterproof or watertight when light unit 1700 is submerged, immersed, or otherwise placed in an aquatic environment. In other examples, the quantity, type, configuration, function, or structure of the elements shown may be varied in implementation and are not limited to the descriptions provided.

Figure 17B:
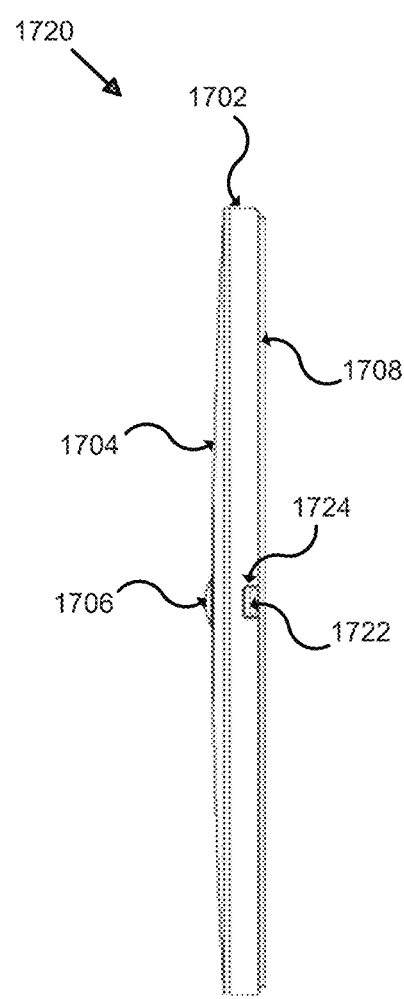
FIG. 17B illustrates a left side view of a light unit for analysis and deep learning modeling of sensor-based detection data in bounded aquatic environments.

FIG. 17B illustrates a left side view of a light unit for analysis and deep learning modeling of sensor-based detection data in bounded aquatic environments. Here, light unit 1720 includes light body 1702, light cover 1704, aperture 1706, back plate 1708, recess 1710, and tab 1712. In some examples, light unit 1720 and elements 1702-1724 may be implemented, structured, and configured similarly to previously described elements. Similar to the description of FIG. 17A, light body 1702 may be coupled to back plate 1708 by inserting tab 1722 into recess 1724 to create a seal (e.g., seals 1612-1614 (FIG. 16)), which may be waterproof or watertight when light unit 1720 is submerged, immersed, or otherwise placed in an aquatic environment. In other examples, the quantity, type, configuration, function, or structure of the elements shown may be varied in implementation and are not limited to the descriptions provided.

Figure 18A:
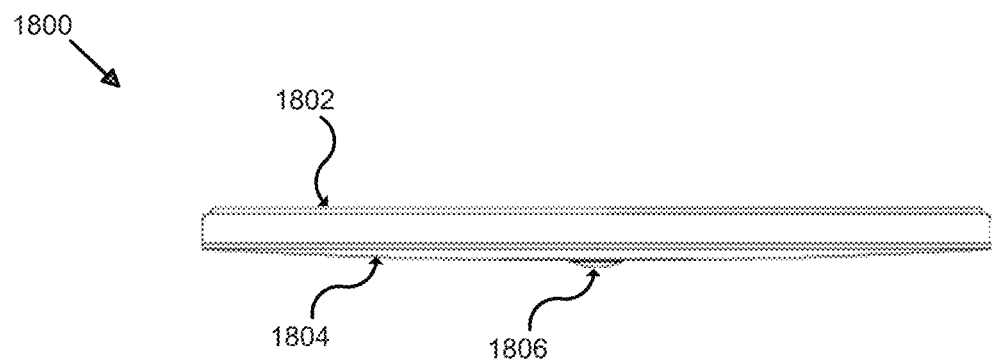
FIG. 18A illustrates a top view of a light unit for analysis and deep learning modeling of sensor-based detection data in bounded aquatic environments.

FIG. 18A illustrates a top view of a light unit for analysis and deep learning modeling of sensor-based detection data in bounded aquatic environments. Here, light unit 1800 includes back plate 1802, light cover 1804, and aperture 1806. In some examples, light unit 1800 and elements 1802-1806 may be implemented, structured, and configured similarly to previously described elements. In other examples, the quantity, type, configuration, function, or structure of the elements shown may be varied in implementation and are not limited to the descriptions provided.

Figure 18B:
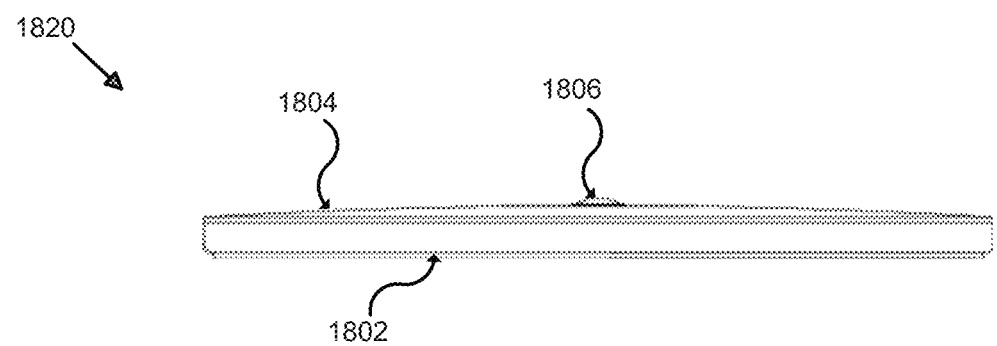
FIG. 18B illustrates a bottom view of a light unit for analysis and deep learning modeling of sensor-based detection data in bounded aquatic environments.

FIG. 18B illustrates a bottom view of a light unit for analysis and deep learning modeling of sensor-based detection data in bounded aquatic environments. Here, light unit 1820 illustrates an opposing view to that of FIG. 18A, showing back plate 1802, light cover 1804, and aperture 1806. In some examples, light unit 1820 and elements 1802-1806 may be implemented, structured, and configured similarly to previously described elements. In other examples, the quantity, type, configuration, function, or structure of the elements shown may be varied in implementation and are not limited to the descriptions provided.

Figure 19:
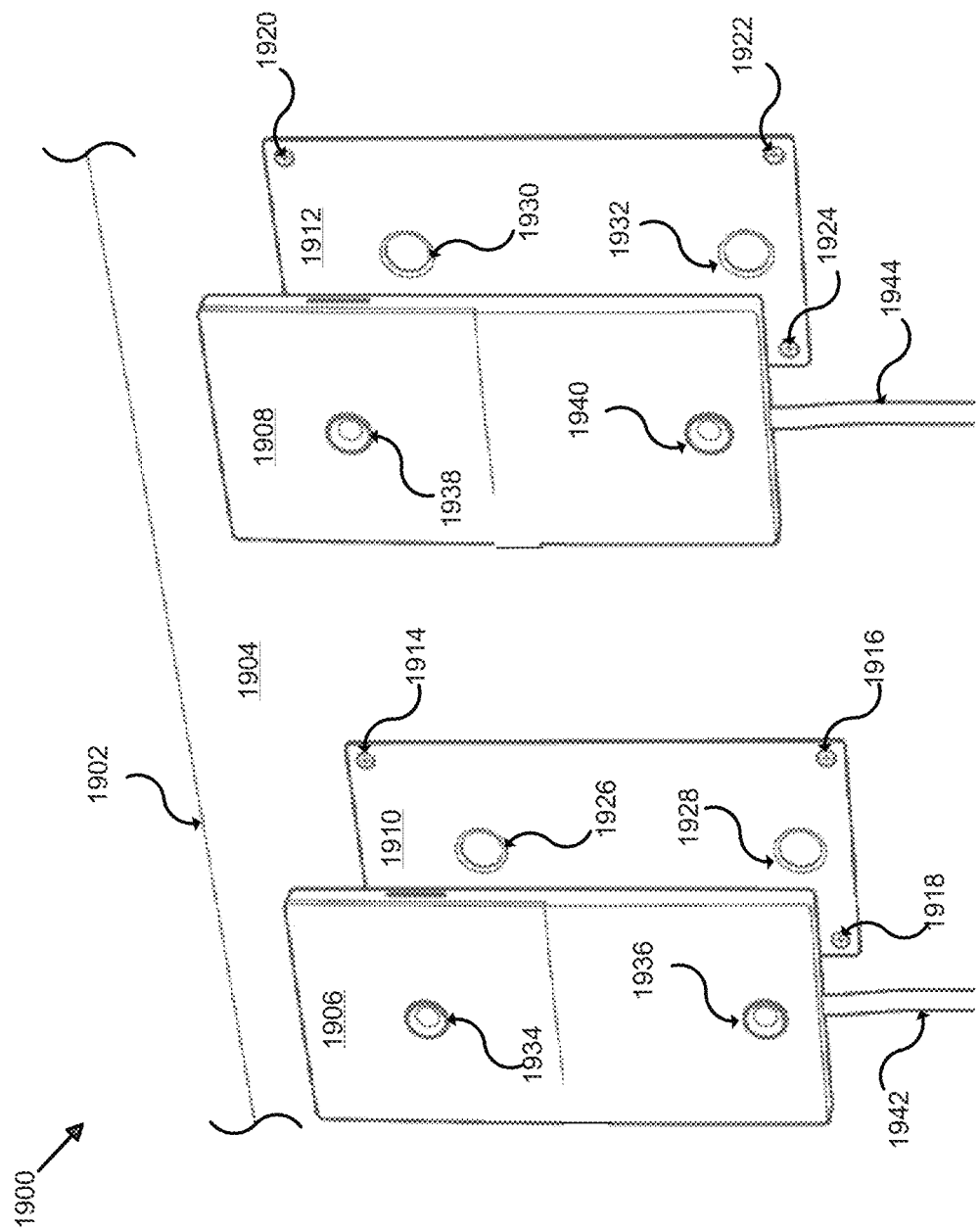
FIG. 19 illustrates a perspective view of a dual exemplary tile unit for analysis and deep learning modeling of sensor-based detection data in bounded aquatic environments.

FIG. 19 illustrates a perspective view of a dual exemplary tile unit for analysis and deep learning modeling of sensor-based detection data in bounded aquatic environments. Here, system 1900 illustrates waterline 1902 and a cutoff view of surface 1904, which may be a side, wall, or other surface of a bounded aquatic environment (e.g., swimming pool, pond, diving tank, or the like). As shown, system 1900 includes tile units 1906-1908, mounting plates 1910-1912, fasteners 1914-1924, sensor receptacles 1926-1932, sensors 1934-1940, and conduits 1942-1944. In some examples, system 1900 and elements 1902-1944 may be implemented, structured, and configured similarly to previously described elements.

Here, tile units 1906-1908 may be coupled (directly or indirectly) to mounting plates 1910-1912, the latter of which are fastened to surface 1904 using fasteners 1914-1924. In some examples, mounting plates 1910-1912 are further configured with sensor receptacles 1926-1932, which may be structured substantially concaved such that when tile units 1906-1908 are coupled to mounting plates 1910-1912, sensors 1934-1940 are seated into sensor receptacles 1926-1932. Sensors 1934-1940, in some examples, may be implemented, structured, or configured similarly to various sensor techniques such as those described herein, but may also include convex windows, lenses, or apertures that are sealed to provide a waterproof or watertight cover over underlying sensor apparati, circuits, circuit boards, electronic and electrical components such as onboard processors, and the like. Further, sensors 1934-1940 and other components requiring electrical power, may be energized (i.e., configured to receive electrical power) via wiring housed, shielded and/or protected from an aquatic environment by conduits 1942-1944. In other examples, conduits 1942-1944 may also be configured to house, shield, and/or protect various cables, wires, fibers (e.g., fiber optics), or other conduits configured to transfer electrical power and data. Data, in some examples, may be transferred using electrical, optical, chemical, or other techniques for transferring data between tile units 1906-1908 and other system components (e.g., application 102 (FIG. 1A), light unit 1400 (FIG. 14), or others) using conduits 1942-1944. In still other examples, data may be transferred between tile units 1906-1908 using conduits 1942-1944, wireless data communication and transfer protocols such as Bluetooth, BLE, optical, ZigBee, Z-Wave, WiFi, ANT/ANT+, NFC, infrared, microwave, or a combination thereof, without limitation or restriction. In other examples, the quantity, type, configuration, function, or structure of the elements shown may be varied in implementation and are not limited to the descriptions provided.

Figure 20:
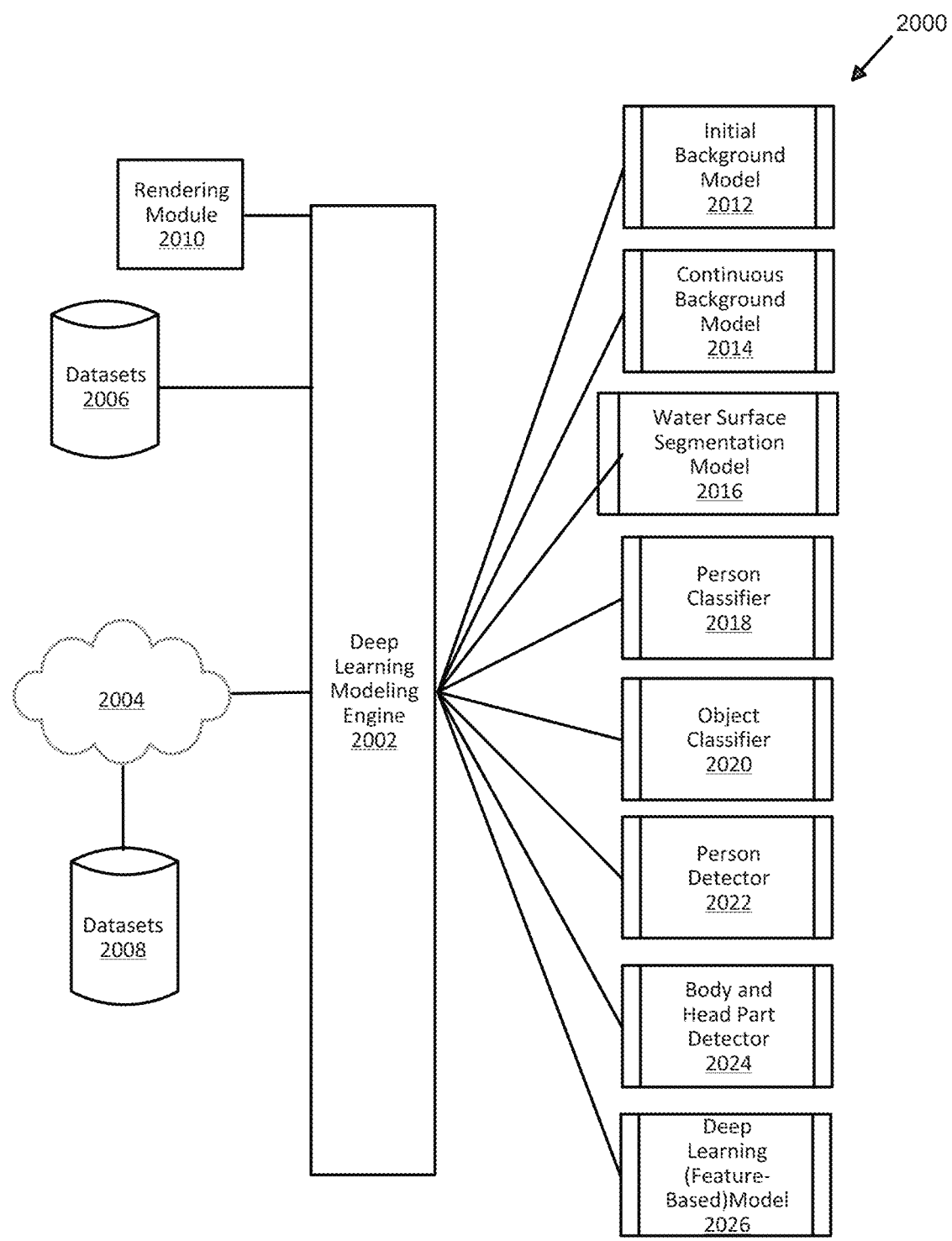
FIG. 20 illustrates an exemplary application architecture for analysis and deep learning modeling of sensor-based detection data in bounded aquatic environments.

FIG. 20 illustrates an exemplary application architecture for analysis and deep learning modeling of sensor-based detection data in bounded aquatic environments. Here, application 2000 includes deep learning modeling engine 2002, network 2004 (which may be any type of data network over any type of topology using various physical or virtual computing resources including clients, servers, computing clouds, or any other type, without limitation or restriction), datasets 2006-2008, rendering module 2010, initial background model 2012, continuous background model 2014, water surface segmentation model 2016, person classifier 2018, object classifier 2020, person detector 2022, body and head part detector 2024, and deep learning (feature-based) model 2026. In some examples, deep learning modeling engine 2002 may be used by one or more elements 104-122 of application 102 (FIG. 1A) to detect, identify, classify, associate, and track objects (i.e., person vs. non-person) in an aquatic environment. Using one or more models or data sources 2012-2026, deep learning modeling engine 2002 can be configured for data-driven (i.e., based on collecting and locally analyzing data and images detected or captured by system 700 (FIG. 7)) and deep-learning modeled algorithmic-enhanced techniques for detecting, identifying, classifying, associating, and tracking objects in an aquatic environment.

In some examples, sensors (e.g., sensors 126 and/or 144 (FIG. 1A), sensors 1104-1106 (FIG. 11A), and others as described herein), may be used to provide input (not shown) to deep learning modeling engine 2002 that, subsequently, generates a call to one or more of models 2012-2026 in order to perform a given function. For example, initial background model 2012 and continuous background model 2014 may be called by deep learning modeling engine 2002 to identify and separate background features (e.g., walls, sides, fountains, steps, pillars, columns, or other fixed unchanging features of a given aquatic environment (e.g., swimming pool or the like)) from input data received from sensors 126 and/or 144 (FIG. 1A). For initial and continuous calibration purposes, deep learning modeling engine 2002 may be invoked with control data from application 102 (FIG. 1A) and subsequently configured to generate and send a control signal or data to deep learning modeling engine 2002, which in turn calls water surface segmentation model 2016, which is developed using data from one or more acquired data sets of various scenes or images of water surfaces. In some examples, scenes or images of water surfaces may be stored in a local database (e.g., datasets 2006) or a networked storage repository (e.g., datasets 2008) and used to "train" deep learning modeling engine 2002 in order to improve accuracy, reduce latency, and increase performance in relation to application 102 (FIG. 1A) performing calibration processes and sub-processes, regardless of whether at the time of initial placement of a detection system (e.g., system 700 (FIG. 7)) in a bounded aquatic environment.

In other examples, deep learning modeling engine 2002 may also be invoked by classifier 122 (FIG. 1A) to classify detected objects using deep learning modeling engine 2002 and person classifier 2018, object classifier 2020, person detector 2022, and body and head part detector 2024. Using person detector 2022 and body and head part detector 2024, deep learning modeling engine 2002 may be used to reference stored images or data associated with stored images for identifying detected objects as persons or body parts of persons and, if so, associating the parts with individual persons for purposes of tracking. In some examples, sensors 126 and/or 144 (FIG. 1A) may detect body parts of a person above and below a waterline. As described above, images collected of body parts below water can be identified, classified, and associated with above-water parts in order to identify, classify, and track individual persons within an aquatic environment. In still other examples, other features detected can be identified, classified, associated, and, tracked or, in instances where data-driven techniques are limited or unable to perform these processes, using deep learning modeling engine 2002 and deep learning (featured-based) model 2026. As shown, deep learning (feature-based) model 2026 may be used by application 102 (FIG. 1A) to detect, identify, classify, associate, track, or any purpose related to any type of feature, object, process, or purpose in addition to those described herein. In other examples, the quantity, type, configuration, function, or structure of the elements shown may be varied in implementation and are not limited to the descriptions provided.

Figure 21:
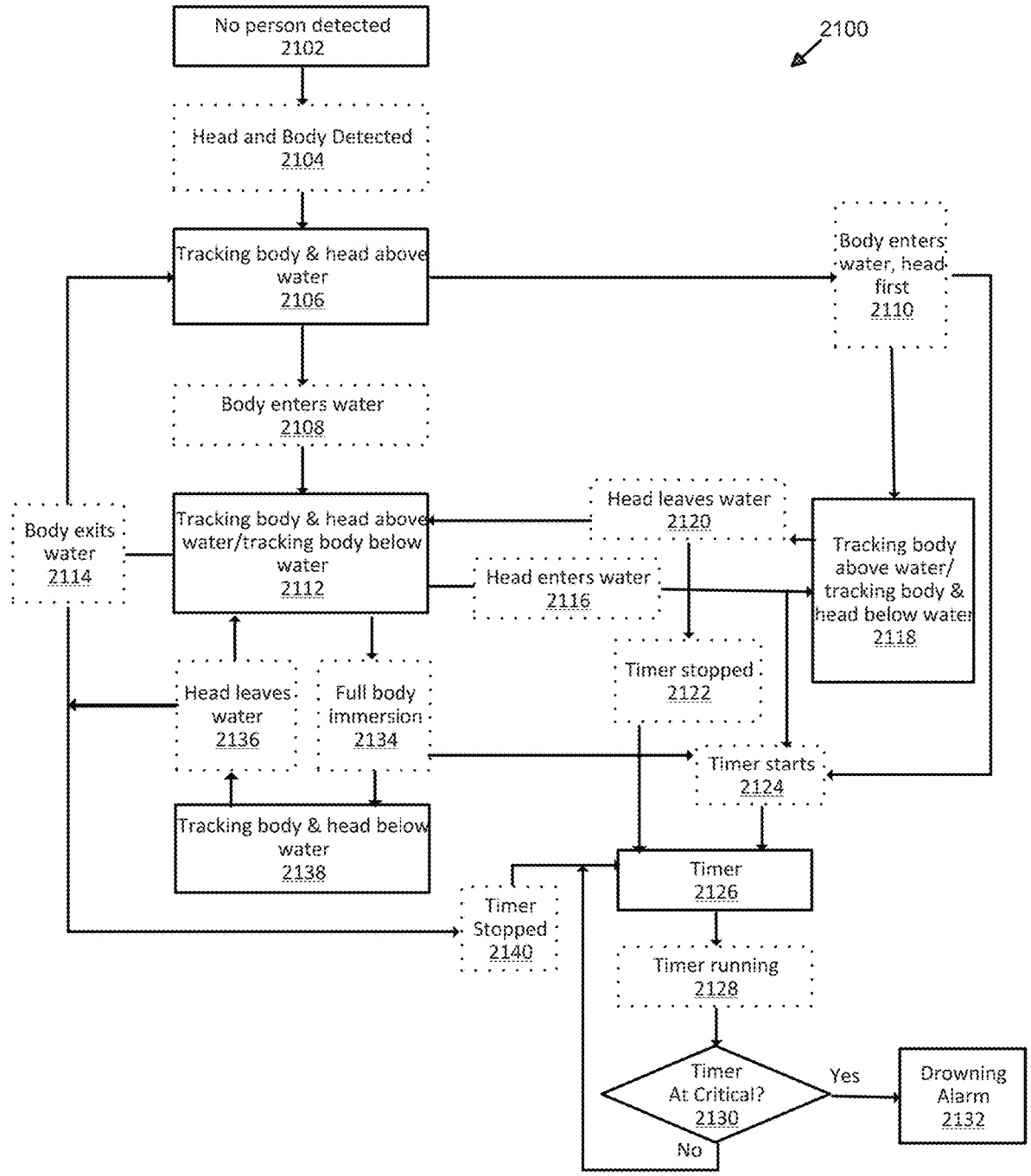
FIG. 21 illustrates an exemplary state diagram for analysis and deep learning modeling of sensor-based detection data in bounded aquatic environments.

FIG. 21 illustrates an exemplary state diagram for analysis and deep learning modeling of sensor-based detection data in bounded aquatic environments. Here, state 2102 is entered if no person has been detected. In some examples, transition 2104 occurs when a head and body are detected. After transition 2104, state 2106 is entered in which a body and head are detected above water (e.g., a person standing or walking at the pool side or poised to jump into the water, or the like) are being tracked. As used herein, "water" may refer to any liquid found in an aquatic environment. Next, transitions may occur when a tracked body enters the water (2108) or enters the water, head-first (2110).

In some examples, if transition 2108 occurs, state 2112 may be entered in which a body and head are above water and being tracked and any body part below water is being tracked (e.g. this state could occur when a person is wading or treading water or standing on a shallow pool bottom) after which a transition may be entered after which transitions occur in which A) a body exits the water (2114), B) a head enters the water (i.e., goes underwater) (2116), or C) full immersion occurs (2134). If transition 2116 occurs, state 2118 may occur in which tracking of a body above water or tracking a body and head underwater may be entered. In this case, when the head enters the water, transition 2124 may occur in which a timer may be started, after which transition 2128 occurs in which the timer is running and, subsequently, a determination is made as to whether the timer has reached a critical threshold (i.e., a timing threshold after which a drowning may be occurring) (2130). If the timer has reached a critical threshold, an alarm may be triggered (2132). If not, state 2126 is reentered or transition 2140 occurs in which the timer has been stopped.

Referring back to state 2106, if transition 2110 (i.e., a tracked body enters the water head-first) occurs, transition 2124 (i.e., timer starts) or state 2118 (i.e., tracking a body above the water or a body and head underwater) may occur. State 2118 may be entered if transition 2120 occurs in which the head rises above water, after which transition 2122 (i.e., timer stopped) occurs or state 2112 is entered. From state 2112, transition 2114 may occur in which a detected and tracked body exits the water and state 2106 (i.e., the body and head are above water and being tracked) occurs or transition 2136 occurs in which the head leaves the water and state 2112 is reentered. From state 2112, transition 2134 occurs when a body is fully immersed after which state 2138 or transition 2124 occurs. If state 2138 (i.e., a body and head are tracked underwater) occurs, transition 2136 may occur when a tracked head leaves the water and transition 2114 may occur further when a tracked body exits the water, in which state 2106 and state 2140 (i.e., timer stops) occur. Although various states and transitions of system 100 and application 102 are shown, more, fewer, and/or different states and transitions could be implemented and those shown are neither intended to be limiting nor restricting of the described techniques. The order and number of states and transitions are not intended to imply or state an order or priority of occurrence, but are provided for purposes of clarity when referencing FIG. 21. In other examples, state diagram may be varied in design, states, and transitions and is not limited to the examples shown and described.

Figure 22:
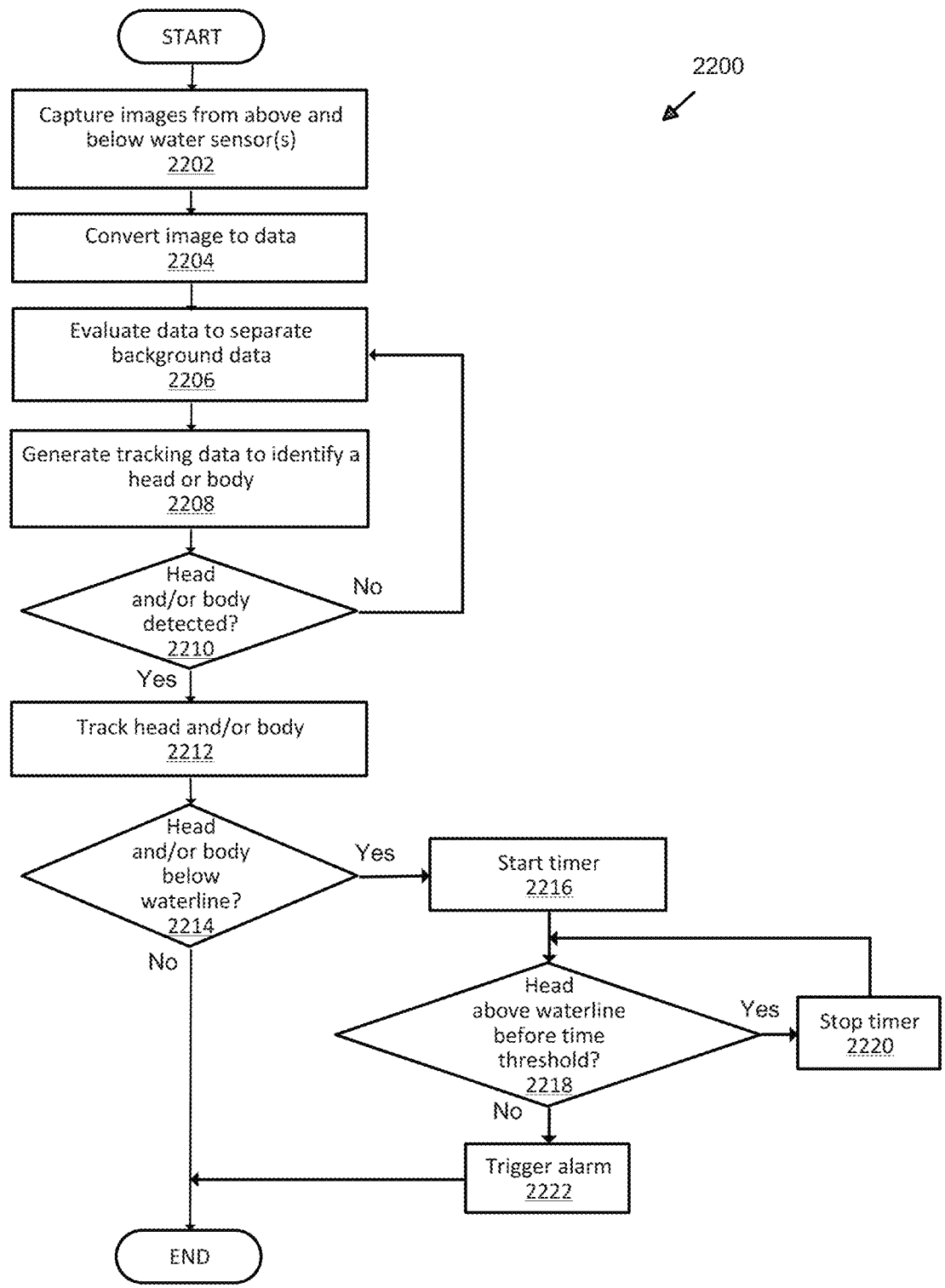
FIG. 22 illustrates an exemplary process for analysis and deep learning modeling of sensor-based detection data in bounded aquatic environments.

FIG. 22 illustrates an exemplary process for analysis and deep learning modeling of sensor-based detection data in bounded aquatic environments. Here, process 2200 starts by capturing images from above-water sensors (e.g., 1104 (FIG. 11A)) and below-water sensors (e.g., 1106 (FIG. 11A)) (2202). Once captured (i.e., captured may refer to detect, sense, observe, record, or other functions intended to describe operation of one or more sensors or sensor arrays, such as those described herein), images may be converted to data (2204). In some examples, data may refer to any data type, format, schema, or other form including, but not limited to analog, digital, or others, without limitation or restriction. Here, captured images or video may or may not be converted into digital form or others, but may instead by "converted" to one or more formats and schemas for storage in, for example, sensor data 128 (FIG. 1A) and/or sensor data 154 (FIG. 1A). Process 2200 continues, in some examples, by evaluating data to subtract background features from captured images, video, tracklets, or the like (2206). After subtracting background imagery, scenes, features, or the like from captured sensor imagery, video, or data, the remaining foreground data may be evaluated and used to identify, associate, and/or track a head or body detected by one or more sensors 126 and/or 144 (FIG. 1A) (2208). As described herein, foreground data may be any type of remaining imagery, video, data after background features and imagery have been subtracted as described herein.

Alternatively, foreground data may also be obtained using a data-driven manner in which sensors 126 and/or 144 are implemented with filters and apertures that can be manipulated to focus on the detection of objects in the foreground and defocus objects in the background. By using one or more sensors or sensor array(s), a bounded aquatic area may be covered using data-driven implementations of system 100 (FIG. 1A) instead of relying exclusively on deep learning models. However, in some examples, a combination of data-driven (i.e., such as those described herein) and deep learning model-based approaches may be implemented and used.

Referring back to FIG. 22, a determination is made as to whether a head and/or body have been detected in the foreground data being used to track a head of body (2210). If not, captured data and images from sensors 126 and/or 144 (FIG. 1A) continue to be evaluated until a head and/or body are detected (2206). If detected, then tracking data is generated and a detected head and/or body are tracked (2212). A further determination is made as to whether the detected head and/or body are below a waterline (e.g., waterline 716 (FIG. 7)) (2214). If a detected head is below a waterline, then a timer is started (2216). A determination is then made as to whether the head rises above the waterline (i.e., a person is assumed to be breathing ambient air if the head is above the waterline) (2218). If the detected head rises above a waterline, the timer is stopped (2220). If the detected head remains below the waterline and a time threshold is reached, an alarm is triggered (e.g., alarms 210-218 (FIG. 2), hub 800 (FIG. 8), or the like) to alert nearby persons and personnel that a drowning is occurring (i.e., in progress) in order to prevent, stop, or save the drowning person (2222). In other examples, process 2200 may be varied in order, function, scope, configuration, sub-processes, or the like and is not limited to the examples shown or described.

Figure 23:
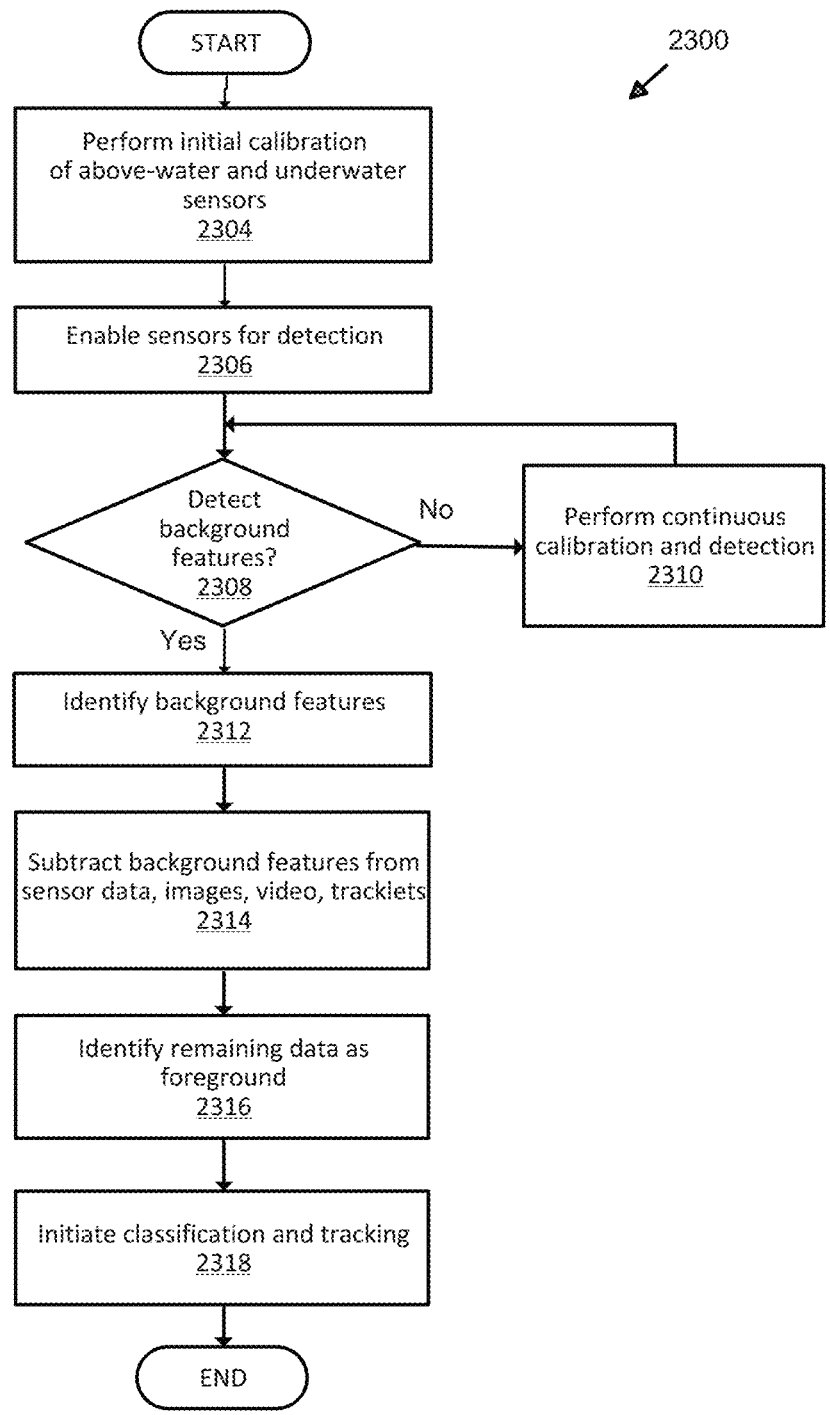
FIG. 23 illustrates an alternative exemplary process for analysis and deep learning modeling of sensor-based detection data in bounded aquatic environments.

FIG. 23 illustrates an alternative exemplary process for analysis and deep learning modeling of sensor-based detection data in bounded aquatic environments. Here, process 2300 begins by performing an initial calibration of above-water and underwater sensors (2304). Once calibrated, sensor(s) (e.g., sensors 126 and/or 144 (FIG. 1A), sensors 1104-1106 (FIG. 11A, or others) may be enabled (e.g., energized, powered, or otherwise placed into an operable and functional condition to begin detecting objects in an aquatic environment) (2306). A determination is made as to whether background features are detected (2308). If no background features are detected, then system 100 and application 102 (FIG. 1A) perform continuous calibration and detection (2310). If background features are detected, then the background features are identified by evaluating captured images, video, tracklets, or the like or, alternatively, comparing captured imagery to a deep learning model generated by deep learning module 108 using model data 130 and/or model data 152 (2312). Next, background features are subtracted from sensor data, images, video, tracklets, or the like (2314). Data, images, video, tracklets or the like remaining after background features are subtracted may be classified as foreground (2316). Once foreground data, images, video, tracklets or the like (hereafter referred to as "foreground") have been identified, classification and tracking (e.g., processes that may be performed by classifier 122, CPU 110, tracking module 112, and application 102 (FIG. 1A)) is initiated (2318). As shown, process 2300 may be an alternative process to that described above in connection with FIG. 22. In other examples, process 2300 may be varied in order, function, scope, configuration, sub-processes, or the like and is not limited to the examples shown or described.

Figure 24A:
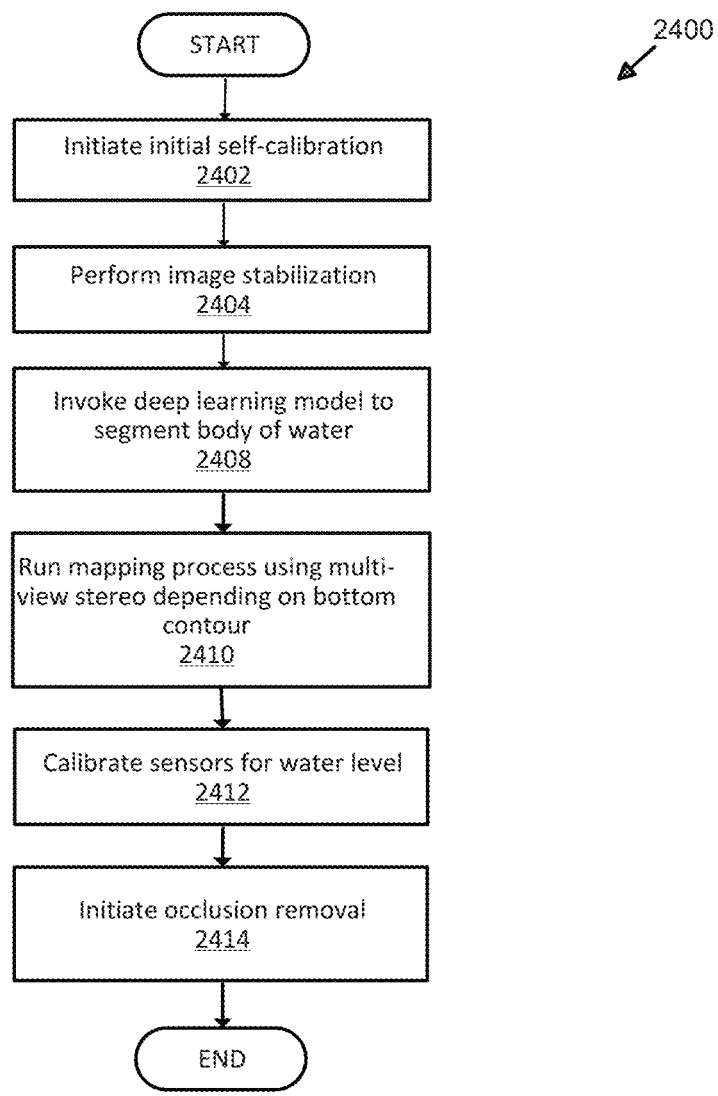
FIG. 24A illustrates an exemplary calibration process for analysis and deep learning modeling of sensor-based detection data in bounded aquatic environments.

FIG. 24A illustrates an exemplary calibration process for analysis and deep learning modeling of sensor-based detection data in bounded aquatic environments. Here, process 2400 may be a more detailed process configured to be performed as described above in connection with process 2304 (FIG. 23). In some examples, initial calibration (i.e., of above-water and underwater sensors) is initiated (2402). Image stabilization is performed, which may include camera calibration (i.e., for optical sensors) and software-based stabilization for self-calibration using features in the aquatic environment (2404). In some examples, image stabilization can counter movement caused by wind and water movement. Deep learning module 108 (FIG. 1A) is invoked (e.g., called, instanced, or otherwise sent control signals or data to begin running, compiling, or otherwise computing) to segment a body of water (e.g., aquatic environment) (2408). Segmentation processes may be used, as described herein, to map the bottom contour or floor of an aquatic body (e.g., body of water, swimming pool, diving tank, pond, wading pool, or the like). In some examples, using a deep learning model to segment the extent of a body of water may be performed when the aquatic body is devoid of detected persons and objects, which aids in detecting background features and fixed features such as steps, entry/exit points, and others. Further, segmentation may be useful in using underwater sensors (e.g., sensor 1106 (FIG. 11A)) to map a bottom or floor of an aquatic body. In some examples, the use of multi-stereo techniques may be employed to map the floor of an aquatic environment (2410). In other examples, other techniques may be used. As described above, if a pool floor is assumed to be smooth (i.e., planar), a homography transformation may be used for mapping. Otherwise, a full stereo reconstruction of a floor (i.e., bottom, bottom contour, or the like) of an aquatic environment floor may be performed using, in some examples, active illumination patterns such as those described herein (e.g., light curtains, light sheets, and the like).

Here, sensors may be calibrated for the water level (i.e., waterline) in an aquatic environment (2412). As mentioned above, determining an air-water interface for an aquatic environment supports performing calibration for refractions generated by the water (i.e., liquid) surface and for identifying when a detected head of a person is nearing said surface. If the water surface of an aquatic environment is still with no persons or objects present, the surface may be assumed to be planar in which a planar homography transformation may be used to determine the waterline (i.e., a waterline). If the surface of an aquatic environment is not still, stereo reconstruction of the pool sides may be performed using one or more sensors and/or sensor arrays. In other words, a water-level plane may be visualized (i.e., projected to) in all camera views, above and underwater. After performing water-level calibration, process(es) for occlusion removal may be initiated (2414). In some examples, occlusion removal may be performed by using multiple sensors positioned at different points in an aquatic environment to create a single "virtual" sensor. For example, multiple cameras (i.e., optical sensors) may be positioned at different points in a swimming pool, but the collective imagery and data gathered may be combined and used to construct a virtual camera array or synthetic aperture whose input can be implemented akin to a very large aperture with a shallow depth of field in order to remove visual occlusions. Another technique for occlusion removal may be performed by using a tilt-shift lens to create a shallow depth of field along a plane of the surface of the aquatic environment. Using a shallow depth of field defocuses objects far away from the water surface and instead keeps objects near the plane of the water surface in focus (i.e., thus, eliminating occlusions). In other examples, a synthetic aperture such as that described above may be combined with the use of one or more tilt-shift lenses to keep an object in focus while defocusing other objects and those that are farther away from the plane of the water surface. In other examples, process 2400 may be varied in order, function, scope, configuration, sub-processes, or the like and is not limited to the examples shown or described.

Figure 24B:
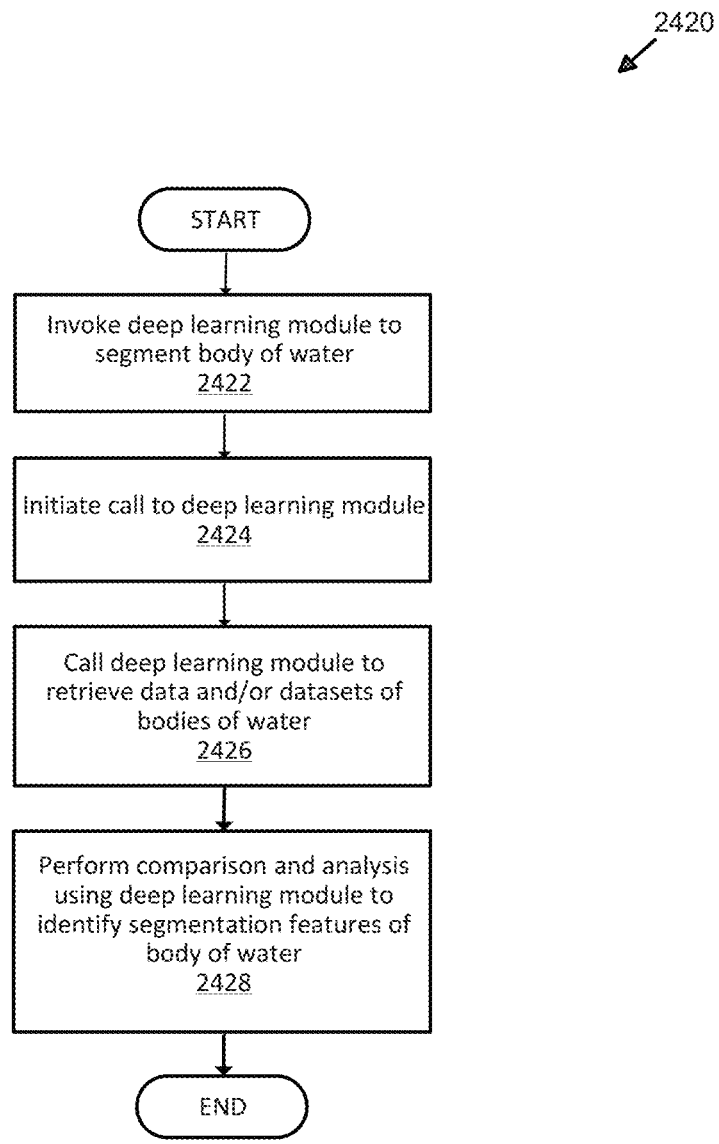
FIG. 24B illustrates an exemplary process for segmentation of bodies of water for analysis and deep learning modeling of sensor-based detection data in bounded aquatic environments.

FIG. 24B illustrates an exemplary process for segmentation of bodies of water for analysis and deep learning modeling of sensor-based detection data in bounded aquatic environments. Here, process 2420 begins by invoking deep learning module (e.g., deep learning module 108 (FIG. 1A)) to segment an aquatic environment for various purposes (2422). For example, mapping the bottom or floor of a swimming pool or other aquatic environment may be performed using deep learning models that, when invoked, may be used to compare captured images, video, tracklets, or the like to databases of images of bottoms or floors of aquatic environments. A call may be initiated to a deep learning module (e.g., deep learning module 108 (FIG. 1A)) (2424). Once a call is initiated to invoke deep learning models, a request may be sent including queries for types of data, images, or other attributes of data to be run through a deep learned model (2426). For example, data and/or datasets retrieved from one or more databases of aquatic environments may be run through a deep learned model that compares images captured by sensors 126 and/or 144 (FIG. 1A) to map the bottom of a swimming pool (2428). An exemplary process for mapping an aquatic environment is provided in greater detail below in connection with FIG. 24C. In other examples, process 2400 may be varied in order, function, scope, configuration, sub-processes, or the like and is not limited to the examples shown or described.

Figure 24C:
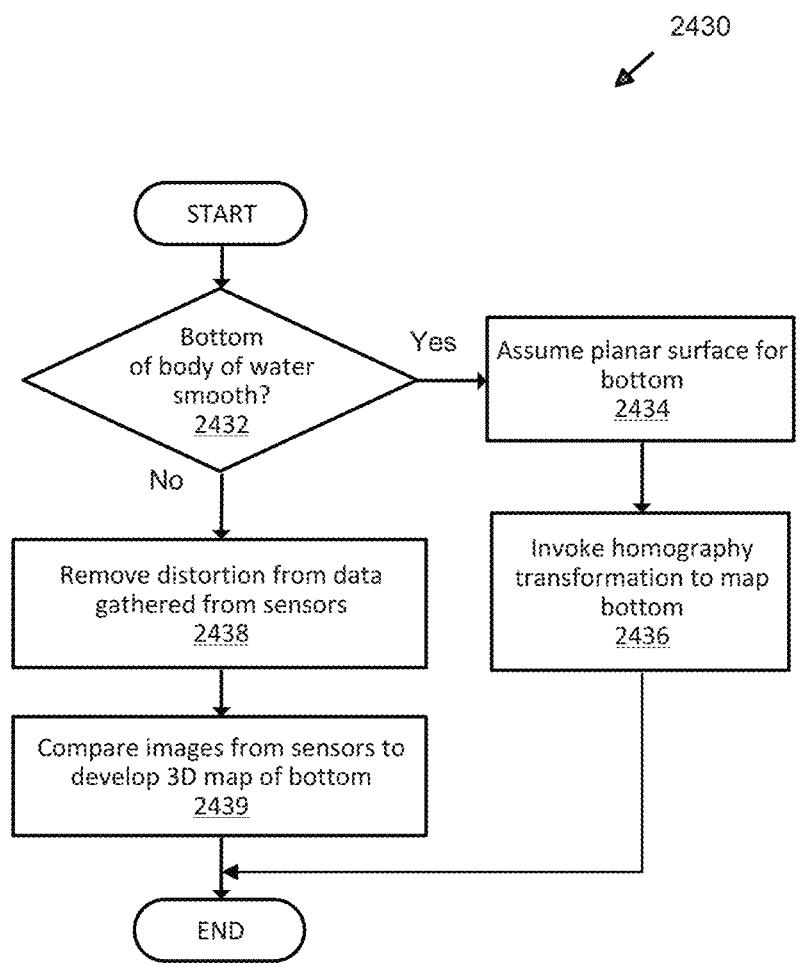
FIG. 24C illustrates an exemplary process for mapping aquatic environments for analysis and deep learning modeling of sensor-based detection data in bounded aquatic environments.

FIG. 24C illustrates an exemplary process for mapping aquatic environments for analysis and deep learning modeling of sensor-based detection data in bounded aquatic environments. Here, process 2430 begins by determining whether the bottom surface (e.g., swimming pool floor) of an aquatic environment is smooth (2432). If smooth, then an assumption may be made that the floor is planar (2434) and a homography transformation may be used to map the floor (2436). However, if the floor is not smooth, then distortion is removed from captured imagery, video, tracklets, or data from sensor(s) 126 and/or 144 (FIG. 1A) (2438). After removing distortion, captured imagery (or the converted data thereof) may be compared to those of deep learned models to develop a three-dimensional (i.e., 3D) map of the floor (2440). In other examples, process 2400 may be varied in order, function, scope, configuration, sub-processes, or the like and is not limited to the examples shown or described.

Figure 25A:
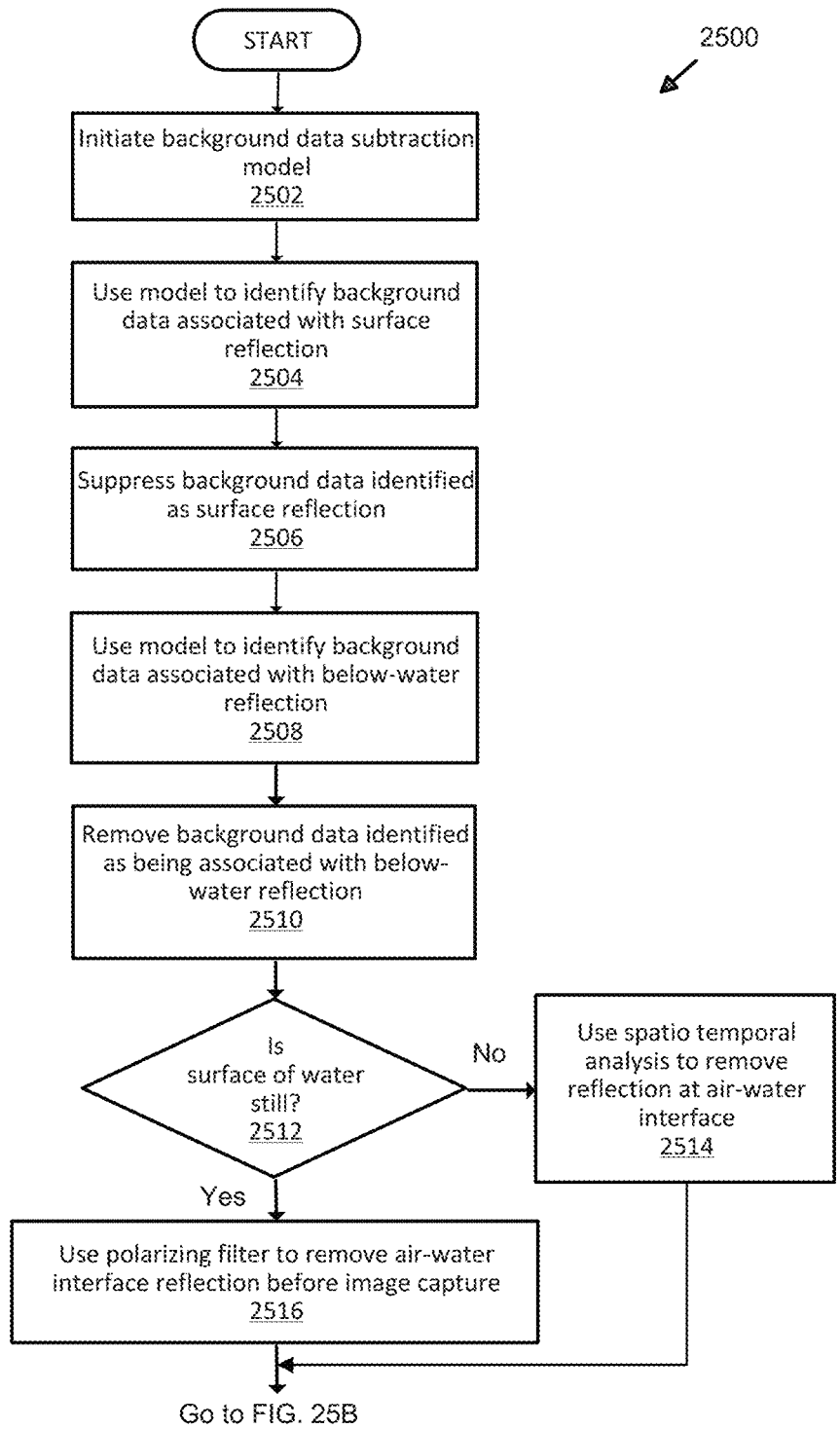
FIG. 25A illustrates an exemplary process for background subtraction in analysis and deep learning modeling of sensor-based detection data in bounded aquatic environments.
Figure 25B:
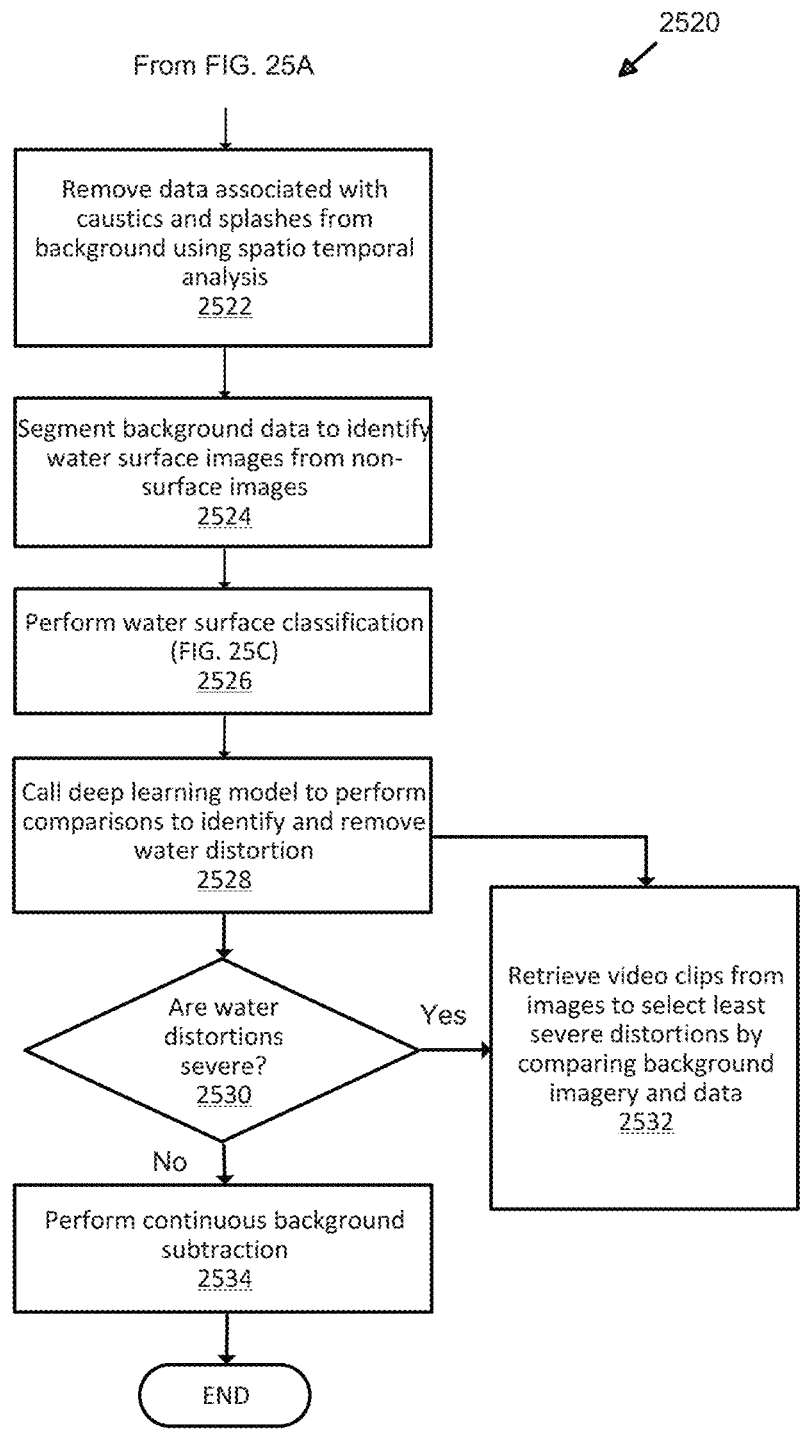
FIG. 25B illustrates a further exemplary process for background subtraction in analysis and deep learning modeling of sensor-based detection data in bounded aquatic environments.

FIG. 25A illustrates an exemplary process for background subtraction in analysis and deep learning modeling of sensor-based detection data in bounded aquatic environments. Here, process 2500 begins by initiating a background data subtraction data model (2502). As shown, a call may be generated by one or more modules of application 102 (FIG. 1A) to deep learning module 108 (FIG. 1A) to perform background subtraction to suppress surface reflections. Instead of data-driven techniques (i.e., those that collect and analyze imagery or data from sensors 126 and/or 144 (FIG. 1A)), one or more deep learning models may be used to identify background data associated with reflections at the surface or waterline of an aquatic environment (i.e., surface reflections) (2504). In some examples, surface reflections may be identified by comparing sensor input (e.g., imagery, data, or the like) to data referenced by deep learning module 108 (FIG. 1A). In other examples, images of surface reflections may be compared to those captured by sensors 126 and/or 144 by using deep learning module 108 (FIG. 1A) to reference model data 130 and/or 152 (FIG. 1A), the latter of which may be over a remote, distributed, virtual, or otherwise data network accessible database. Once identified, surface reflections may be suppressed as background (2506). After suppressing surface reflections as background, one or more deep learning models may be used to identify remaining background data and imagery associated with below-water (i.e., underwater) reflections (2508). Once identified, background imagery and/or data associated with below-water reflections may be removed (2510). A determination is then made as to whether the water surface is still (2512). If the water surface is not still, then spatio-temporal analysis may be used to identify and remove surface reflections at the air-water interface (i.e., waterline 716 (FIG. 7)) (2514). If the water surface is still, then a polarizing filter may be used by sensors (e.g., sensors 126 and/or 144 (FIG. 1A), sensors 712-714, 718-720 (FIG. 7)) to remove reflections from background imagery and/or data at the time of optical capture by sensors without requiring further processing by GPU 104, CPU 110, deep learning module 108, or any of the elements shown in connection with application 102 (FIG. 1A). As shown in FIG. 25B, processes for background subtraction are further described. In other examples, process 2500 may be varied in order, function, scope, configuration, sub-processes, or the like and is not limited to the examples shown or described.

FIG. 25B illustrates a further exemplary process for background subtraction in analysis and deep learning modeling of sensor-based detection data in bounded aquatic environments. Here, process 2520 is a continuing process for background subtraction. In some examples, data and/or imagery (as used herein, "data" may refer to any type of input captured by a sensor, regardless of form, format, or media) associated with caustics and splashes may be removed from background data and imagery using spatio-temporal analysis (2522). Next, background data and imagery may be segmented to identify water surface from non-surface data and imagery (2524). Classification of water surfaces may subsequently be performed in which deep learning module 108 (FIG. 1A) may reference stored water surface images or data stored in model data 130 and/or 152 (FIG. 1A) (2526). For example, application 102 (FIG. 1A) may be configured to access a body of stored data and images associated with swimming pools of various design, construction, appearance, materials, or other attributes. When classifying water surfaces, application 102 (FIG. 1A) may reference local databases using deep learning module 108 (FIG. 1A) to compare sensor data and images to identify and classify water surfaces, which aids application 102 in identifying objects approaching waterline 716 (FIG. 7) (2528).

Referring back to FIG. 25B, a determination is made as to whether detected (i.e., sensed) water distortions are severe (2530). If distortions are severe, then video clips (e.g., tracklets) are selected from sensor data 128 and/or 154 (FIG. 1A) to identify water surface videos with the least amount of distortion (2532) before removing distortions again (2528). If the water distortions are not severe, then the above-described process in FIGS. 25A-B are performed to provide continuous background subtraction from captured sensor input. In other words, by performing processes 2500-2520, background subtraction may be performed continuously, whether using data-drive techniques or deep learning models, in order to identify objects (e.g., person vs. non-person) in foreground data and imagery and to identify, associate, classify, correspond, track, and detect persons who may enter a drowning state. In other examples, process 2520 may be varied in order, function, scope, configuration, sub-processes, or the like and is not limited to the examples shown or described.

Figure 25C:
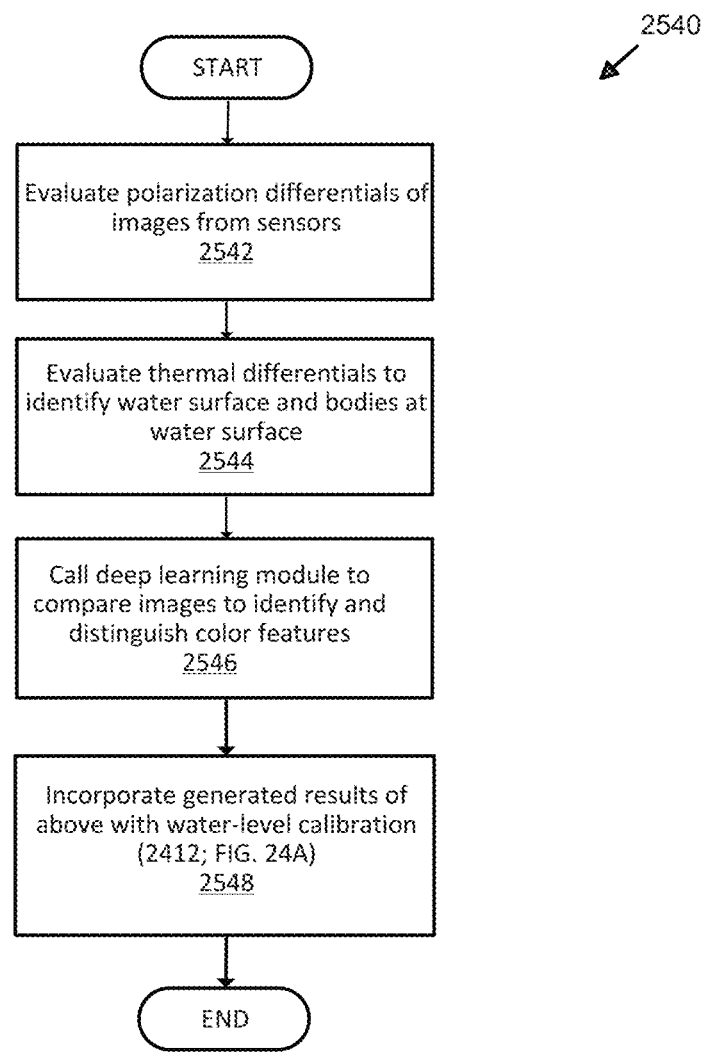
FIG. 25C illustrates an exemplary process for water surface classification in analysis and deep learning modeling of sensor-based detection data in bounded aquatic environments.

FIG. 25C illustrates an exemplary process for water surface classification in analysis and deep learning modeling of sensor-based detection data in bounded aquatic environments. Here, process 2540 may be implemented to classify water surfaces as a sub-process of background subtraction, detect person-related objects (e.g., body, head, or portions thereof) and distinguish them from non-person objects. Process 2540 may start, in some examples, by evaluating polarization differentials of images and/or data captured by sensors (e.g., sensors 126 and/or 144 (FIG. 1A)) (2542). Next, thermal differentials are evaluated to identify and distinguish bodies (i.e., body, head, or parts and/or portions thereof) at the water surface or surface of an aquatic environment (2544). In some examples, if data-driven sources are unable to collect and analyze sufficient imagery and data to identify and distinguish bodies, deep learning module 108 (FIG. 1A) may be called to reference images and/or data stored in model data 130 and/or 152 (FIG. 1A) in order to identify and distinguish color features of persons (or portions thereof) from the water surface (2546). The results of these processes may be incorporated (i.e., combined in whole or part) with water-level calibration results, such as those determined at 2412 of FIG. 24A (2548). In other examples, process 2540 may be varied in order, function, scope, configuration, sub-processes, or the like and is not limited to the examples shown or described.

Figure 26A:
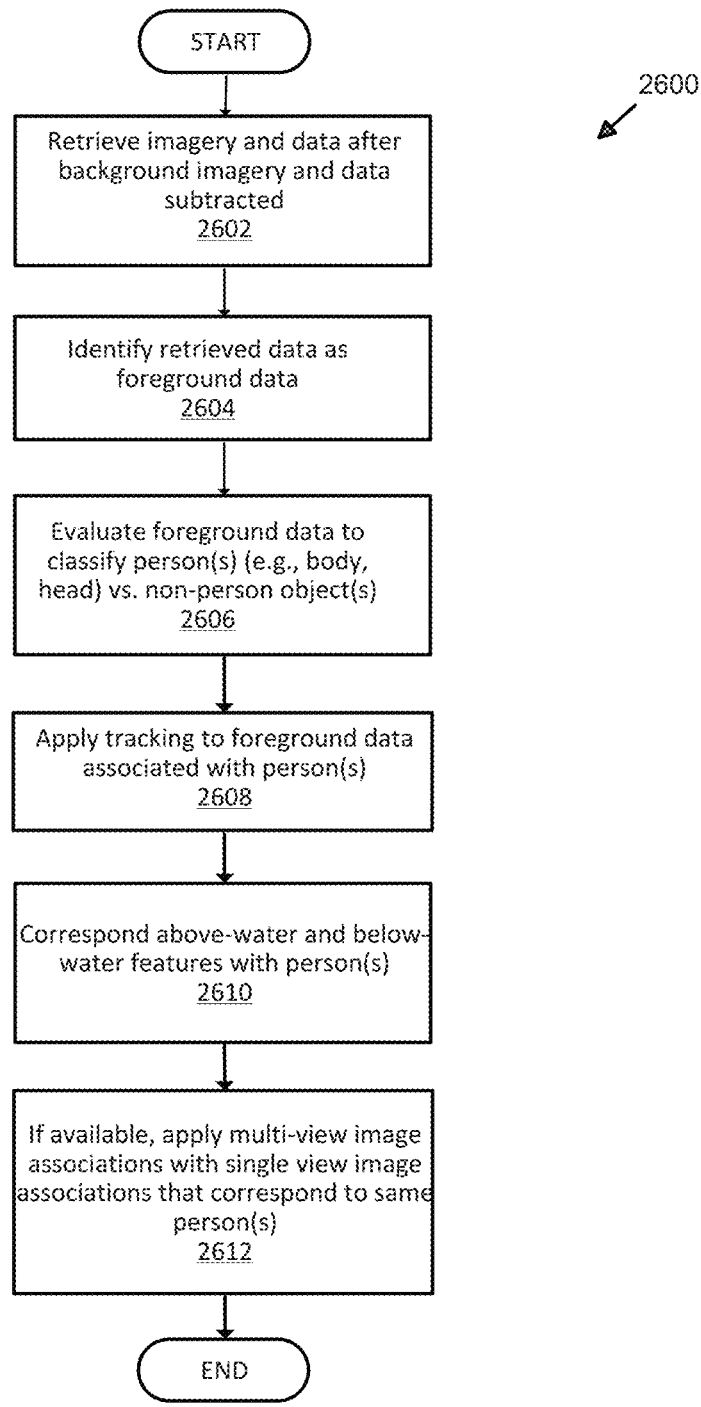
FIG. 26A illustrates an exemplary process for detection and classification of bodies in analysis and deep learning modeling of sensor-based detection data in bounded aquatic environments.

FIG. 26A illustrates an exemplary process for detection and classification of bodies in analysis and deep learning modeling of sensor-based detection data in bounded aquatic environments. Here, process 2600 begins by retrieving imagery and data after background imagery and data have been subtracted (2602). Next, the retrieved imagery and data is identified as "foreground data" (2604). The foreground data is evaluated to classify detected person vs. non-person objects (2606). Once classified (i.e., by classifier 122 (FIG. 1A)), foreground data associated with persons is tracked (2608). As described herein, "classify" may include identifying persons vs. non-person objects, associating detected objects with individual person or non-person objects, which may further include creating correspondences between detected, classified objects (i.e., above-water and underwater (i.e., "below-water") and persons to whom the body, body parts, head, or portions thereof, belong 2610). If available, imagery (i.e., images, video, tracklets, or the like) and data from multiple sensors (e.g., above-water sensors 712-714, underwater sensors 718-720 (FIG. 7), or the like) or multiple tile units (e.g., tile units 702-704 (FIG. 7), or the like) maybe used to create and apply associations with single view associations that correspond to the same person (2612). In other words, associations created (i.e., generated between detected objects that correspond to the same person may result from captured imagery and data from a single sensor or sensor array. However, if multiple tile units, sensors, and or sensor arrays are used, process 2600 may combine detected input and associations by using application 102, tracking module 112, and CPU 110 (FIG. 1A) to further associate them to a single individual or person. This improves accuracy of detection and tracking, and increases the probabilistic likelihood of tracking persons and detecting drowning events occurring, providing an enhanced opportunity for intervention and drowning prevention. In other examples, process 2600 may be varied in order, function, scope, configuration, sub-processes, or the like and is not limited to the examples shown or described.

Figure 26B:
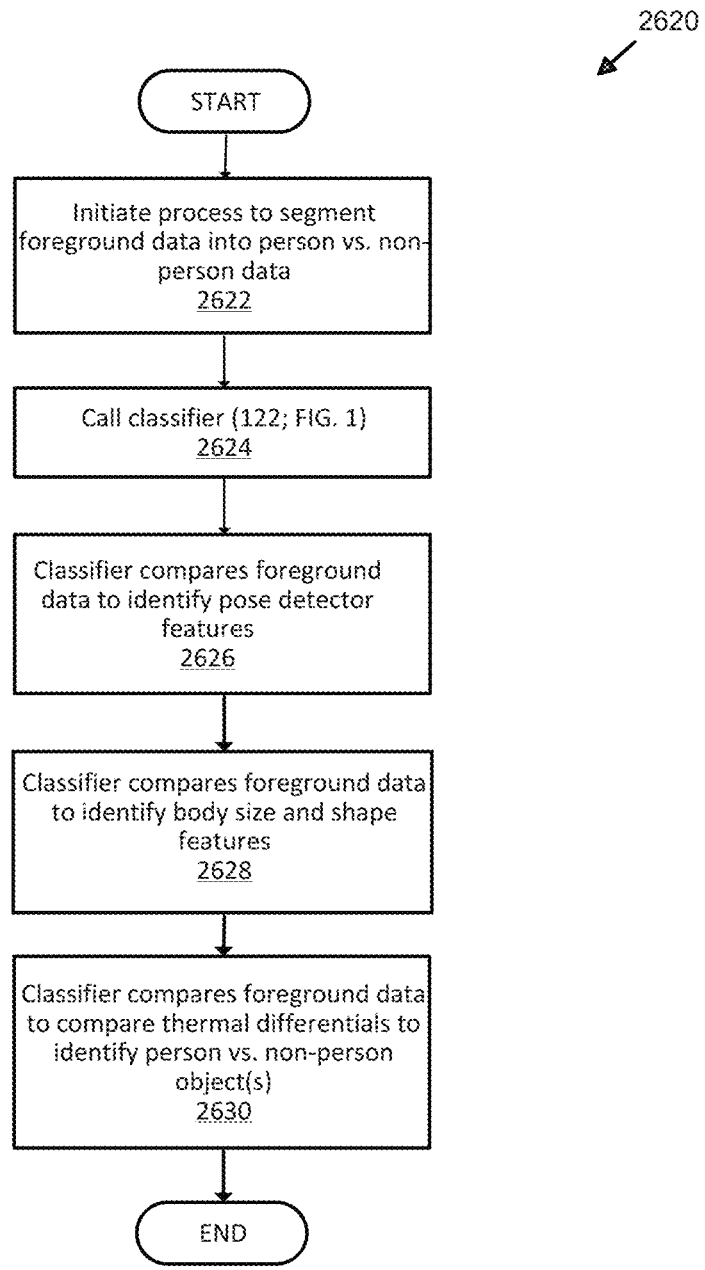
FIG. 26B illustrates a further exemplary process for classification in analysis and deep learning modeling of sensor-based detection data in bounded aquatic environments.

FIG. 26B illustrates a further exemplary process for classification in analysis and deep learning modeling of sensor-based detection data in bounded aquatic environments. Here, classification process 2620 begins by initiating a process to segment foreground data into person or non-person data (2622). As previously mentioned, "person" may refer to humans or animals such as domestic pets or wildlife, without limitation or restriction. Once segmented into person vs. non-person data, classifier 122 (FIG. 1A) is called to classify person data (i.e., imagery and/or data) based on various classifications that are either stored as sensor data 128 and/or 154 (FIG. 1A) or learned from deep learning module 108 and model data 130 and/or 152 (FIG. 1A) (2624). In some examples, classifier 122 is configured to compare foreground data to sensor data 128 and/or 154 (FIG. 1A) or, using deep learning module 108 (FIG. 1), model data 130 and/or 152 (FIG. 1A) to detect and identify poses or features (2626). Further, classifier 122 may be configured to compare foreground data to sensor data 128 and/or 154 (FIG. 1A) or, using deep learning module 108 (FIG. 1), model data 130 and/or 152 (FIG. 1A) to identify body or body part size, shape, and other features (2628). Classifier 122 (FIG. 1A) may be configured to compare foreground data to thermal data (i.e., sensor data 128 and/or 154 (FIG. 1A)) to identify any thermal differentials (i.e., differences in temperature) between detected objects (i.e., person vs. non-person) and an aquatic environment (2630). Using classification process 2620, persons may be classified to be separated from non-person objects in order to prioritize and distinguish said objects for tracking purposes, as described here. In other examples, classification process 2620 may be varied in order, function, scope, configuration, sub-processes, or the like and is not limited to the examples shown or described.

Figure 26C:
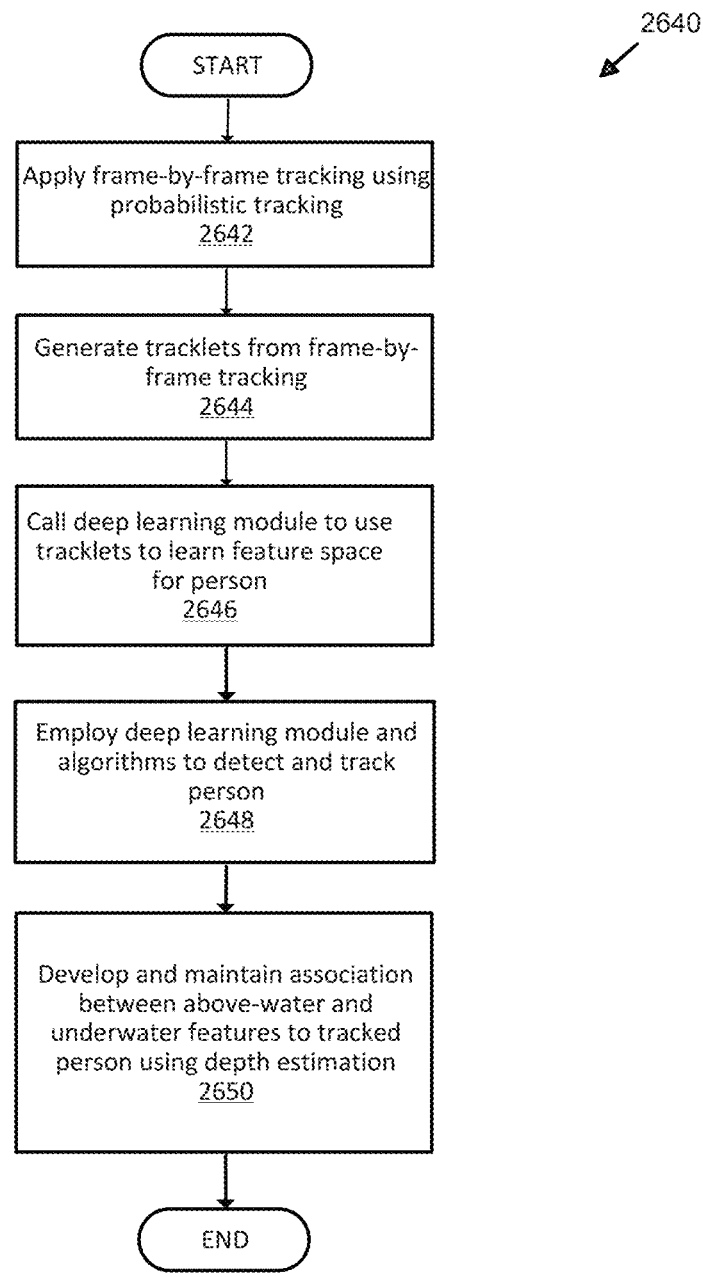
FIG. 26C illustrates yet another exemplary process for classification in analysis and deep learning modeling of sensor-based detection data in bounded aquatic environments.

FIG. 26C illustrates yet another exemplary process for tracking using analysis and deep learning modeling of sensor-based detection data in bounded aquatic environments. Here, process 2640 begins by applying frame-by-frame tracking using probabilistic tracking approaches, which may be various and are not limited to any specific type (2642). Tracklets (i.e., short video clips taken from large video segments captured by sensors (e.g., sensors 126 and/or 144 (FIG. 1A))) are generated as a result of the frame-by-frame tracking (2644). Deep learning module 108 (FIG. 1A) is called to use the generated tracklets as input to one or more deep learning models (or algorithms) in order to "learn" a feature space for a person (2646). In other words, a deep learning model may be used by deep learning module 108 to compare the generated tracklets to referenced imagery and data in order to identify features on a detected person-related object. In some examples, various algorithms may be used to develop the schema for one or more deep learned models including, but not limited to those used for convolutional neural networks, feature detection with the aid of depth information from range scanners (e.g., range scanners employed as sensors 650-652 (FIG. 6B)), unsupervised deep learning with superpixel segmentation, multiple viewpoints with a probabilistic framework, articulate human modeling, and others, without limitation or restriction (2648). Once features (e.g., head, hair, eyes, ears, chin, skeletal structure, skull structure, skin blemishes or features, sallowness, or other attributes, without limitation or restriction) are learned by deep learning module 108 using one or more deep learned models (not shown), above-water and underwater (i.e., below-water) associations of features to a given person are maintained and tracked (2650). In some examples, applying depth estimation to identified features may be used to narrow or reduce the number of possible associations and, consequently, reduce the processing load placed on CPU 110 (FIG. 1A). In other examples, geometric fundamental matrix constraints may also be used to eliminate incorrect associations between imagery captured by above-water and underwater sensors (e.g., cameras, optical sensors, range sensors, range finders, and others). Further, association (i.e., corresponding features to a given person) may be facilitated using calibrated range scanners above-water and underwater by also using depth information of tracked persons as an additional input to improve accuracy. In other examples, classification process 2640 may be varied in order, function, scope, configuration, sub-processes, or the like and is not limited to the examples shown or described.

Figure 27A:
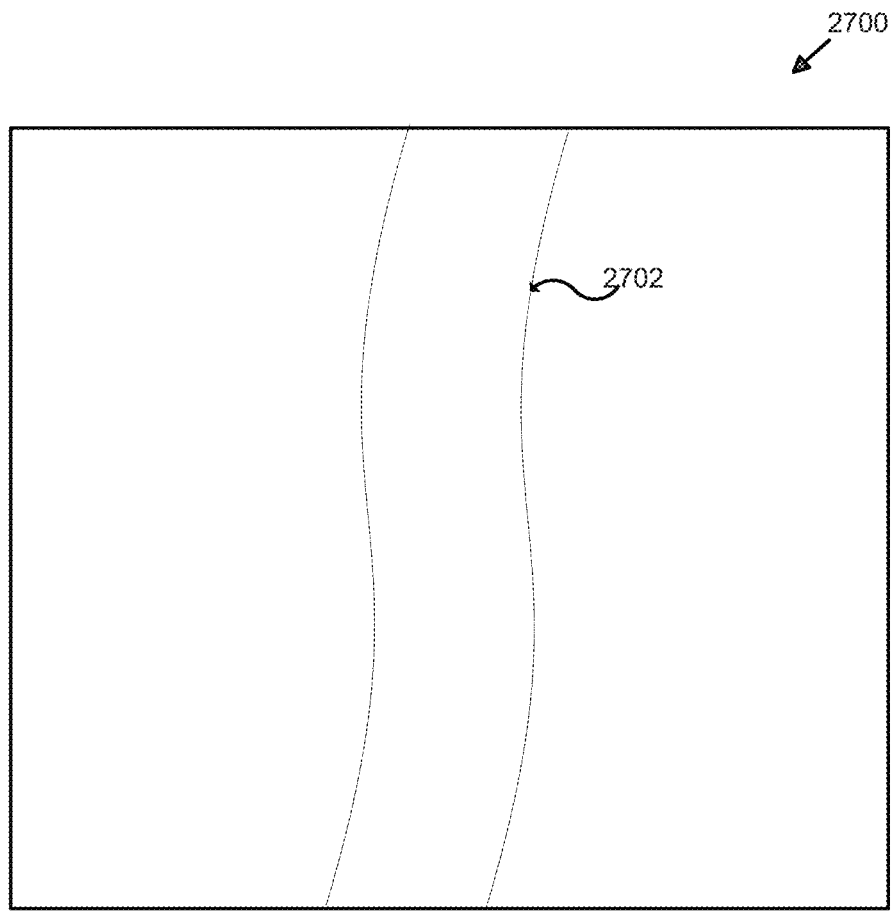
FIG. 27A illustrates an exemplary graphical representation of motion features generated in analysis and deep learning modeling of sensor-based detection data for organic motion determination in bounded aquatic environments.

FIG. 27A illustrates an exemplary graphical representation of motion features generated in analysis and deep learning modeling of sensor-based detection data for organic motion determination in bounded aquatic environments. Here, display 2700 represents an example of a visual presentation of processed or analyzed data of a detected object within a bounded aquatic environment. Region 2702, in some examples, may be an aggregated plot of coordinates, rays, or other mathematical constructs used to plot detected motion (e.g., irregular or regular) associated with a detected object (e.g., motion associated with an organic (i.e., organic motion) or inorganic object). Region 2702, in some examples, may represent a plot or other visual graphical depiction of data gathered showing regular motion, which may be associated with an organic or inorganic object. For example, a ball floating in a swimming pool may be captured (i.e., as an image by a camera or other image capture device that is configured to provide input to image capture module 182 (FIG. 1C)) and analyzed using the techniques described herein (e.g., system 180 (FIG. 1C)) and data generated from the results of an analysis may be presented in display 2700 as region 2702. Motion features (i.e., components of captured, analyzed, or processed motion from captured images, video, audio, or other input) of an object demonstrating regular motion may be graphically displayed as region 2702 while regions 2704-2706 may be presented to illustrate areas of a captured image, video, or the like that have no motion detected as a result of processing (e.g., analyzing) performed by system 180 (FIG. 1C) or the like. As shown in display 2700, motion features shown as region 2702 (e.g., regular motion) may be evaluated by classifier 190 (FIG. 1C) using deep or machine learning algorithms to determine and/or identify detected motion as being associated with an inanimate object. In some examples, regular motion or regular motion features (used interchangeably) may not be detected or result from analysis by system 180 (FIG. 1C), including deep learning and machine learning algorithms employed by classifier 190 (FIG. 1C) and additional logic (not shown) may be invoked to further determine a drowning condition does not exist and a signal is not generated and sent to drowning detection/alarm module 186 (FIG. 1C). In other examples, regular motion may be illustrated different and is not limited to the examples shown and described.

Figure 27B:
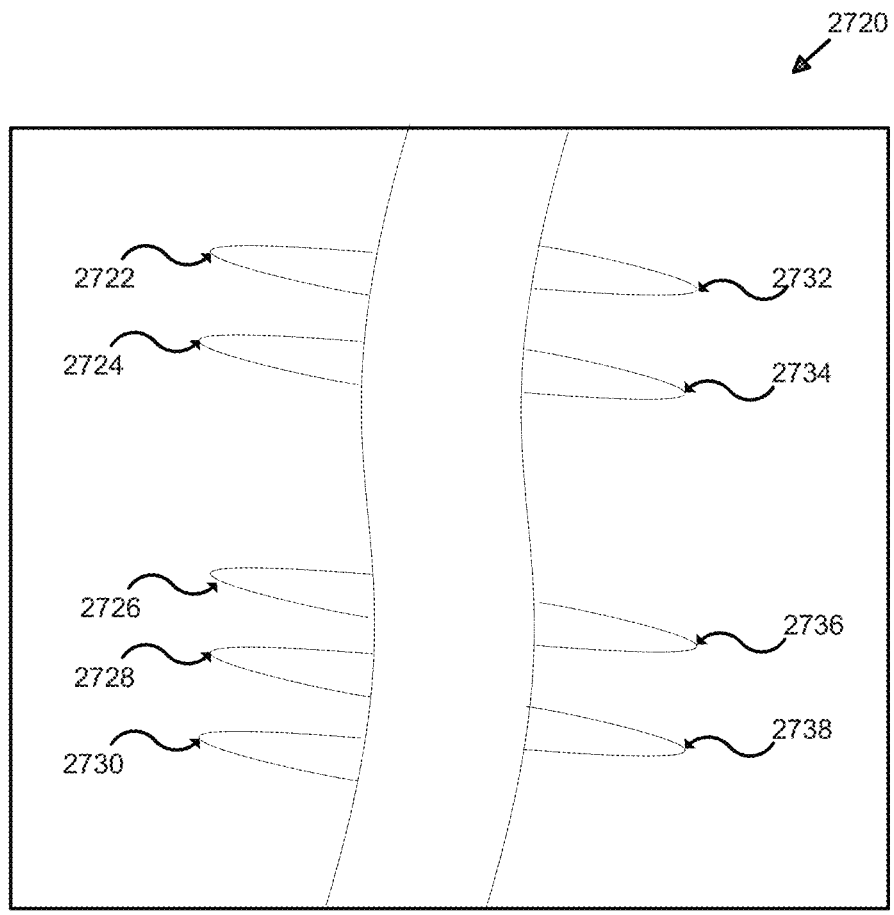
FIG. 27B illustrates another exemplary graphical representation of irregular motion features depicting organic motion as generated using techniques for analysis and deep learning modeling of sensor-based detection data for organic motion determination in bounded aquatic environments.

FIG. 27B illustrates another exemplary graphical representation of irregular motion features depicting organic motion as generated using techniques for analysis and deep learning modeling of sensor-based detection data for organic motion determination in bounded aquatic environments. Here, display 2720 illustrates regions 2740 and 2704-2706, which are configured to represent plotted areas or regions associated with irregular motion (i.e., region 2740) or no motion features entirely (i.e., regions 2704-2706, which may, when evaluated using invoked deep or machine learning algorithms, are determined to be background or foreground areas in which no detected objects are found as a result of processing data input to image capture module 182 (FIG. 1C) or other elements of system 180 (FIG. 1C)). In some examples, regions 2722-2740 may be referred to as "motion features," which are features of analyzed irregular or regular motion and which may be graphically depicted as shown in display 2720. For example, regions 2722-2738 may be motion features associated with irregular motion (i.e., organic motion emanating or originating from an animate object such as a human or animal). Region 2740 (which may be similar to region 2702 (FIG. 27A)) may be associated with regular motion (i.e., inorganic motion emanating or originating from an inanimate object such as a pool toy, ball, or any other inanimate object).

Here, region 2740 may represent a detected body or body part in an aquatic environment, as analyzed by image capture module 182 (FIG. 1C) and detected head/body parts detector module 184 (FIG. 1C) (as described throughout this Detailed Description, "head/body parts detector module 184" may be interchangeably referred to as "body parts detector module 184," "parts detector module 184," or "detector module 184," without limitations or restrictions). Regions 2722-2738 may be generated and displayed as a result of evaluating and processing data using system 180 (FIG. 1C).

Here, regions 2722-2738 may be generated and displayed as the result of evaluating and analyzing using deep learning or machine learning algorithmic techniques input data from image capture module 182 (FIG. 1C)). Irregular motion may be associated with animate objects that, when captured and processed by system 180 (FIG. 1C), may be plotted or rendered as irregular "rays," "zig zags," or other geometrical shapes that are intended to visually depict irregular motion originating from an animate object (e.g., a human or other animal body detected within a bounded aquatic or other environment being evaluated and analyzed by system 180 (FIG. 1C)). Here, regions 2722-2738 may be implemented and displayed as shapes that are regular or irregular in shape, but are shown emanating from region 2740. As an example, detected body parts (i.e., as determined by processing captured image data by head/body parts detector 184 (FIG. 1C)) are analyzed to identify coordinates associated with detected limbs, joints, parts, and other features of a body. In some examples, coordinates may be assigned relative to a surrounding environment (e.g., a bounded aquatic environment such as a swimming pool, lake, pond, bay, harbor, or the like). After assigning coordinates to detected body parts, historical analysis and comparison of analyzed captured image data may be run against deep or machine learning algorithms by classifier 190 (FIG. 1C)) and to develop a historical set of data that may be plotted to resemble display 2720, or the like. Motion features displayed in display 2720 may also be plotted historically over time to resemble a "heat map" in which motion features are plotted as regions of varying color, shape, or size to denote regular (i.e., motion associated with inanimate or inorganic objects; that is, inorganic motion) or irregular motion (i.e., motion associated with animate or organic objects; that is, organic motion). As shown, regions 2722-2738 may be displayed in association with region 2740 to graphically depict or display organic motion associated with a detected animate object such as a human or animal body or body part(s). In other examples, display 2720 may be generated and implemented differently, without limitation or restriction to any particular example shown and described.

Figure 28A:
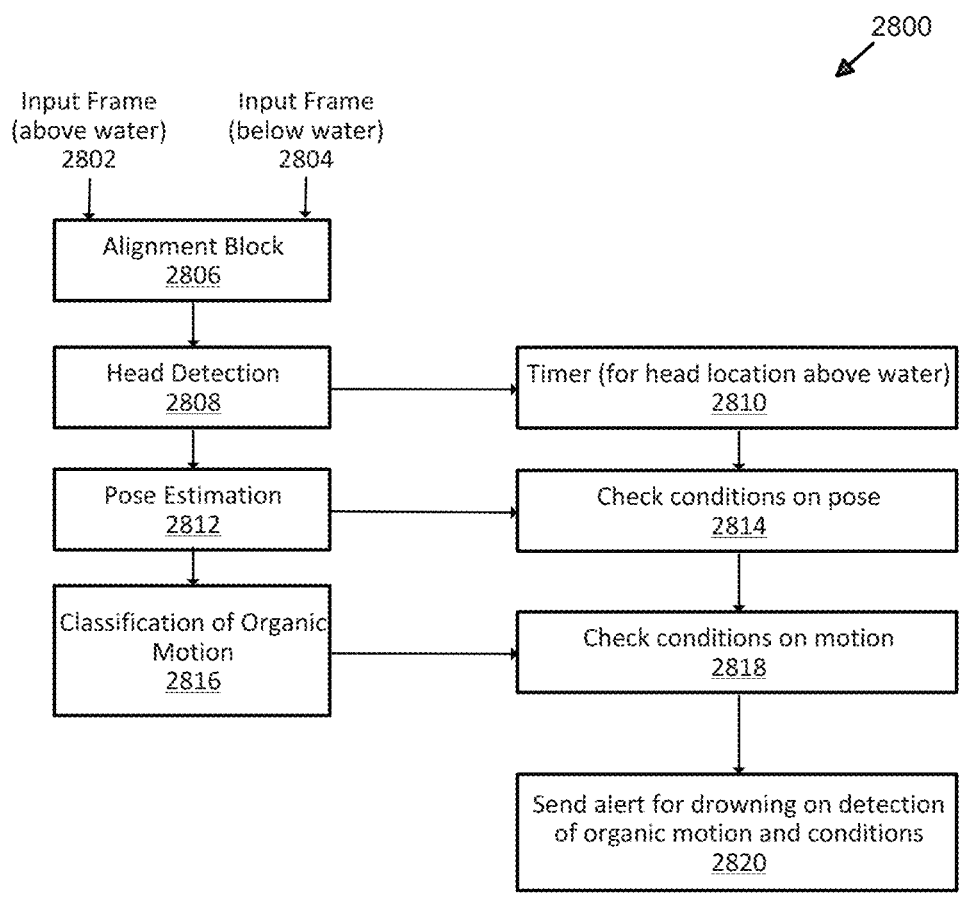
FIG. 28A illustrates an exemplary process for deep learning classification in analysis and deep learning modeling of sensor-based detection data in bounded aquatic environments.

FIG. 28A illustrates an exemplary process for deep learning classification in analysis and deep learning modeling of sensor-based detection data for organic motion determination in bounded aquatic environments. Here, process 2800 may begin by receiving input frames of captured images above water (2802) and/or images captured below or underwater (2804). Images captured (e.g., 2802-2804) may be captured by cameras or other image/video/audio capture devices and input to image capture module 182 (FIG. 1C), but are not limited to any specific type, specification, design, configuration, or other function. In some examples, input frames may be received as electrical or electronic signals or data such as digital conversion of captured images into data that may be transformed or converted by image capture device(s) before being transferred or transmitted to image capture module 182 (FIG. 1C).

Referring back to FIG. 28A, input frames 2802-2804 are sent to and received by image capture module 182 and processed to generate resultant data that may be further processed by other elements of system 180 (FIG. 1C). In some examples, alignment block 2806 may be configured, as a computing or logic-based module implemented using software, hardware, firmware, circuitry, or a combination thereof, to process data received from image capture module 182 to generate data that, when rendered, present aligned images captured above water with images captured below water. Alignment block 2806 may also perform other processing in aligning data associated with above and underwater images for further processing by other computing modules such as those shown in system 180 (FIG. 1C). For example, an object that is partially underwater such as a body or body part (e.g., head) may be processed by alignment block 2806 to align above and underwater images for further processing by head detection 2808.

As shown in FIG. 28A, head detection may be performed on data generated by image capture module 182 (FIG. 1C) and/or head/body parts detector module 184 (FIG. 1C) to identify within an image being processed (above and underwater (i.e., below a waterline)) body parts (2808). Identified body parts may be assigned coordinates relative to a surrounding environment that has been mapped. For example, a detected head may be assigned coordinates based on computing performed by classifier 190 (FIG. 1C) that employs deep learning or machine learning algorithms to identify facial features such as a nose, mouth, eyes, ears, or other facial features. Further, identified body parts and features, once assigned coordinates may be further tracked and evaluated. For example, a timer may be activated and used to assign times to detected body(s) and body part(s) that are underwater (2810). Using coordinates assigned to detected body(s) and body part(s), pose estimation may be performed using the techniques described herein (2812). By using pose estimation, system 180 (FIG. 1C) may be configured to not only identify a body(s) or body part(s) that are underwater, but may also employ deep learning or machine learning algorithms that can image, pattern, or perform other match or comparison processing to generate a computed estimation (using coordinates assigned by head/body parts detector module 184 (FIG. 1C)) of a pose for a body or body part detected above and/or below water (2812). Using rules, thresholds (i.e., quantitative or qualitative rules for generating an alarm signal if a nose or mouth (i.e., detected facial feature) is underwater (i.e., below a waterline) for a given period of time that is equal to or greater than a given amount of time as measured in microseconds, milliseconds, seconds, minutes, hours, or the like) may be compared to a given data set resulting from pose estimation 2812 (2814). Other conditions may be checked such as whether a particular body part or feature, once detected, is above or below water. Another condition that may be checked may be whether irregular organic motion has been detected and, if so, compared to another condition that evaluates time duration of said irregular organic motion and whether to generate a triggering alarm signal by drowning detection/alarm module 186 (FIG. 1C) (2814).

In some examples, if organic motion has been determined (i.e., a detected body, body part, or feature of an animated or organic body such as a human or animal) has been identified, detected, and evaluated, classification of said organic motion may be further classified (i.e., processed by classifier 190 (FIG. 1C)) using one or multiple deep learning or machine learning algorithms. Classification may include determining a type of organic motion (e.g., drowning, flailing, grasping, sinking, respiratory distress, spasming, swallowing, gulping, inhaling, erratic breathing, or others, without limitation or restriction) (2816). Further, depending on the type of motion detected (e.g., irregular or regular), conditions may be further checked (2818). For example, irregular motion of a detected body, body part, or feature may be checked to confirm various conditions set within system 180 in order to determine whether a drowning or other distress activity is occurring. In the event conditions are checked and irregular motion that has been classified as drowning, drowning-related, or distress, an alarm signal may be generated by drowning detection/alarm module 186 (FIG. 1C) and result in an audible, visual, haptic, combination, or other type of alarm that alerts nearby personnel (2820). In other examples, an "alert" or other alarm signal may also generate and send, using data processed by system 180, a location and identifying information as to the body generating organic motion. In still other examples, process 2800 and the above-described functions may be performed, configured, ordered, designed, or otherwise implemented differently and are not limited to those shown and described.

Figure 28B:
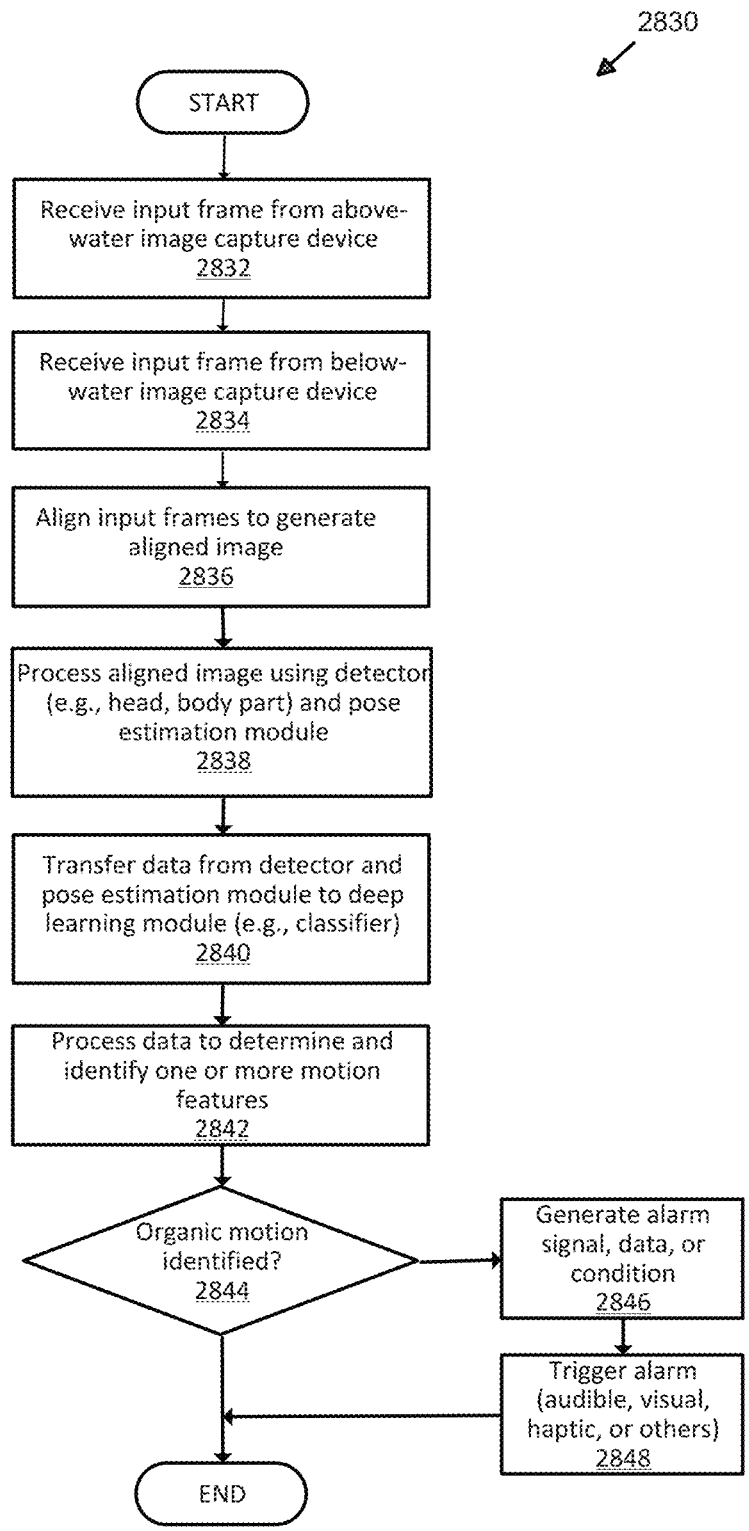
FIG. 28B illustrates another exemplary process for deep learning classification in analysis and deep learning modeling of sensor-based detection data for organic motion determination in bounded aquatic environments.

FIG. 28B illustrates another exemplary process for deep learning classification in analysis and deep learning modeling of sensor-based detection data for organic motion determination in bounded aquatic environments. Here, process 2830 begins by receiving an input frame of an above water image at an image capture device (2832). Another input frame of an underwater (i.e., below water, below a waterline) image is received by an image capture device (2834). In some examples, captured images by transmitted and received by image capture module 182 ((FIG. 1C) in various signal and data formats (e.g., analog voltage-varying signaling, digitally rectified waveforms (i.e., digital data)), without limitation or restriction. Further, the order in which processes 2832 and 2834 may be performed are presented arbitrarily and may be varied (i.e., there is no particular requirement for the order in which above and underwater images are captured and provided as input to image capture module 182 (FIG. 1C)).

Referring back to process 2830, input frames received are aligned for above water and underwater distortion or other effects in order to generate an input image or data set associated with an input image of an object, body, or body part in a bounded aquatic environment (2836). Once aligned, the image may be processed using head/body parts detector module 184 (FIG. 1C) and pose estimation module (FIG. 1C) (2838). As described herein, input data (e.g., data associated with input images captured by image capture devices such as a camera) may be processed by, for example, head/body parts detector module 184 to identify objects and determine whether body parts such as heads, arms, legs, torso, or other bodily features are present in captured images. In some examples, processed data may be used to also assign coordinates to various points on detected body(s) and body part(s) and, by evaluating coordinate data sets (i.e., data sets comprising coordinate values taken over particular time durations or ranges or at specific times), motion features can be identified and evaluated by one or more elements of system 180 (FIG. 1C). Further, identified body part(s) or object(s) may be further evaluated using the assigned coordinate values to points, positions, joints, lengths (e.g., forearms, upper arms, legs, torso, or other anatomical features) to identify and determine poses (i.e., pose estimation as described herein). By evaluating assigned coordinate values to detected body(s) and/or body part(s) and estimating poses, motion features may be identified as irregular motion that can be classified (i.e., by classifier 190 (FIG. 1C)) as organic motion as opposed to regular motion associated with inanimate objects, the former being used as triggering data or data sets to establish a detected drowning (once other conditions are evaluated such as time thresholds for submersion of detected body(s) and/or body part(s) such as a head, mouth, nose, or the like) and initiating an alarm or alert (as described herein, the terms "alarm" and "alert"

may be used interchangeably, without limitation or restriction) (2840). In some examples, processed data from head/body parts detector module 184 (FIG. 1C) and pose estimation module 188 (FIG. 1C) is transferred to classifier 190 (FIG. 1C), which is configured to run one or more deep learning or machine learning algorithms in order to classify data associated with the detected and identified motion features and pose estimations and to also evaluate classified data against user or system-input conditions (e.g., rules, thresholds, limitations, restrictions, or other processing considerations that may be generated by system 180 (FIG. 1C)) (2844). As shown in this example, a subsequent determination may be performed as to the type of motion feature (e.g., organic motion or inorganic motion, irregular motion or regular motion, or others) (2844).

In some examples, if no organic (i.e., irregular motion features) motion is detected, process 2830 ends. However, if organic motion is detected and system-performed checks of conditions indicate a drowning condition exists, an alarm signal, data, or other initiating condition may be generated (2846). Once generated, an alarm signal may be transmitted in order to trigger or initiate an alarm, which may be audible, visual, haptic, graphical, multimedia, or the like, without limitation or restriction (2848). In some examples, an alarm may be an audible alarm that sounds when a generated alarm signal is received. In other examples, an alarm may be a graphical and/or audible alert that is presented on a display or computing device (e.g., desktop, laptop, tablet, mobile, vehicular, mounted, fixed, unfixed) that not only creates an audible and/or visual alarm that a drowning condition exists, but may also identify a location or specific individual within a bounded aquatic environment and, in some examples, may present a two or three-dimensional display illustrating a drowning person(s) or animal(s) within a bounded aquatic environment. In other words, when a drowning condition (i.e., irregular motion features associated with organic motion) is determined, then an alarm may be presented, which may be implemented using various types of alarms, alerts, or presentations thereof, without limitation or restriction. In still other examples, the above-described processes associated with process 2830 may be varied in order, configuration, implementation, or other aspects, without limitation or restriction to any particular example shown or described.

Figure 29:
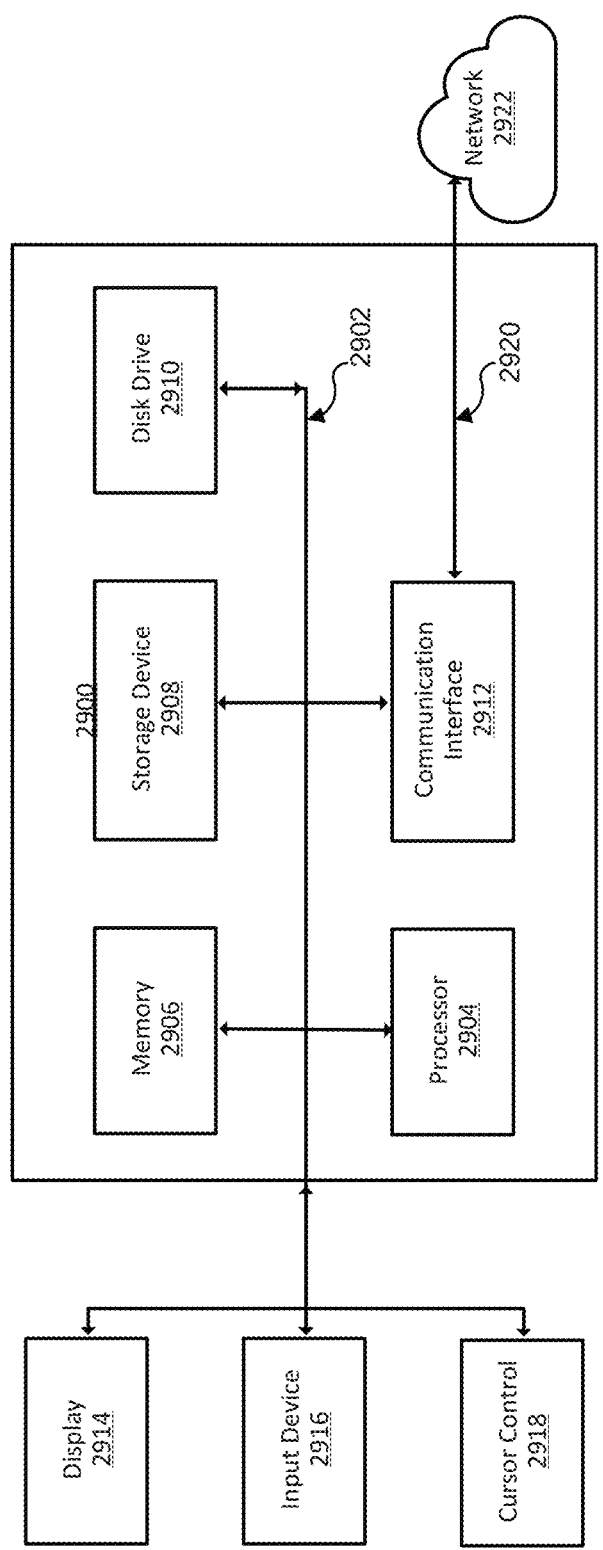
FIG. 29 illustrates an exemplary computing system suitable for analysis and deep learning modeling of sensor-based detection data in bounded aquatic environments.

FIG. 29 illustrates an exemplary computing system suitable for analysis and deep learning modeling of sensor-based detection data for organic motion determination in aquatic environments. In some examples, computer system 2900 may be used to implement computer programs, applications, methods, processes, or other software to perform the above-described techniques. Computing system 2900 includes a bus 2902 or other communication mechanism for communicating information, which interconnects subsystems and devices, such as processor 2904, system memory 2906 (e.g., RANI), storage device 2908 (e.g., ROM), disk drive 2910 (e.g., magnetic or optical), communication interface 2912 (e.g., modem or Ethernet card), display 2914 (e.g., CRT or LCD), input device 2916 (e.g., keyboard), cursor control 2918 (e.g., mouse or trackball), communication link 2920, and network 2922.

According to some examples, computing system 2900 performs specific operations by processor 2904 executing one or more sequences of one or more instructions stored in system memory 2906. Such instructions may be read into system memory 2906 from another computer readable medium, such as static storage device 2908 or disk drive 2910. In some examples, hard-wired circuitry may be used in place of or in combination with software instructions for implementation.

The term "computer readable medium" refers to any tangible medium that participates in providing instructions to processor 2904 for execution. Such a medium may take many forms, including but not limited to, non-volatile media and volatile media. Non-volatile media includes, for example, optical or magnetic disks, such as disk drive 2910. Volatile media includes dynamic memory, such as system memory 2906.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 2902 for transmitting a computer data signal.

In some examples, execution of the sequences of instructions may be performed by a single computer system 2900. According to some examples, two or more computing system 2900 coupled by communication link 2920 (e.g., LAN, PSTN, or wireless network) may perform the sequence of instructions in coordination with one another. Computing system 2900 may transmit and receive messages, data, and instructions, including program, i.e., application code, through communication link 2920 and communication interface 2912. Received program code may be executed by processor 2904 as it is received, and/or stored in disk drive 2910, or other non-volatile storage for later execution. In other examples, the above-described techniques may be implemented differently in design, function, and/or structure and are not intended to be limited to the examples described and/or shown in the drawings.

FIG. 30A illustrates a front view of an exemplary spacer ring used in analysis and deep learning modeling of sensor-based detection data in bounded aquatic environments using underwater powered systems. Here, spacer ring 3000 includes edges 3002-3006, surfaces 3008-3010, conduit channels 3012-3014 (hereafter "conduit channels" or "channels" may be used interchangeably, without limitation or restriction), and interlocks 3016-3022. As shown, spacer ring 3000 may be implemented as an element or component of, for example, system 700 (FIG. 7A), 730 (FIG. 7B), or others. Spacer ring may be an intermediate component used to enable power and/or data signaling voltages to be transferred between a power conduit supplying, for example, an underwater light (e.g., lighting unit 1400 (FIG. 14)) to one or more sensors, processors, hubs, or other elements of drowning detection systems such as those described herein.

In some examples, spacer ring 3000 may be formed and/or configured to be positioned, affixed, or otherwise disposed over, for example, a recess (i.e., opening (not shown)) in which light unit 1400 (FIG. 14) or other lighting fixtures, lights, or lighting units are installed, configured, and used in bounded aquatic environments such as swimming pools or the like. In some examples, spacer ring 3000 may be configured to provide structural support for passing wires, cables, or conduits (hereafter "conduits") of various gauges, diameters, and specifications between a power source (not shown; e.g., power source for an underwater light) and other elements of system 700 (FIG. 7A), as an example. Conduit channels 3012-3014 may be used to permit passage of conduits that are configured to transmit electrical current for power, data, or other purposes. Conduits may be passed through one or both of conduit channels 3012-3014 to transfer power between a power source (not shown) that may be disposed on one side of spacer ring 3000 or another. In other examples, more or fewer conduit channels other than conduit channels 3012-3014 may be implemented and are not limited to the placement, size, shape, location, or other attributes of the examples shown and described.

Spacer ring 3000, in some examples, may be formed using materials such as metal, alloy, plastic, wood, ceramic, or any other type of organic or inorganic substance, without limitation or restriction. Spacer ring 3000 may be formed to various dimensions, sizes, and shapes, without limitation or restriction. For example, spacer ring 3000 may be substantially circular, oval, rectangular, or any other shape, having edges 3002-3006 between which are formed surfaces 3008-3010. Although spacer ring 3000 is shown as being substantially circular, this implementation is provided for purposes of exemplary description and is not intended to be limiting. By using spacer ring 3000, system 700 (FIG. 7A) or system 730 (FIG. 7B), for example, may draw power from a power source for one or more components such as sensors (not shown) placed above or below a waterline. Power may be drawn or shared with an underwater lighting fixture (e.g., pool light) secured within an underwater recess using spacer ring 3000.

In some examples, a lighting fixture may be secured within a recess using spacer ring 3000 while also permitting conduits to transfer power and/or data using wires installed in conduits (not shown) passing through conduit channels 3012-3014 to provide electrical power and/or data communication capabilities (e.g., using signaling voltages of varying amount, sign, signal waveform, and the like). Transmission of electrical signals may include currents for power or voltages used for data signaling, regardless of whether voltages are categorized as "low," "line," or another type or category of voltage (in some examples, "low" voltage may refer to any voltage at or below, for example, 30 volts while "line" voltages may be those configured to transmit higher levels of current for appliances, devices, or other electrical requiring greater amounts of power)). In other words, conduit channels 3012-3014 may be configured to provide channels for conduits (i.e., configured to transmit electrical, optical, or other signals for power or data) of various sizes, shapes, gauge, diameters, or other dimensions, without limitation or restriction.

As shown, spacer ring 3000 may be mounted or otherwise coupled to a mounting structure such as a hook adapter (not shown; described below in connection with hook adapter 3100 (FIGS. 31A-31G)) directly or indirectly coupled to a wall or boundary of a bounded aquatic environment (e.g., a pool wall, pond wall, vessel hull, or the like). In some examples, edges 3002 and 3004 may be outer and inner vertical surfaces between which may be disposed surfaces 3008-3010, which may have different pitches or contours in order to accommodate structures over which spacer ring 3000 may be placed. For example, spacer ring 3000 may be designed, configured, or implemented to "fit" (i.e., placed, disposed, affixed, or the like) over the perimeter of a recess in which a pool or underwater light is disposed. In other examples, spacer ring may be disposed over one or more intermediate structures substantially disposed about the perimeter of a recess or lighting fixture. For example, spacer ring 3000 may be disposed over a bezel that is configured to retain or otherwise secure equipment (e.g., lighting, underwater, pool, sensor, or other fixtures or elements (not shown)) placed within a recess. Further, interlocks 3016-3022 may be structural features that are configured to detachably couple or otherwise engage, directly or indirectly, with one or more structural features in order to position, mount, or secure spacer ring 3000 in a fixed position, for example, about a recess or opening such as that in which a pool or underwater light or other electrically-powered apparatus may reside. Further, when spacer ring 3000 is detachably coupled to a hook adapter (not shown), interlocks 3016-3022 may be used with one or more fasteners (not shown), which may be metal, alloy, plastic, wood, adhesive, or other materials that be used to create mechanical, electromagnetic, chemical, or other types of fixtures. In still other examples, spacer ring 3000 can also be coupled to a wall or hook adapter (not shown) without using fasteners, but instead by detachably coupling, inserting, or otherwise engaging, mechanically or structurally, one or more of interlocks 3016-3022 with another structure formed directly into the wall of a bounded aquatic environment. In other examples, spacer ring 3000 and the elements shown may be designed, formed, configured, or implemented differently and are not limited to the examples shown and described.

FIG. 30B illustrates a rear view of an exemplary spacer ring used in analysis and deep learning modeling of sensor-based detection data in bounded aquatic environments using underwater powered systems. Here, a rear view of spacer ring 3000 is shown including edges 3002-3004, surfaces 3008-3010, conduit channels 3012-3014, interlocks 3016-3022, edges 3030-3034, and surfaces 3036-3038. In some examples, similarly-named and/or numbered elements may be designed, configured, function, and/or implemented similarly to previously-described elements (e.g., spacer ring 3000 includes edges 3002-3004, surfaces 3008-3010, conduit channels 3012-3014, interlocks 3016-3022, or others). As shown in this rear view of spacer 3000, edges 3002-3004 may be disposed as an outer edge and an inner edge, respectively, of spacer ring 3000, one or both of which may not only be edges of spacer ring 3000, but also vertical sides or walls. In some examples, edges 3002-3004, 3030-3034 may be used to create surfaces 3006-3008 to provide contoured shapes, surfaces, or features that are configured to receive, for example, features of other structure(s) such as a bezel or outer perimeter of a recess (not shown) when spacer ring 3000 is positioned, disposed, affixed, or otherwise implemented. Although edges 3002-3004, 3030-3034 and surfaces 3006-3008 are shown and described in FIG. 30B, the number, type, quantity, and configuration of edges and surfaces may be varied and are not limited to those shown and described, which are provided for purposes of exemplary description and not intended to be limiting or restrictive. Further, edges 3030-3034 may be disposed intermediate to edges 3002-3004, forming surfaces 3036-3038 disposed on the underside or rear of spacer ring 3000. In other examples, spacer ring 3000 and the elements shown may be designed, formed, configured, or implemented differently and are not limited to the examples shown and described.

Figure 30C:
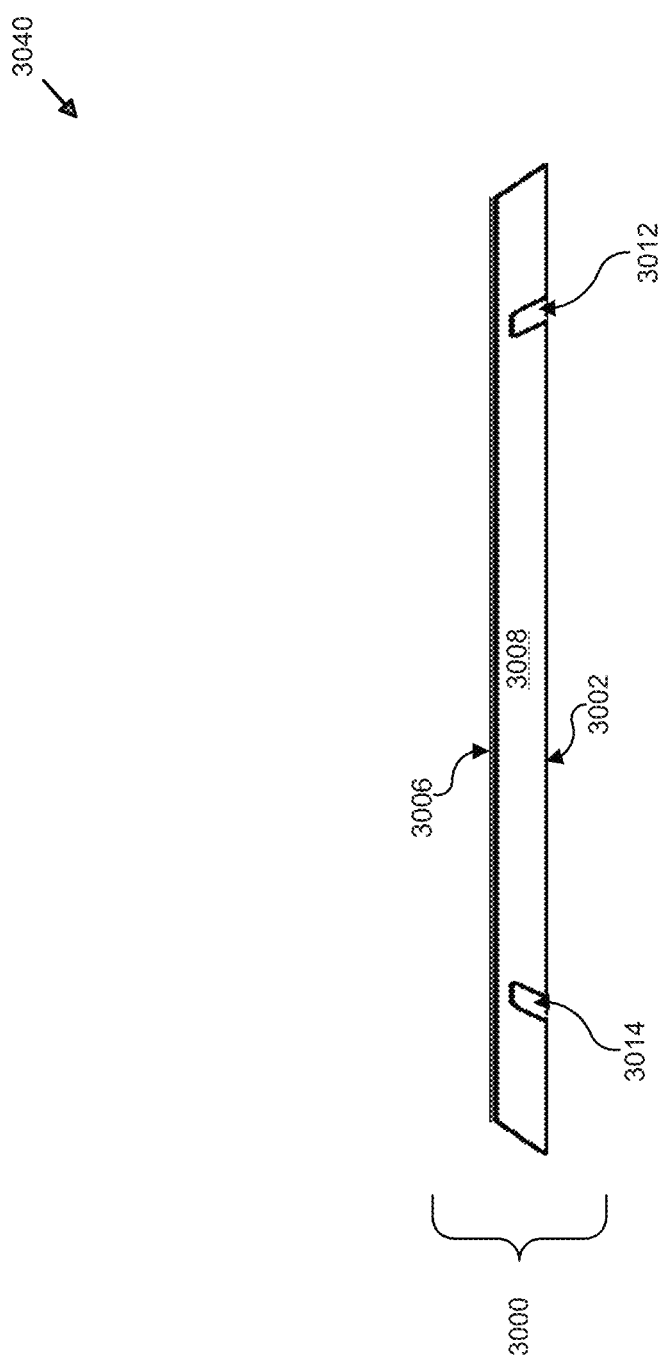
FIG. 30C illustrates a top view of an exemplary spacer ring used in analysis and deep learning modeling of sensor-based detection data in bounded aquatic environments using underwater powered systems.

FIG. 30C illustrates a top view of an exemplary spacer ring used in analysis and deep learning modeling of sensor-based detection data in bounded aquatic environments using underwater powered systems. Here, top view 3040 shows spacer ring 3000 including edges 3002 and 3006, surface 3008, and conduit channels 3012-3014. In some examples, similarly-named and/or numbered elements may be designed, configured, function, and/or implemented similarly to previously-described elements (e.g., spacer ring 3000 includes edges 3002-3004, surfaces 3008-3010, conduit channels 3012-3014, interlocks 3016-3022, or others). As shown, conduit channels 3012-3014 may be interposed in surface 3008 along the left and right sides of spacer ring 3000. In other examples, spacer ring 3000 and the elements shown may be designed, formed, configured, or implemented differently and are not limited to the examples shown and described.

Figure 30D:
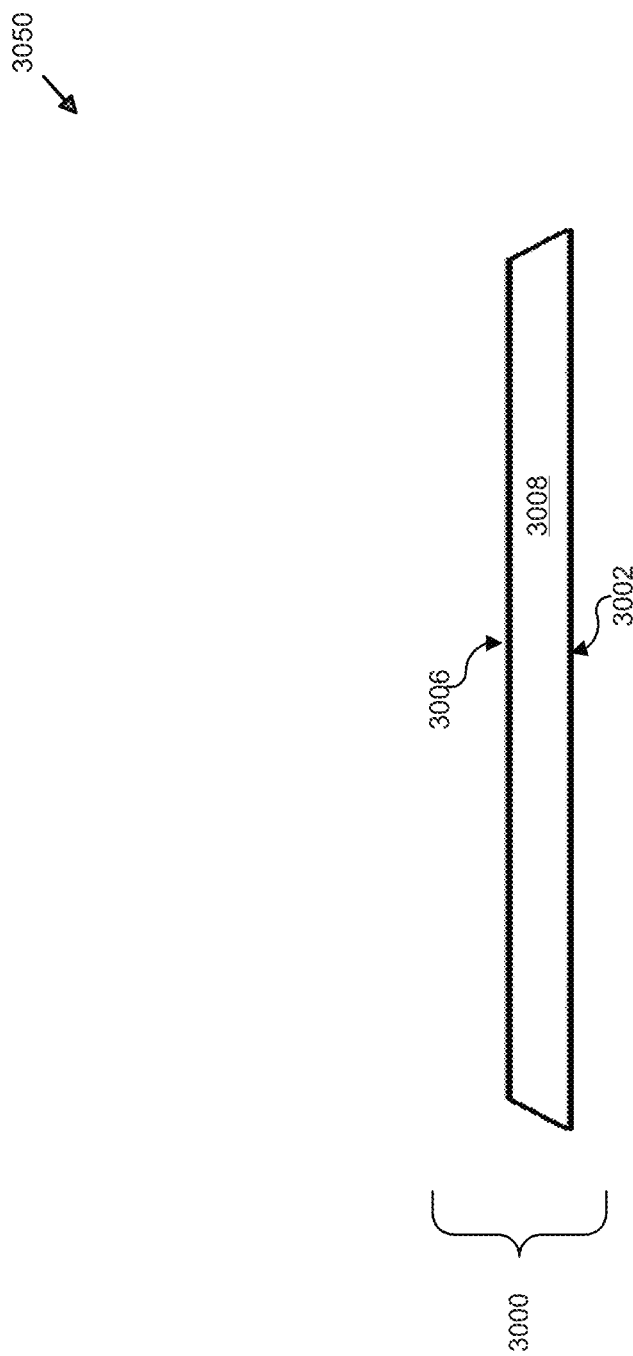
FIG. 30D illustrates a bottom view of an exemplary spacer ring used in analysis and deep learning modeling of sensor-based detection data in bounded aquatic environments using underwater powered systems.

FIG. 30D illustrates a bottom view of an exemplary spacer ring used in analysis and deep learning modeling of sensor-based detection data in bounded aquatic environments using underwater powered systems. Here, bottom view 3050 illustrates spacer ring 3000 including edges 3002 and 3006 and surface 3008. In some examples, similarly-named and/or numbered elements may be designed, configured, function, and/or implemented similarly to previously-described elements (e.g., spacer ring 3000 includes edges 3002-3004, surfaces 3008-3010, conduit channels 3012-3014, interlocks 3016-3022, or others). Although no conduit channels (e.g., conduit channels 3012-3014 (FIG. 30A)) are shown, in other examples, one or more conduit channels may be formed in any edge or surface of spacer ring 3000 to enable transfer of electrical signals for power and/or data. In other examples, spacer ring 3000 and the elements shown may be designed, formed, configured, or implemented differently and are not limited to the examples shown and described.

Figure 30E:
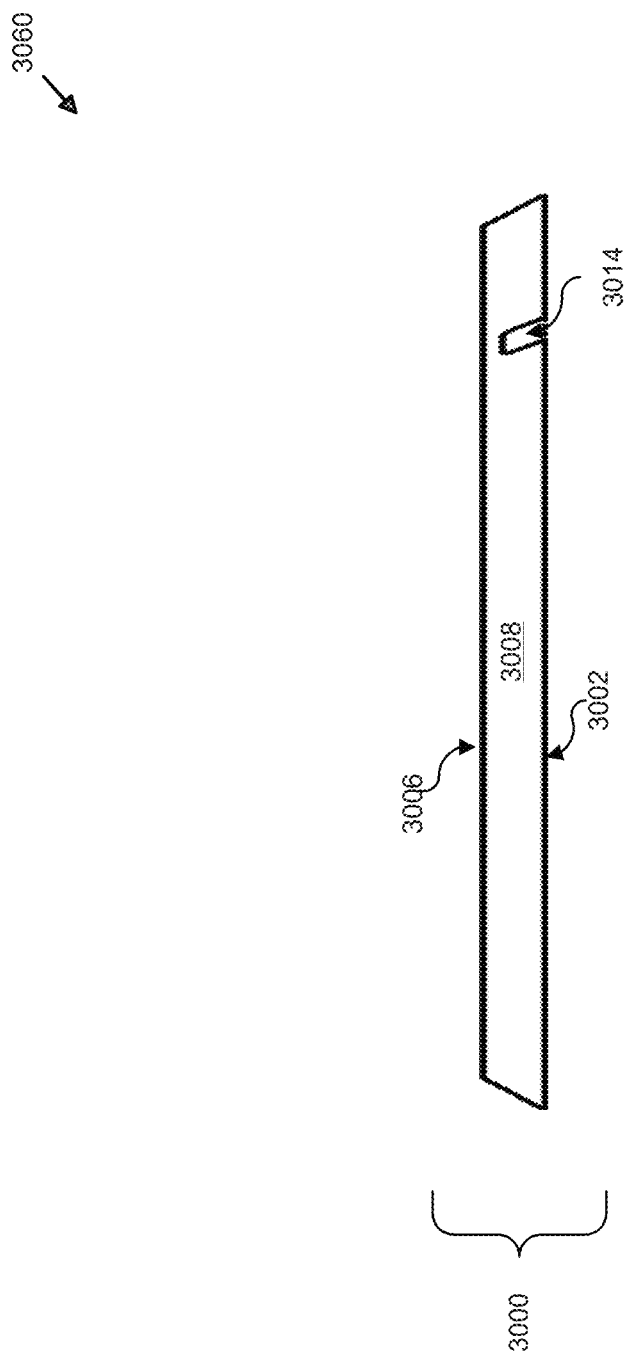
FIG. 30E illustrates a right view of an exemplary spacer ring used in analysis and deep learning modeling of sensor-based detection data in bounded aquatic environments using underwater powered systems.

FIG. 30E illustrates a right view of an exemplary spacer ring used in analysis and deep learning modeling of sensor-based detection data in bounded aquatic environments using underwater powered systems. Here, right view 3060 shows spacer ring 3000 including edges 3002 and 3006, surface 3008, and conduit channel 3014. In some examples, similarly-named and/or numbered elements may be designed, configured, function, and/or implemented similarly to previously-described elements (e.g., spacer ring 3000 includes edges 3002-3004, surfaces 3008-3010, conduit channels 3012-3014, interlocks 3016-3022, or others). As shown above and in connection with the present illustration, edge 3002 may be implemented having a substantially planar surface in order for spacer ring 3000 to be mounted in a flush or substantially flush position over and about the perimeter of a recess or bezel over an access (i.e., the bezel being configured to retain an underwater, pool, or other lighting or powered fixture within a recess) housing an underwater, pool, or other lighting fixture above or below a waterline, or a combination thereof. In other examples, spacer ring 3000 and the elements shown may be designed, formed, configured, or implemented differently and are not limited to the examples shown and described.

Figure 30F:
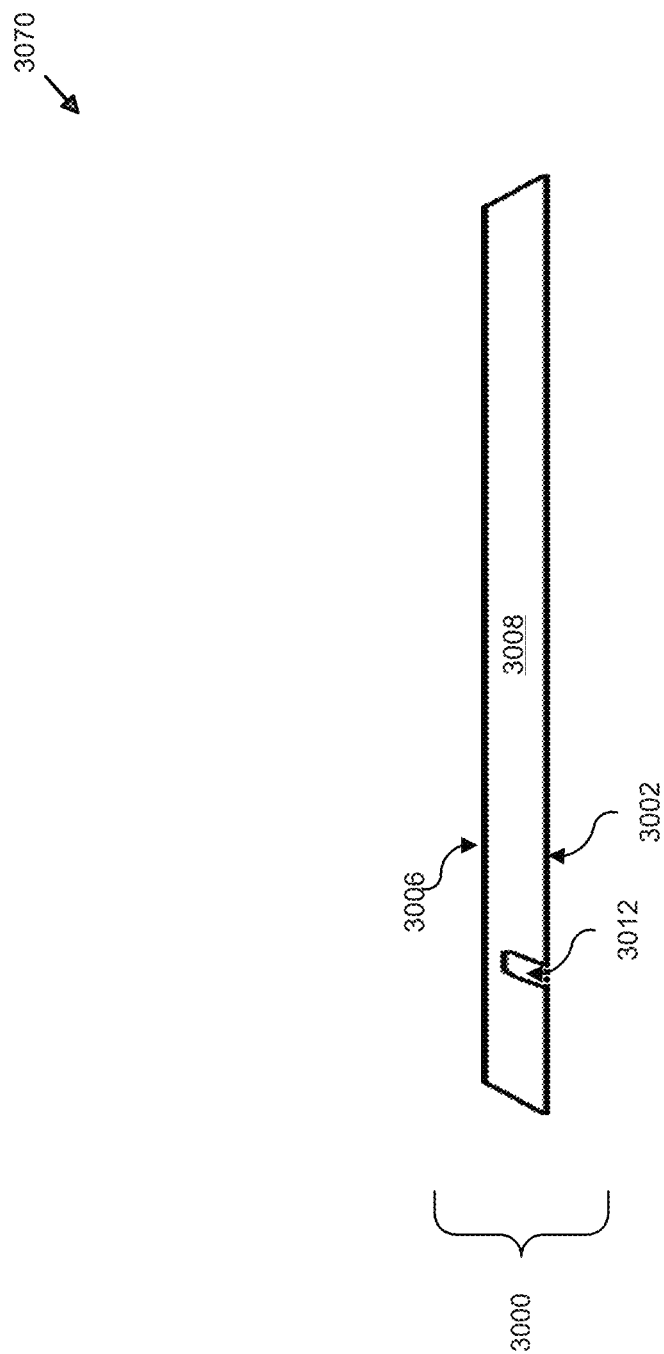
FIG. 30F illustrates a left view of an exemplary spacer ring used in analysis and deep learning modeling of sensor-based detection data in bounded aquatic environments using underwater powered systems.

FIG. 30F illustrates a left view of an exemplary spacer ring used in analysis and deep learning modeling of sensor-based detection data in bounded aquatic environments using underwater powered systems. Here, left view 3070 shows spacer ring 3000 having edges 3002 and 3006, surface 3008, and conduit channel 3012. In some examples, similarly-named and/or numbered elements may be designed, configured, function, and/or implemented similarly to previously-described elements (e.g., spacer ring 3000 includes edges 3002-3004, surfaces 3008-3010, conduit channels 3012-3014, interlocks 3016-3022, or others). In other examples, spacer ring 3000 and the elements shown may be designed, formed, configured, or implemented differently and are not limited to the examples shown and described.

Figure 30G:
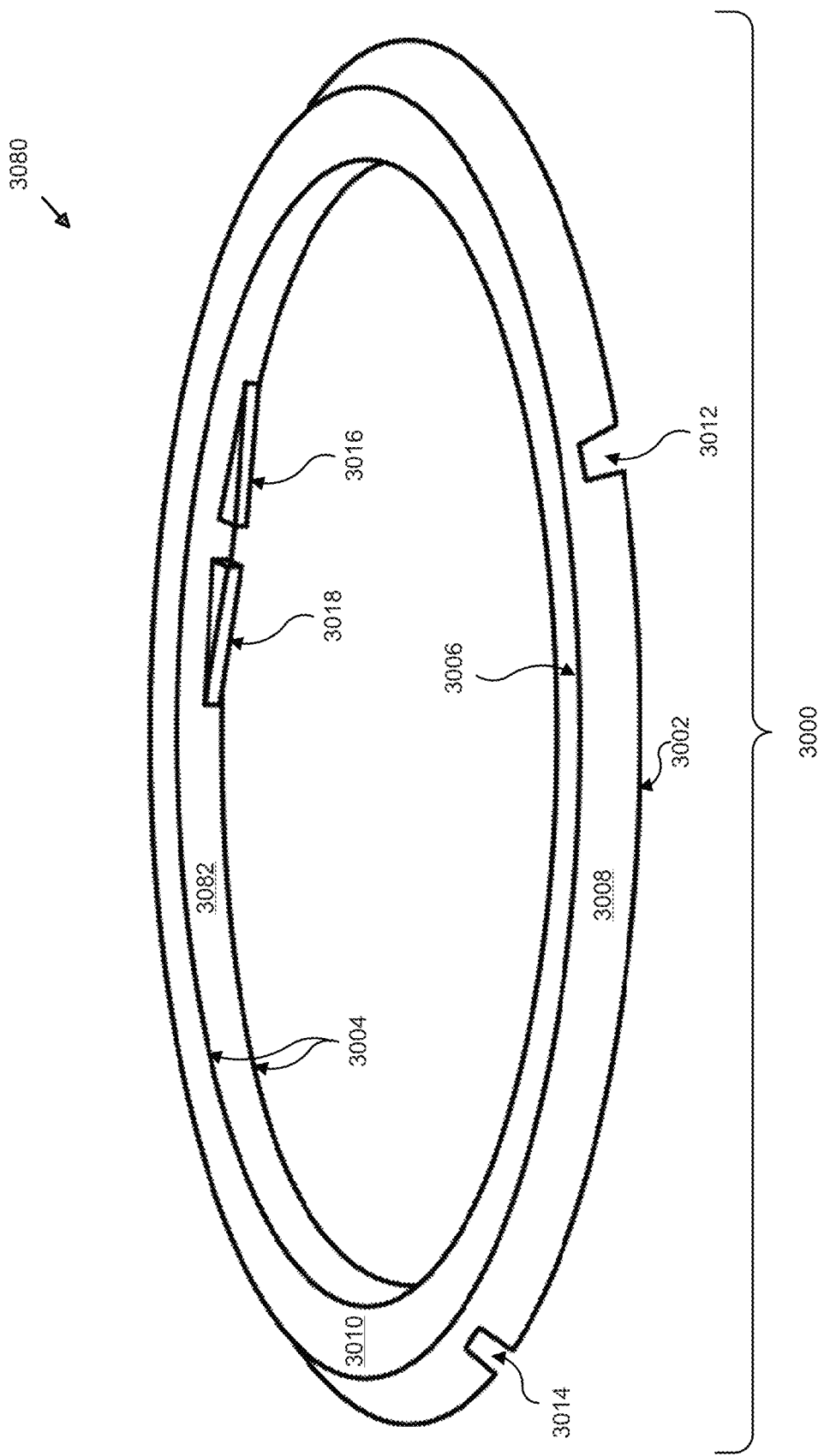
FIG. 30G illustrates a perspective view of an exemplary spacer ring used in analysis and deep learning modeling of sensor-based detection data in bounded aquatic environments using underwater powered systems.

FIG. 30G illustrates a perspective view of an exemplary spacer ring used in analysis and deep learning modeling of sensor-based detection data in bounded aquatic environments using underwater powered systems. Here, perspective view 3080 is shown including spacer ring 3000 having edges 3002-3006, surfaces 3008-3010 and 3082, conduit channels 3012-3014, and interlocks 3016-3018. In some examples, similarly-named and/or numbered elements may be designed, configured, function, and/or implemented similarly to previously-described elements (e.g., spacer ring 3000 includes edges 3002-3004, surfaces 3008-3010, conduit channels 3012-3014, interlocks 3016-3022, or others). As shown, edges 3004 may be formed in spacer ring 3000 as boundary edges of surface 3082, which may be a vertical or substantially vertical "wall" or inner surface of spacer ring 3000. In this example, a "vertical" or "substantially vertical" surface such as surface 3082 may be formed orthogonally (or substantially orthogonal) to a plane of spacer ring 3000.

As shown here, interlocks 3016-3018 are the "bottom" set of interlocking structures that are attached, coupled, or molded to the overall structure of spacer ring 3000. Here, interlocks 3016-3018 may be formed to engage with a mounting or wall bracket or structure such as a hook adapter (described below in greater detail in connection with FIGS. 31A-31G) to secure and position spacer ring 3000, whether directly over an access or over, under, or with any intervening structures. In other examples, spacer ring 3000 and the elements shown may be designed, formed, configured, or implemented differently and are not limited to the examples shown and described.

Figure 31A:
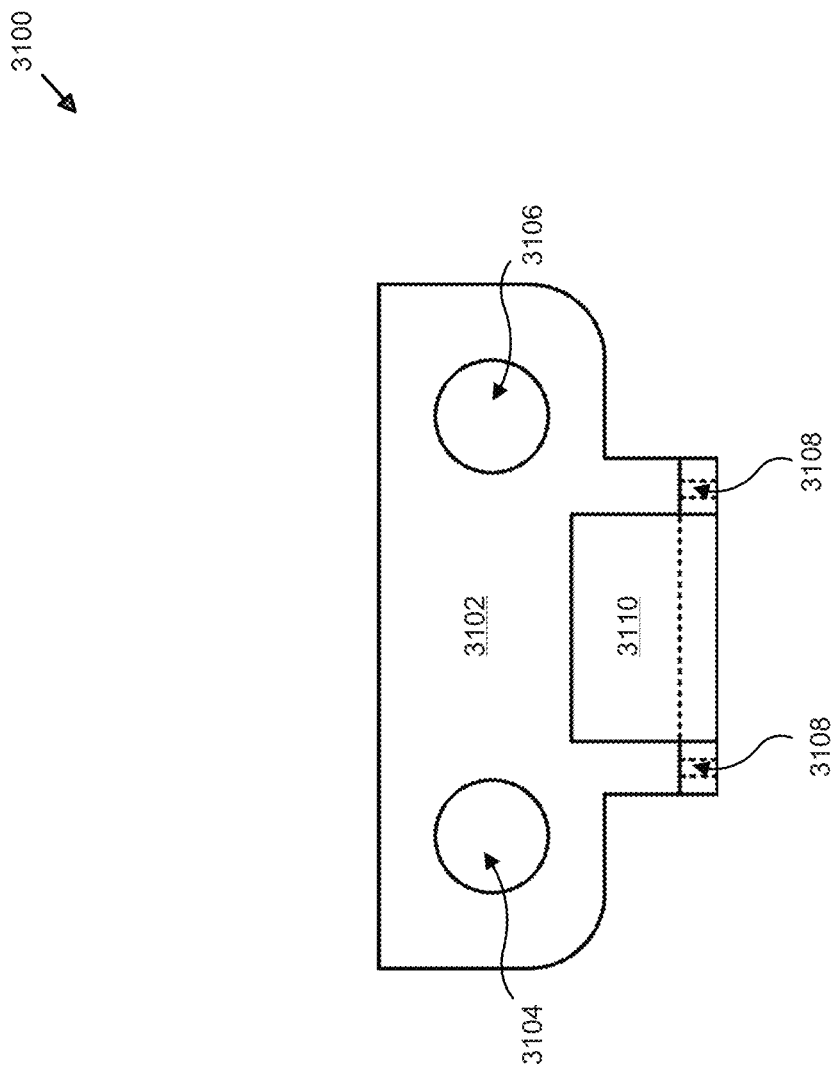
FIG. 31A illustrates a front view of an exemplary hook adapter used in analysis and deep learning modeling of sensor-based detection data in bounded aquatic environments using underwater powered systems.

FIG. 31A illustrates a front view of an exemplary hook adapter used in analysis and deep learning modeling of sensor-based detection data in bounded aquatic environments using underwater powered systems. Here, hook adapter 3100 includes body 3102, mounting holes 3104-3106, base 3108, and hook 3110. In some examples, similarly-named and/or numbered elements may be designed, configured, function, and/or implemented similarly to previously-described elements (e.g., spacer ring 3000 includes edges 3002-3004, surfaces 3008-3010, conduit channels 3012-3014, interlocks 3016-3022, or others). As used in the present example, hook adapter 3100 may be mounted using, for example, fasteners such as screws, bolts, or other mechanical implementations. Hook adapter 3100, in some examples, may be used to secure or fasten spacer ring 3000 (FIGS. 30A-30G) by engaging hook 3110 with one or more of interlocks 3016-3022 (FIGS. 30A-30G). For example, interlocks 3016-3018 (FIG. 30A) may be engaged with hook 3110 when placing spacer ring 3000 adjacent to hook adapter 3100. Hook 3110 provides a retaining structure sufficient to prevent spacer ring 3000 from falling away from a wall, boundary, or other surface against which hook adapter 3100 is mounted. In other examples, multiple hook adapters may be implemented to engage multiple sets of interlocks. For example, spacer ring 3000 may be rotatably placed over a top and a bottom hook adapter so that, when rotated, interlocks 3016-3018 and 3020-3022 engage with multiple hooks (e.g., hook 3110) in order to retain or otherwise hold spacer ring 3000 against a wall, boundary, hull, or other surface on which are mounted or otherwise coupled (directly or indirectly, with or without fasteners) multiple hook adapters (e.g., hook adapter 3100).

In some examples, fasteners may be inserted through mounting holes 3104-3106 in order to secure body 3102 to a wall, hull, or other underwater boundary, which may or may not be vertically oriented. In other examples, hook adapter 3100 may be mounted in any orientation and is not limited or restricted to any particular orientation. In still other examples, other types of materials may be used such as adhesive materials, chemicals, or other substances to secure (i.e., permanently, semi-permanently, or temporarily mount) hook adapter 3100. As shown, base 3108 extends from body 3102 to provide an appendage or substrate from which upward tending (in other examples, downward tending) hook 3110 extends. The size, shape, design, or configuration of hook adapter 3100, body 3102, mounting holes 3104-3106, base 3108, and hook 3110 may be varied and is not limited to any particular example or description, which are provided for purposes of illustration and exemplary explanation. In other examples, hook adapter 3100 and the elements shown may be designed, formed, configured, or implemented differently and are not limited to the examples shown and described.

Figure 31B:
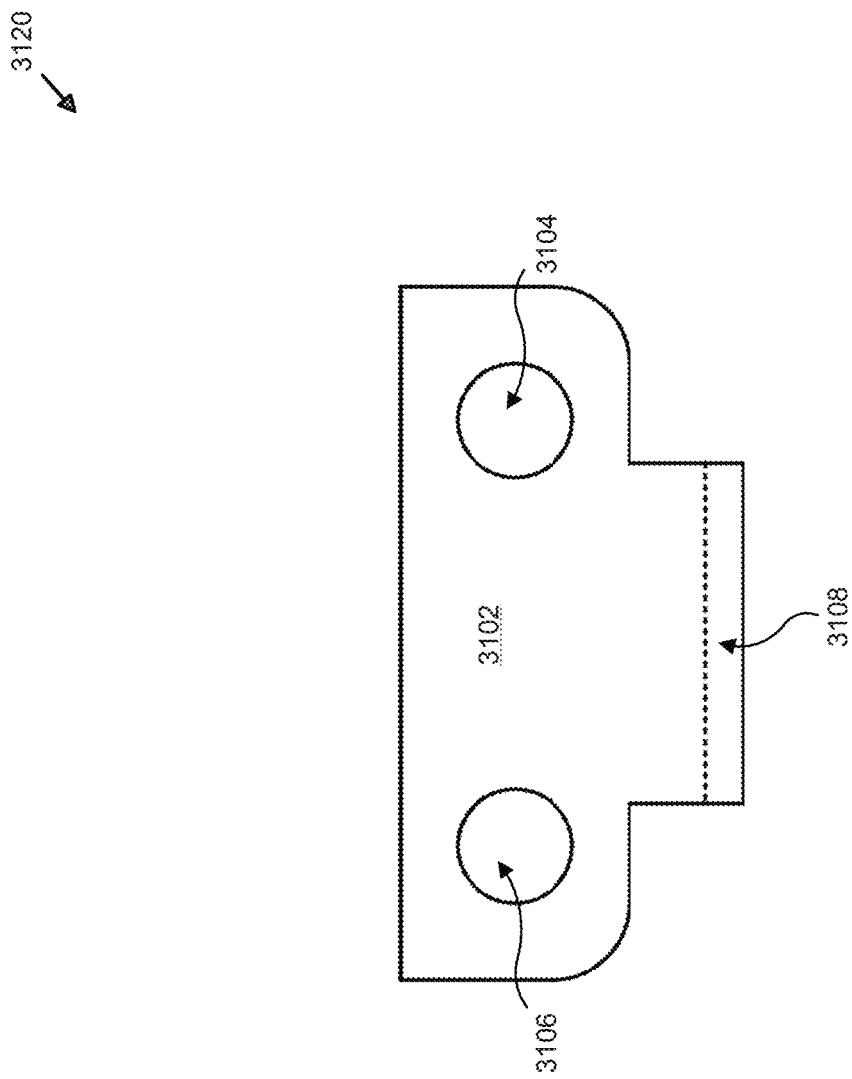
FIG. 31B illustrates a rear view of an exemplary spacer ring mounting bracket used in analysis and deep learning modeling of sensor-based detection data in bounded aquatic environments using underwater powered systems.

FIG. 31B illustrates a rear view of an exemplary hook adapter used in analysis and deep learning modeling of sensor-based detection data in bounded aquatic environments using underwater powered systems. Here, a rear view of hook adapter 3120 includes body 3102, mounting holes 3104-3106, and base 3108. In some examples, similarly-named and/or numbered elements may be designed, configured, function, and/or implemented similarly to previously-described elements (e.g., body 3102, mounting holes 3104-3106, base 3108, hook 3110, or others). Dotted lines, wherever provided, are presented for purposes of illustrating a cross-sectional view of base 3108 and is not intended to denote any particular dimension, function, or structure apart from that described herein. In some examples, mounting holes 3104-3106 may be varied in number, size, shape, placement, position, or other attributes and are not limited to the examples shown and described. For example, multiple mounting holes may be implemented to include more than mounting holes 3104-3106. As another example, mounting holes 3104-3106 (or more or fewer mounting holes) may be disposed within body 3102 symmetrically or asymmetrically. Still further, the size of mounting holes 3104-3106 may be varied to enable smaller or larger diameter fasteners to be used. In other examples, hook adapter 3120 and the elements shown may be designed, formed, configured, or implemented differently and are not limited to the examples shown and described.

Figure 31C:
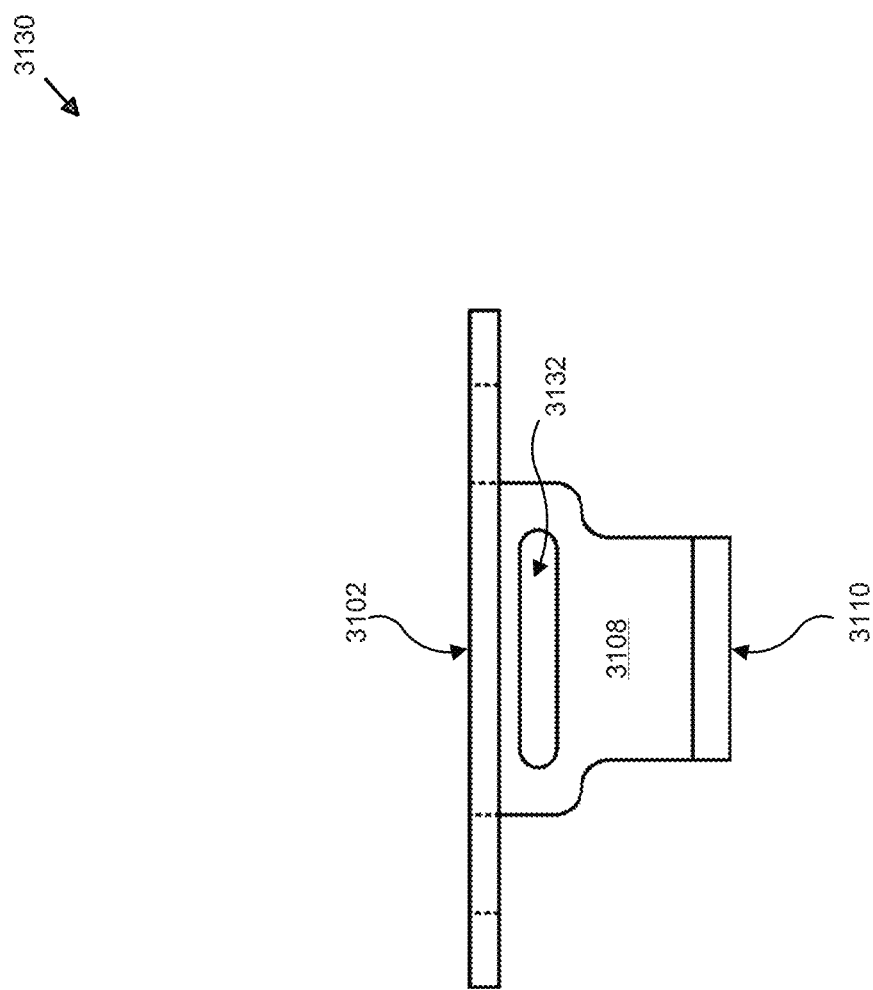
FIG. 31C illustrates a top view of an exemplary hook adapter used in analysis and deep learning modeling of sensor-based detection data in bounded aquatic environments using underwater powered systems.

FIG. 31C illustrates a top view of an exemplary hook adapter used in analysis and deep learning modeling of sensor-based detection data in bounded aquatic environments using underwater powered systems. Here, hook adapter 3130 includes body 3102, base 3108, hook 3110, and locking recess 3132. In the examples presented, similarly-named and/or numbered elements may be designed, configured, function, and/or implemented similarly to previously-described elements (e.g., body 3102, mounting holes 3104-3106, base 3108, hook 3110, or others). In some examples, locking recess 3132 may be configured to receive one or more of interlocks 3016-3022 (FIGS. 30A-30G) in order to secure spacer ring 3000 (FIGS. 30A-30G) to hook adapter 3130, which may be mounted against a surface (e.g., pool, pond, or any other type of boundary wall used at a whole or partial perimeter of an aquatic environment or body of water or liquid). As shown, locking recess 3132 may also be designed, configured, and implemented to align spacer ring 3000 (FIGS. 30A-30G) when secured to hook adapter 3130. Hook adapter 3130, in some examples, may be used to align and secure spacer ring 3000 (FIGS. 30A-30G) against a wall, boundary, or other surface to prevent detachment while permitting the passage of one or more conduits, as described above. In other examples, hook adapter 3130 and the elements shown may be designed, formed, configured, or implemented differently and are not limited to the examples shown and described.

Figure 31D:
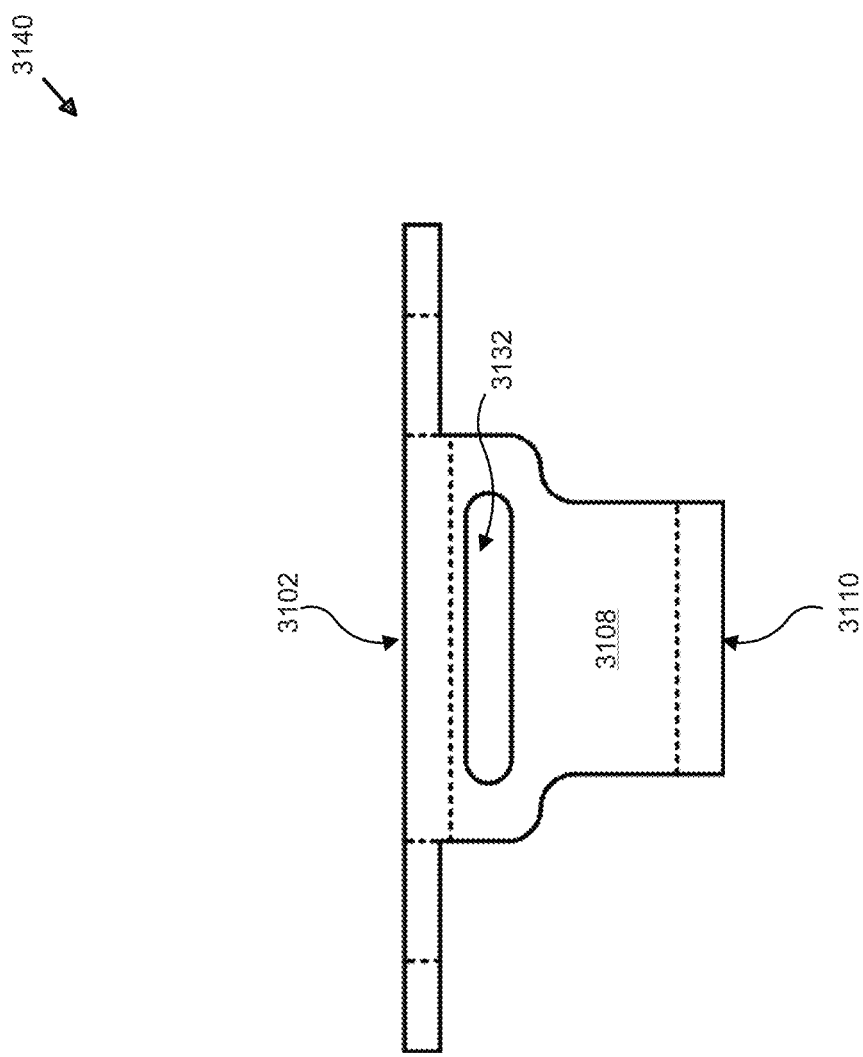
FIG. 31D illustrates a bottom view of an exemplary hook adapter used in analysis and deep learning modeling of sensor-based detection data in bounded aquatic environments using underwater powered systems.

FIG. 31D illustrates a bottom view of an exemplary hook adapter used in analysis and deep learning modeling of sensor-based detection data in bounded aquatic environments using underwater powered systems. Here, a bottom view of hook adapter 3140 includes body 3102, base 3108, hook 3110, and locking recess 3132. In the examples presented, similarly-named and/or numbered elements may be designed, configured, function, and/or implemented similarly to previously-described elements (e.g., body 3102, mounting holes 3104-3106, base 3108, hook 3110, or others). In other examples, hook adapter 3140 and the elements shown may be designed, formed, configured, or implemented differently and are not limited to the examples shown and described.

Figure 31E:
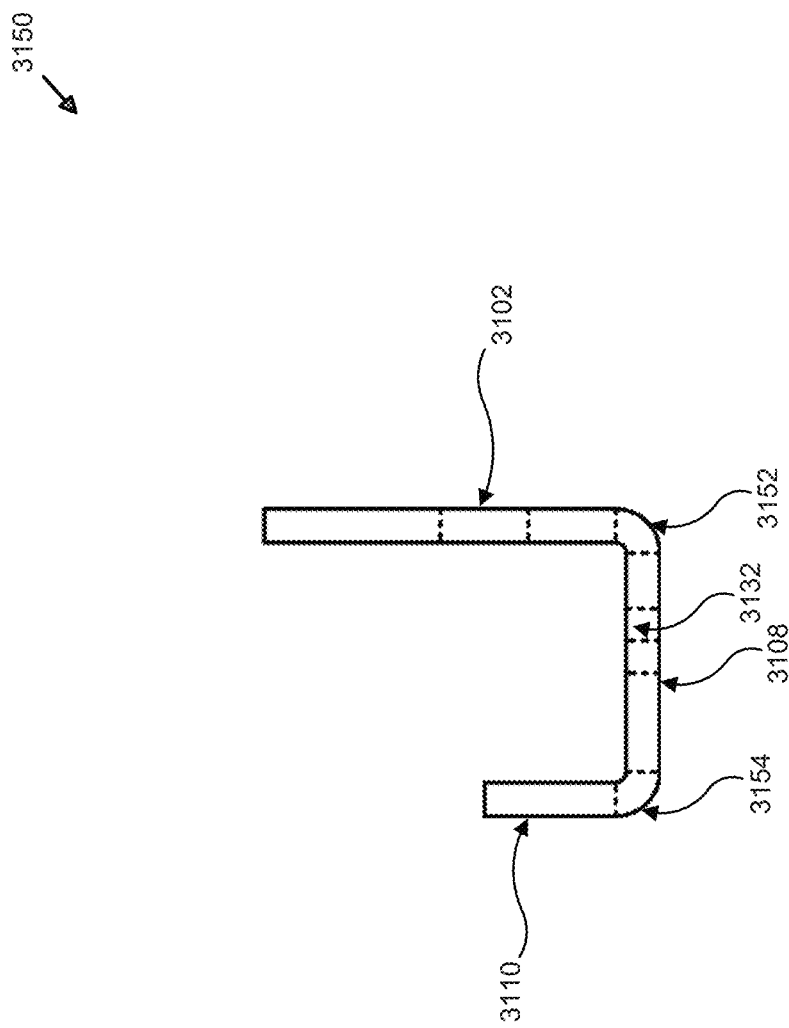
FIG. 31E illustrates a right view of an exemplary hook adapter used in analysis and deep learning modeling of sensor-based detection data in bounded aquatic environments using underwater powered systems.

FIG. 31E illustrates a right view of an exemplary hook adapter used in analysis and deep learning modeling of sensor-based detection data in bounded aquatic environments using underwater powered systems. Here, hook adapter 3150 includes body 3102, base 3108, hook 3110, locking recess 3132, and edges 3152-3154. In the examples presented, similarly-named and/or numbered elements may be designed, configured, function, and/or implemented similarly to previously-described elements (e.g., body 3102, mounting holes 3104-3106, base 3108, hook 3110, or others). As shown, hook adapter 3150 is shown from a right-side view, including edges 3152-3154, which are rounded, but may be shaped differently (e.g., orthogonally without a radius of curvature, with a greater or less radius of curvature, or others, without limitation or restriction). Locking recess 3132 is also shown from a cross sectional view using dotted lines to illustrate penetration through base 3108. Here, locking recess 3132 may be formed to be fully penetrative of base 3108 as shown. As used herein and in other drawings described throughout this Detailed Description, dotted lines are provided for purposes of illustrating examples provided and are neither limiting nor restrictive to a singular implementation. In other examples, locking recess 3132 may be implemented as a recess or "pocket" that is configured to seat interlocks 3016-3022 while only partially being recessed into base 3108. In other words, locking recess 3132 may formed as a complete passage through base 3108 or as a partial recess therein. In other examples, hook adapter 3150 and the elements shown may be designed, formed, configured, or implemented differently and are not limited to the examples shown and described.

Figure 31F:
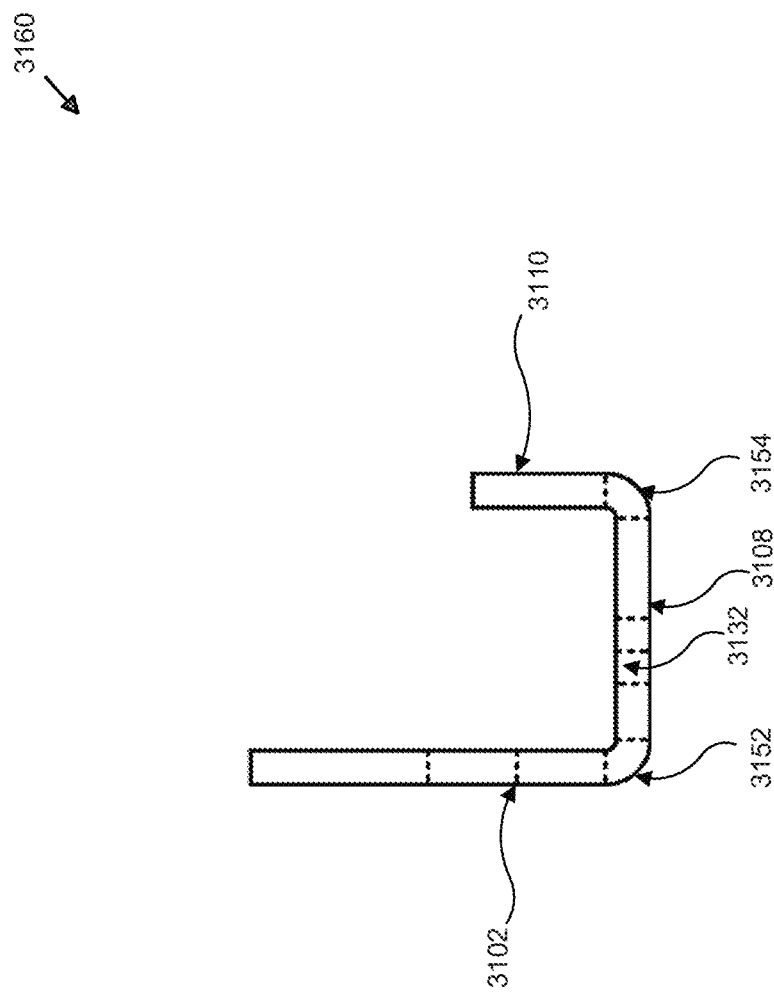
FIG. 31F illustrates a left view of an exemplary hook adapter used in analysis and deep learning modeling of sensor-based detection data in bounded aquatic environments using underwater powered systems.

FIG. 31F illustrates a left view of an exemplary hook adapter used in analysis and deep learning modeling of sensor-based detection data in bounded aquatic environments using underwater powered systems. Here, hook adapter 3160 is shown from a left side view, including body 3102, base 3108, hook 3110, locking recess 3132, and edges 3152-3154. In the examples presented, similarly-named and/or numbered elements may be designed, configured, function, and/or implemented similarly to previously-described elements (e.g., body 3102, mounting holes 3104-3106, base 3108, hook 3110, or others). In other examples, hook adapter 3160 and the elements shown may be designed, formed, configured, or implemented differently and are not limited to the examples shown and described.

Figure 31G:
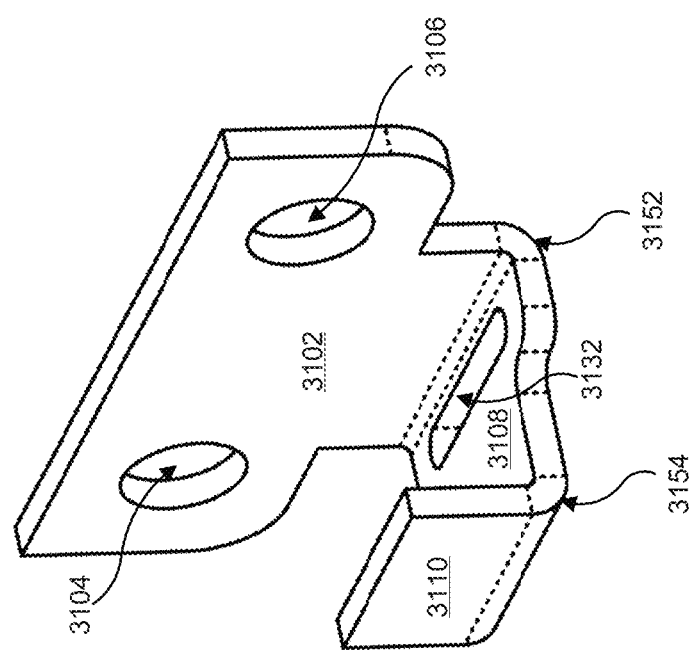
FIG. 31G illustrates a perspective view of an exemplary hook adapter used in analysis and deep learning modeling of sensor-based detection data in bounded aquatic environments using underwater powered systems.

FIG. 31G illustrates a perspective view of an exemplary hook adapter used in analysis and deep learning modeling of sensor-based detection data in bounded aquatic environments using underwater powered systems. Here, hook adapter 3170 is shown from a perspective, including body 3102, base 3108, hook 3110, locking recess 3132, and edges 3152-3154. In the examples presented, similarly-named and/or numbered elements may be designed, configured, function, and/or implemented similarly to previously-described elements (e.g., body 3102, mounting holes 3104-3106, base 3108, hook 3110, or others). Similar to locking recess 3132, mounting holes 3104-3106 are shown as fully penetrative of body 3102. In other examples, mounting holes 3104-3106 may also be threaded, counter threaded, or otherwise configured to receive fasteners that, when inserted into mounting holes 3104-3106, engage body 3102 to provide structural support and alignment when mounting, affixing, or otherwise coupling hook adapter 3170. In other examples, hook adapter 3170 and the elements shown may be designed, formed, configured, or implemented differently and are not limited to the examples shown and described.

Figure 32:
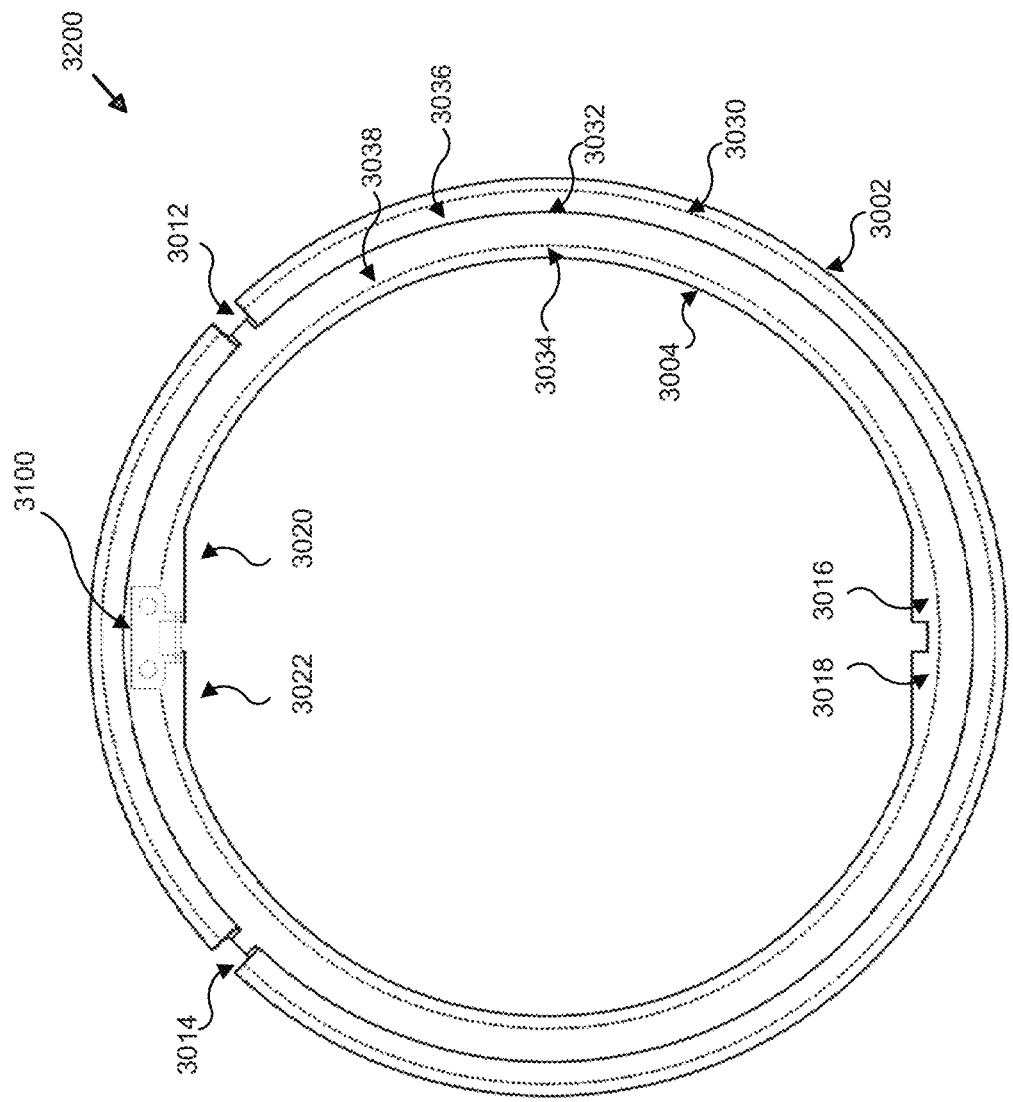
FIG. 32 illustrates a rear view of an exemplary spacer ring coupled to a hook adapter for use in analysis and deep learning modeling of sensor-based detection data in bounded aquatic environments using underwater powered systems.

FIG. 32 illustrates a rear view of an exemplary spacer ring coupled to a hook adapter for use in analysis and deep learning modeling of sensor-based detection data in bounded aquatic environments using underwater powered systems. Here, a rear view of spacer ring 3200 is shown including edges 3002-3004, surfaces 3008-3010, conduit channels 3012-3014, interlocks 3016-3022, edges 3030-3034, surfaces 3036-3038, and hook adapter 3100. In some examples, similarly-named and/or numbered elements may be designed, configured, function, and/or implemented similarly to previously-described elements (e.g., spacer ring 3000 includes edges 3002-3004, surfaces 3008-3010, conduit channels 3012-3014, interlocks 3016-3022, hook adapter 3100, or others). As shown, in some examples, spacer ring 3200 may be implemented by coupling hook adapter 3100 (FIGS. 31A-31G) using, for example, fasteners of various sorts, types, dimensions, and configurations. In some examples, hook adapter 3100 may be coupled to spacer ring directly or indirectly, the latter of which may have one or more intermediate layers (e.g., an intermediate ring made of various types of materials such as metal, alloy, plastic, ceramics, or others, without limitation or restriction) disposed between hook adapter 3100 and spacer ring 3200. Intervening materials may be used for various types of function or structural purposes such as providing structural reinforcement, mechanical spacing, electrical bonding or grounding, or others, without limitation or restriction. As shown, hook adapter 3100 may be coupled to spacer ring so as to dispose a base and a hook (e.g., base 3108 (FIGS. 31A-G), hook 3110 (FIGS. 31A-31G)) to engage a mounting apparatus (not shown) on a wall or other boundary of an aquatic environment. In other examples, spacer ring 3200 with hook adapter 3100 and the elements shown may be designed, formed, configured, or implemented differently and are not limited to the examples shown and described.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
    capturing an image from a sensor disposed proximate to a waterline, the sensor being housed with another sensor in a structure fixed to a side of a bounded aquatic environment and electrically coupled to a light unit disposed below the waterline and being configured to provide power to the sensor and the another sensor, the sensor being disposed above the waterline and configured to capture the image as a side view of the bounded aquatic environment to identify organic motion or inorganic motion above the waterline and the another sensor being disposed below the waterline and being configured to capture another image as another side view of the bounded aquatic environment to identify organic motion or inorganic motion below the waterline;
    converting the image and the another image into data, the data being digitally encoded by a processor in electronic communication with the sensor;
    evaluating the data to separate background data from foreground data to identify foreground features using one or more deep learning algorithms trained against model data to further identify a person from a non-person object;
    generating tracking data from the data after the background data is removed, the tracking data being evaluated to determine whether a head or a body are detected by comparing the tracking data to classifier data;
    tracking the head or the body relative to the waterline if the head or the body are detected in the tracking data; and
    determining a state associated with the head or the body, if the head or the body is detected, the state being associated with state data, the state data being used to determine a drowning state and generate an alert external to the bounded aquatic environment if the drowning state is determined.

2. The method of claim 1, wherein the background data is associated with one or more boundaries of a body of water in which the sensor is disposed above the waterline.

3. The method of claim 1, further comprising calibrating the sensor to align a field of view associated with the sensor.

4. The method of claim 1, further comprising performing an initial calibration of the sensor, the initial calibration being performed to identify one or more image regions of a body of water.

5. The method of claim 1, wherein the classifier data is generated by a model comprising a plurality of datasets collected from one or more data sources.

6. The method of claim 1, wherein the sensor comprises a camera.

7. The method of claim 1, wherein the sensor comprises a camera and a polarization filter.

8. The method of claim 1, wherein the sensor uses lidar to capture the image.

9. The method of claim 1, wherein an optical feature is implemented with a camera configured to capture the image.

10. The method of claim 1, wherein the image is captured using a camera implemented with a spectral filter.

11. The method of claim 1, wherein the image is captured using a camera implemented with a polarization filter.

12. The method of claim 1, wherein the sensor comprises a transmitter configured to project a light curtain over a wide angle field above the waterline.

13. The method of claim 1, wherein the sensor is configured to detect an object if one or more beams associated with a light curtain are interrupted.

14. The method of claim 1, wherein a timer is started when the head is detected, based on the comparing the tracking data to the classifier data, to be below the waterline.

15. The method of claim 1, wherein the drowning state is determined when the head or the body is floating and no motion has been detected during a period of time.

16. A system, comprising:
a database configured to store data associated with an image captured by a sensor housed with another sensor in a structure fixed to a side of a bounded aquatic environment and electrically coupled to a light unit disposed below a waterline of a body of water and being configured to provide power to the sensor and the another sensor, the sensor being disposed above the waterline of the body of water and configured to capture the image as a side view to identify organic motion or inorganic motion above the waterline of a body of water and the another sensor being disposed below the waterline of the body of water and being configured to capture another image as a side view to identify organic motion or inorganic motion below the waterline of the body of water, being disposed proximate to the waterline of the body of water, the sensor and the another sensor being configured to capture the image above the waterline and below the waterline; and
a processor configured to process data generated from the image captured by the sensor and other data generated from the another image captured by the another sensor, the sensor and the another sensor being housed in a structure electrically coupled to the light unit disposed below the waterline of the body of water, to convert the image into data, the data being digitally encoded by a processor in electronic communication with the sensor, to evaluate the data to separate background data from foreground data to identify foreground features using one or more deep learning algorithms trained against model data to further identify a person from a non-person object, to generate tracking data from the data after the background data is removed, the tracking data being evaluated to determine whether a head or a body are detected by comparing the tracking data to classifier data, to track the head or the body relative to the waterline if the head or the body are detected in the tracking data, and to determine a state associated with the head or the body, if the head or the body is detected, the state being associated with state data, the state data being used to determine a drowning state and generate an alert external to the bounded aquatic environment if the drowning state is determined.

17. The system of claim 16, wherein the sensor is in data communication with a hub.

18. The system of claim 16, wherein the sensor is in data communication with a hub, the hub being configured to generate an alarm if the drowning state is determined.

19. The system of claim 16, wherein the sensor is configured to sense a field of view of substantially 180 degrees relative to a vertical axis and 180 degrees relative to a horizontal axis above and below the waterline, respectively.

20. A non-transitory computer readable medium having one or more computer program instructions configured to perform a method, the method comprising:
capturing an image from a sensor disposed proximate to a waterline, the sensor being housed with another sensor in a structure fixed to a side of a bounded aquatic environment and electrically coupled to a light unit disposed below the waterline and being configured to provide power to the sensor and the another sensor, the sensor being disposed above the waterline and configured to capture the image as a side view of the bounded aquatic environment to identify organic motion or inorganic motion above the waterline and the another sensor being disposed below the waterline and being configured to capture another image as another side view of the bounded aquatic environment to identify organic motion or inorganic motion below the waterline;
converting the image and the another image into data, the data being digitally encoded by a processor in electronic communication with the sensor;
evaluating the data to separate background data from foreground data to identify foreground features using one or more deep learning algorithms trained against model data to further identify a person from a non-person object;
generating tracking data from the data after the background data is removed, the tracking data being evaluated to determine whether a head or a body are detected by comparing the tracking data to classifier data;
tracking the head or the body relative to the waterline if the head or the body are detected in the tracking data; and
determining a state associated with the head or the body, if the head or the body is detected, the state being associated with state data, the state data being used to determine a drowning state and generate an alert external to the bounded aquatic environment if the drowning state is determined.

* * * * *